United States Patent
Zhang et al.

(10) Patent No.: US 10,277,132 B2
(45) Date of Patent: *Apr. 30, 2019

(54) SYSTEMS AND METHODS FOR CONSTANT VOLTAGE MODE AND CONSTANT CURRENT MODE IN FLYBACK POWER CONVERTERS WITH PRIMARY-SIDE SENSING AND REGULATION

(71) Applicant: ON-BRIGHT ELECTRONICS (SHANGHAI) CO., LTD., Shanghai (CN)

(72) Inventors: Yunchao Zhang, Shanghai (CN); Yaming Cao, Shanghai (CN); Xiaomin Huang, Shanghai (CN); Xiuhong Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,362

(22) Filed: May 11, 2016

(65) Prior Publication Data
US 2016/0329821 A1 Nov. 10, 2016

Related U.S. Application Data

(63) Continuation of application No. 13/915,477, filed on Jun. 11, 2013, now Pat. No. 9,385,612, which is a (Continued)

(30) Foreign Application Priority Data

Feb. 28, 2011 (CN) .......................... 201110051423

(51) Int. Cl.
*H02M 3/335* (2006.01)
*H02H 7/122* (2006.01)
(Continued)

(52) U.S. Cl.
CPC ......... *H02M 3/33515* (2013.01); *H02M 1/08* (2013.01); *H02M 3/335* (2013.01);
(Continued)

(58) Field of Classification Search
CPC ........... H02M 2001/0009; H02M 1/32; H02M 3/33507; H02M 3/33523
(Continued)

(56) References Cited

U.S. PATENT DOCUMENTS 3,912,340 A 10/1975 Bertolasi
5,247,241 A 9/1993 Ueda
(Continued)

FOREIGN PATENT DOCUMENTS

CN 1806381 A 7/2006
CN 1841893 A 10/2006
(Continued)

OTHER PUBLICATIONS

Chinese Patent Office, Office Action dated Dec. 8, 2014, in Application No. 201110034669.9.
(Continued)

*Primary Examiner* — Gary A Nash
(74) *Attorney, Agent, or Firm* — Faegre Baker Daniels LLP

(57) ABSTRACT

System and method for regulating a power converter. The system includes a first signal generator configured to receive a first sensed signal and generate an output signal associated with demagnetization. The first sensed signal is related to a first winding coupled to a secondary winding for a power converter, and the secondary winding is associated with at least an output current for the power converter. Additionally, the system includes a ramping signal generator configured to receive the output signal and generate a ramping signal, and a first comparator configured to receive the ramping signal
(Continued)

and a first threshold signal and generate a first comparison signal based on at least information associated with the ramping signal and the first threshold signal. Moreover, the system includes a second comparator configured to receive a second sensed signal and a second threshold signal and generate a second comparison signal.

38 Claims, 47 Drawing Sheets

Related U.S. Application Data continuation of application No. 13/071,384, filed on Mar. 24, 2011, now Pat. No. 8,488,342, which is a continuation of application No. 12/581,775, filed on Oct. 19, 2009, now Pat. No. 8,526,203.

(60) Provisional application No. 61/107,249, filed on Oct. 21, 2008.

(51) Int. Cl.
    H02M 1/08    (2006.01)
    H05B 33/08   (2006.01)
    H02M 1/00    (2006.01)

(52) U.S. Cl.
    CPC .... *H02M 3/33523* (2013.01); *H05B 33/0815* (2013.01); *H02M 2001/0009* (2013.01)

(58) Field of Classification Search
    USPC ........ 363/21.13, 21.16–21.18, 50, 55, 56.01, 363/56.09–56.11
    See application file for complete search history.

(56) References Cited

U.S. PATENT DOCUMENTS

| | | | |
|---|---|---|---|
| 5,497,119 A * | 3/1996 | Tedrow | G05F 1/465 323/265 |
| 5,568,044 A | 10/1996 | Bittner | |
| 5,729,448 A | 3/1998 | Haynie et al. | |
| 6,069,458 A | 5/2000 | Takehara et al. | |
| 6,134,060 A | 10/2000 | Ryat | |
| 6,292,376 B1 | 9/2001 | Kato | |
| 6,366,066 B1 | 4/2002 | Wilcox | |
| 6,366,070 B1 | 4/2002 | Cooke et al. | |
| 6,381,151 B1 | 4/2002 | Jang | |
| 6,545,513 B2 | 4/2003 | Tsuchida et al. | |
| 6,556,478 B2 | 4/2003 | Willis et al. | |
| 6,713,995 B2 | 3/2004 | Chen | |
| 6,798,086 B2 | 9/2004 | Utsunomiya | |
| 6,947,298 B2 | 9/2005 | Uchida | |
| 6,954,056 B2 | 10/2005 | Hoshino et al. | |
| 6,972,528 B2 | 12/2005 | Shao | |
| 6,972,548 B2 | 12/2005 | Tzeng et al. | |
| 6,977,824 B1 | 12/2005 | Yang et al. | |
| 7,035,119 B2 | 4/2006 | Koike | |
| 7,054,169 B2 | 5/2006 | Huh et al. | |
| 7,061,780 B2 | 6/2006 | Yang et al. | |
| 7,116,089 B1 | 10/2006 | Nguyen et al. | |
| 7,173,404 B2 | 2/2007 | Wu | |
| 7,208,927 B1 | 4/2007 | Nguyen | |
| 7,262,587 B2 | 8/2007 | Takimoto et al. | |
| 7,265,999 B2 | 9/2007 | Murata et al. | |
| 7,345,895 B2 | 3/2008 | Zhu et al. | |
| 7,394,634 B2 | 7/2008 | Fang et al. | |
| 7,414,865 B2 | 8/2008 | Yang | |
| 7,456,623 B2 | 11/2008 | Hasegawa et al. | |
| 7,492,619 B2 | 2/2009 | Ye et al. | |
| 7,522,431 B2 | 4/2009 | Huynh et al. | |
| 7,535,736 B2 | 5/2009 | Nakamura et al. | |
| 7,605,576 B2 | 10/2009 | Kanakubo | |
| 7,609,039 B2 | 10/2009 | Hasegawa | |
| 7,684,220 B2 | 3/2010 | Fang et al. | |
| 7,684,462 B2 | 3/2010 | Ye et al. | |
| 7,826,237 B2 | 11/2010 | Zhang et al. | |
| 7,852,055 B2 | 12/2010 | Michishita | |
| 7,869,229 B2 | 1/2011 | Huynh et al. | |
| 7,898,187 B1 | 3/2011 | Mei et al. | |
| 7,898,825 B2 | 3/2011 | Mulligan et al. | |
| 7,990,202 B2 | 8/2011 | Fang et al. | |
| 8,013,544 B2 | 9/2011 | Negrete et al. | |
| 8,085,027 B2 | 12/2011 | Lin et al. | |
| 8,093,826 B1 | 1/2012 | Eagar et al. | |
| 8,144,487 B2 | 3/2012 | Djenguerian et al. | |
| 8,213,203 B2 | 7/2012 | Fei et al. | |
| 8,305,776 B2 | 11/2012 | Fang | |
| 8,331,112 B2 | 12/2012 | Huang et al. | |
| 8,339,814 B2 | 12/2012 | Zhang et al. | |
| 8,391,028 B2 | 3/2013 | Yeh | |
| 8,416,596 B2 | 4/2013 | Huang | |
| 8,488,342 B2 | 7/2013 | Zhang et al. | |
| 8,525,442 B2 | 9/2013 | Zimmermann et al. | |
| 8,526,203 B2 | 9/2013 | Huang et al. | |
| 8,593,075 B1 | 11/2013 | Melanson et al. | |
| 8,630,103 B2 | 1/2014 | Bäurle et al. | |
| 8,664,883 B2 | 3/2014 | Hiramatu et al. | |
| 8,824,173 B2 | 9/2014 | Fang et al. | |
| 8,879,289 B2 | 11/2014 | Lin et al. | |
| 8,891,256 B2 | 11/2014 | Fang et al. | |
| 8,917,527 B2 | 12/2014 | Fang et al. | |
| 8,971,062 B2 | 3/2015 | Huang et al. | |
| 8,982,585 B2 | 3/2015 | Fang | |
| 9,084,317 B2 | 7/2015 | Fang et al. | |
| 9,088,217 B2 | 7/2015 | Zhang et al. | |
| 9,088,218 B2 | 7/2015 | Zhang et al. | |
| 9,124,188 B2 | 9/2015 | Fang et al. | |
| 9,148,061 B2 | 9/2015 | Fang et al. | |
| 9,325,234 B2 | 4/2016 | Zhang et al. | |
| 9,343,979 B2 | 5/2016 | Fang et al. | |
| 9,350,252 B2 | 5/2016 | Zhang et al. | |
| 9,379,623 B2 | 6/2016 | Zhang et al. | |
| 9,379,624 B2 | 6/2016 | Lin et al. | |
| 9,385,612 B2 | 7/2016 | Zhang et al. | |
| 9,531,278 B2 | 12/2016 | Zhang et al. | |
| 9,559,598 B2 | 1/2017 | Fang et al. | |
| 9,577,537 B2 | 2/2017 | Zhang et al. | |
| 9,794,997 B2 | 10/2017 | Fang et al. | |
| 9,807,840 B2 | 10/2017 | Fang et al. | |
| 9,812,970 B2 | 11/2017 | Fang et al. | |
| 9,906,144 B2 | 2/2018 | Zhang et al. | |
| 9,929,655 B2 | 3/2018 | Fang et al. | |
| 9,954,446 B2 | 4/2018 | Fang et al. | |
| 9,986,605 B2 | 5/2018 | Fang | |
| 10,003,271 B2 | 6/2018 | Fang et al. | |
| 10,008,939 B2 | 6/2018 | Zhang et al. | |
| 10,069,424 B2 | 9/2018 | Lin et al. | |
| 2002/0080625 A1* | 6/2002 | Goyhenetche | H02M 3/156 363/21.01 |
| 2002/0080631 A1 | 6/2002 | Kanouda et al. | |
| 2003/0174520 A1* | 9/2003 | Bimbaud | H02M 3/3385 363/19 |
| 2004/0075600 A1 | 4/2004 | Vera et al. | |
| 2005/0057238 A1 | 3/2005 | Yoshida | |
| 2005/0116697 A1 | 6/2005 | Matsuo et al. | |
| 2005/0222646 A1 | 10/2005 | Kroll et al. | |
| 2005/0270807 A1 | 12/2005 | Strijker | |
| 2006/0034102 A1 | 2/2006 | Yang et al. | |
| 2006/0043953 A1 | 3/2006 | Xu | |
| 2006/0050539 A1 | 3/2006 | Yang et al. | |
| 2006/0055433 A1 | 3/2006 | Yang et al. | |
| 2006/0113975 A1 | 6/2006 | Mednik et al. | |
| 2006/0244429 A1 | 11/2006 | Quitayen | |
| 2006/0273772 A1 | 12/2006 | Groom | |
| 2007/0115696 A1 | 5/2007 | Berghegger | |
| 2007/0120506 A1 | 5/2007 | Grant | |
| 2007/0171687 A1 | 7/2007 | Kogel et al. | |
| 2007/0241733 A1 | 10/2007 | Chen et al. | |
| 2007/0273345 A1 | 11/2007 | Chen et al. | |
| 2008/0061754 A1 | 3/2008 | Hibi | |
| 2008/0067993 A1 | 3/2008 | Coleman | |
| 2008/0112193 A1 | 5/2008 | Yan et al. | |

(56) References Cited

U.S. PATENT DOCUMENTS

| | | |
|---|---|---|
| 2008/0157742 A1 | 7/2008 | Martin et al. |
| 2008/0159378 A1 | 7/2008 | Kris |
| 2008/0191679 A1 | 8/2008 | Williams |
| 2008/0225563 A1 | 9/2008 | Seo |
| 2008/0252345 A1 | 10/2008 | Deschamp et al. |
| 2009/0051336 A1 | 2/2009 | Hartlieb et al. |
| 2009/0051340 A1 | 2/2009 | Wang |
| 2009/0058387 A1 | 3/2009 | Huynh et al. |
| 2009/0073727 A1 | 3/2009 | Huynh et al. |
| 2009/0091953 A1 | 4/2009 | Huynh et al. |
| 2009/0121697 A1 | 5/2009 | Aiura et al. |
| 2009/0141520 A1 | 6/2009 | Grande et al. |
| 2009/0175057 A1 | 7/2009 | Grande et al. |
| 2009/0206814 A1 | 8/2009 | Zhang et al. |
| 2009/0219000 A1 | 9/2009 | Yang |
| 2009/0251219 A1 | 10/2009 | Fiocchi et al. |
| 2009/0261758 A1 | 10/2009 | Ger |
| 2009/0273292 A1 | 11/2009 | Zimmermann |
| 2009/0289618 A1 | 11/2009 | Tajima et al. |
| 2009/0302817 A1 | 12/2009 | Nagai |
| 2010/0019682 A1 | 1/2010 | Lu et al. |
| 2010/0020573 A1 | 1/2010 | Melanson |
| 2010/0026270 A1 | 2/2010 | Yang et al. |
| 2010/0027300 A1 | 2/2010 | Fang |
| 2010/0061126 A1 | 3/2010 | Huynh et al. |
| 2010/0128501 A1 | 5/2010 | Huang et al. |
| 2010/0141178 A1 | 6/2010 | Negrete et al. |
| 2010/0219802 A1 | 9/2010 | Lin et al. |
| 2010/0225293 A1 | 9/2010 | Wang et al. |
| 2010/0238689 A1 | 9/2010 | Fei et al. |
| 2010/0308733 A1 | 12/2010 | Shao |
| 2010/0321956 A1 | 12/2010 | Yeh |
| 2011/0044076 A1 | 2/2011 | Zhang et al. |
| 2011/0096574 A1 | 4/2011 | Huang |
| 2011/0148376 A1 | 6/2011 | Xu et al. |
| 2011/0149614 A1 | 6/2011 | Stracquadaini |
| 2011/0182089 A1 | 7/2011 | genannt Berghegger |
| 2011/0248770 A1 | 10/2011 | Fang et al. |
| 2011/0254457 A1 | 10/2011 | Marent et al. |
| 2011/0267846 A1 | 11/2011 | Djenguerian et al. |
| 2011/0267853 A1 | 11/2011 | Yang et al. |
| 2011/0282704 A1 | 11/2011 | Graeber et al. |
| 2011/0292704 A1 | 12/2011 | Makino et al. |
| 2012/0008344 A1 | 1/2012 | Zeng et al. |
| 2012/0013321 A1 | 1/2012 | Huang et al. |
| 2012/0049758 A1 | 3/2012 | Hwang et al. |
| 2012/0049825 A1 | 3/2012 | Chen et al. |
| 2012/0075891 A1 | 3/2012 | Zhang et al. |
| 2012/0105030 A1 | 5/2012 | Chen et al. |
| 2012/0120342 A1 | 5/2012 | Uchimoto et al. |
| 2012/0139435 A1 | 6/2012 | Storm |
| 2012/0146532 A1 | 6/2012 | Ivey et al. |
| 2012/0147630 A1 | 6/2012 | Cao et al. |
| 2012/0153919 A1 | 6/2012 | Garbossa et al. |
| 2012/0155122 A1 | 6/2012 | Tang et al. |
| 2012/0195076 A1 | 8/2012 | Zhang et al. |
| 2012/0217890 A1 | 8/2012 | Chang et al. |
| 2012/0224397 A1 | 9/2012 | Yeh |
| 2012/0257423 A1 | 10/2012 | Fang |
| 2012/0281438 A1 | 11/2012 | Fang et al. |
| 2012/0300508 A1 | 11/2012 | Fang |
| 2012/0320640 A1 | 12/2012 | Baurle et al. |
| 2013/0027989 A1 | 1/2013 | Fang |
| 2013/0033905 A1 | 2/2013 | Lin et al. |
| 2013/0038227 A1 | 2/2013 | Yan et al. |
| 2013/0051090 A1 | 2/2013 | Xie et al. |
| 2013/0093356 A1 | 4/2013 | Green et al. |
| 2013/0114307 A1 | 5/2013 | Fang et al. |
| 2013/0119881 A1 | 5/2013 | Fang et al. |
| 2013/0147379 A1 | 6/2013 | Zhou et al. |
| 2013/0148387 A1 | 6/2013 | Ren et al. |
| 2013/0182476 A1 | 7/2013 | Yang et al. |
| 2013/0223107 A1 | 8/2013 | Zhang et al. |
| 2013/0258723 A1 | 10/2013 | Fang et al. |
| 2013/0272033 A1 | 10/2013 | Zhang et al. |
| 2013/0307431 A1 | 11/2013 | Zhu et al. |
| 2013/0308350 A1 | 11/2013 | Huang et al. |
| 2014/0029315 A1 | 1/2014 | Zhang et al. |
| 2014/0043879 A1 | 2/2014 | Eum et al. |
| 2014/0078790 A1 | 3/2014 | Lin et al. |
| 2014/0104895 A1 | 4/2014 | Baurle et al. |
| 2014/0140109 A1 | 5/2014 | Valley |
| 2014/0146578 A1 | 5/2014 | Fang et al. |
| 2014/0160809 A1 | 6/2014 | Lin et al. |
| 2014/0177280 A1 | 6/2014 | Yang et al. |
| 2014/0268920 A1 | 9/2014 | Fang et al. |
| 2015/0055378 A1 | 2/2015 | Lin et al. |
| 2015/0084530 A1 | 3/2015 | Kitamura et al. |
| 2015/0162820 A1 | 6/2015 | Zhang et al. |
| 2015/0180347 A1 | 6/2015 | Fang et al. |
| 2015/0188441 A1 | 7/2015 | Fang et al. |
| 2015/0295494 A1 | 10/2015 | Gong |
| 2015/0295499 A1 | 10/2015 | Zhang et al. |
| 2015/0311804 A1 | 10/2015 | Fang |
| 2015/0326130 A1 | 11/2015 | Zhang et al. |
| 2015/0334803 A1 | 11/2015 | Fang et al. |
| 2016/0028318 A1 | 1/2016 | Fang et al. |
| 2016/0218631 A1 | 7/2016 | Zhang et al. |
| 2016/0276939 A1 | 9/2016 | Fang et al. |
| 2016/0278178 A1 | 9/2016 | Fang et al. |
| 2016/0285375 A1 | 9/2016 | Fang et al. |
| 2016/0315543 A1 | 10/2016 | Zhang et al. |
| 2016/0329818 A1 | 11/2016 | Lin et al. |
| 2016/0354792 A1 | 12/2016 | Zhang et al. |
| 2017/0126137 A1 | 5/2017 | Zhang et al. |
| 2017/0187293 A1 | 6/2017 | Fang et al. |
| 2018/0042078 A1 | 2/2018 | Fang et al. |
| 2018/0042079 A1 | 2/2018 | Fang et al. |
| 2018/0076717 A1 | 3/2018 | Fang et al. |
| 2018/0109195 A1 | 4/2018 | Lin et al. |
| 2018/0109196 A1 | 4/2018 | Lin et al. |
| 2018/0124891 A1 | 5/2018 | Fang et al. |
| 2018/0131284 A1 | 5/2018 | Fang et al. |

FOREIGN PATENT DOCUMENTS

| | | |
|---|---|---|
| CN | 1917322 A | 2/2007 |
| CN | 1929274 A | 3/2007 |
| CN | 1964172 A | 5/2007 |
| CN | 1988347 A | 6/2007 |
| CN | 101034851 A | 9/2007 |
| CN | 101039075 A | 9/2007 |
| CN | 101039077 A | 9/2007 |
| CN | 101056063 A | 10/2007 |
| CN | 101079576 A | 11/2007 |
| CN | 101127495 A | 2/2008 |
| CN | 101164384 A | 4/2008 |
| CN | 201087939 Y | 7/2008 |
| CN | 101247083 A | 8/2008 |
| CN | 101248574 A | 8/2008 |
| CN | 101295872 A | 10/2008 |
| CN | 101350562 A | 1/2009 |
| CN | 101515756 A | 8/2009 |
| CN | 101552560 A | 10/2009 |
| CN | 101577468 A | 11/2009 |
| CN | 101577488 A | 11/2009 |
| CN | 101777848 A | 7/2010 |
| CN | 101826796 A | 9/2010 |
| CN | 101835311 A | 9/2010 |
| CN | 1882214 B | 5/2011 |
| CN | 102055344 A | 5/2011 |
| CN | 102065602 A | 5/2011 |
| CN | 102076138 A | 5/2011 |
| CN | 102076149 A | 5/2011 |
| CN | 102083257 A | 6/2011 |
| CN | 102105010 A | 6/2011 |
| CN | 102158091 A | 8/2011 |
| CN | 102164439 A | 8/2011 |
| CN | 102185466 A | 9/2011 |
| CN | 102187736 A | 9/2011 |
| CN | 102202449 A | 9/2011 |
| CN | 101515756 B | 11/2011 |
| CN | 102332826 A | 1/2012 |
| CN | 102361402 A | 2/2012 |

(56) References Cited

FOREIGN PATENT DOCUMENTS

| | | | |
|---|---|---|---|
| CN | 102437842 A | 5/2012 | |
| CN | 102474964 A | 5/2012 | |
| CN | 102624237 A | 8/2012 | |
| CN | 102638165 A | 8/2012 | |
| CN | 102651613 A | 8/2012 | |
| CN | 102651935 A | 8/2012 | |
| CN | 202435294 U | 9/2012 | |
| CN | 102709880 A | 10/2012 | |
| CN | 102723945 A | 10/2012 | |
| CN | 102983760 A | 3/2013 | |
| CN | 103108437 | 5/2013 | |
| CN | 103166198 A | 6/2013 | |
| CN | 103296904 A | 9/2013 | |
| CN | 103441660 A | 12/2013 | |
| JP | 2011171231 | 9/2011 | |
| TW | 185041 | 6/1992 | |
| TW | 583817 | 4/2004 | |
| TW | 200840174 A | 10/2008 | |
| TW | I 312914 | 8/2009 | |
| TW | 200937157 A | 9/2009 | |
| TW | I 338994 | 3/2011 | |
| TW | M412573 | 9/2011 | |
| TW | 201134078 | 10/2011 | |
| TW | I 357708 | 2/2012 | |
| TW | 201218594 | 5/2012 | |
| TW | 201249079 A | 12/2012 | |
| TW | I 362170 | 12/2012 | |
| TW | 201308842 A | 2/2013 | |
| TW | I 1437808 | 5/2014 | |
| TW | I 1448060 | 8/2014 | |
| WO | WO 2007/041897 A1 | 4/2007 | |

OTHER PUBLICATIONS

Chinese Patent Office, Office Action dated Jun. 4, 2014, in Application No. 201110144768.2.

Chinese Patent Office, Office Action dated Nov. 12, 2013, in Application No. 201110051423.2.

Chinese Patent Office, Office Action dated Nov. 14, 2013, in Application No. 201110224933.5.

Chinese Patent Office, Office Action dated Nov. 5, 2013, in Application No. 201210529679.4.

Chinese Patent Office, Office Action dated Dec. 4, 2015, in Application No. 201410226277.6.

Chinese Patent Office, Office Action dated Nov. 5, 2013, in Application No. 201310078547.9.

Chinese Patent Office, Office Action dated Nov. 25, 2015, in Application No. 201310656906.4.

Chinese Patent Office, Office Action dated Nov. 7, 2013, in Application No. 201210342097.5.

Taiwan Patent Office, Office Action dated Mar. 3, 2014, in Application No. 100127088.

Taiwan Patent Office, Office Action dated May 6, 2015, in Application No. 102116550.

Taiwan Patent Office, Office Action dated Oct. 1, 2014, in Application No. 102116551.

Taiwan Patent Office, Office Action dated Oct. 16, 2015, in Application No. 102116550.

Taiwan Patent Office, Office Action dated Oct. 6, 2014, in Application No. 102115002.

United States Patent and Trademark Office, Notice of Allowance dated Aug. 7, 2015, in U.S. Appl. No. 14/151,209.

United States Patent and Trademark Office, Notice of Allowance dated Nov. 16, 2015, in U.S. Appl. No. 14/151,209.

United States Patent and Trademark Office, Notice of Allowance dated Jan. 20, 2015, in U.S. Appl. No. 12/859,138.

United States Patent and Trademark Office, Notice of Allowance dated Jul. 30, 2014, in U.S. Appl. No. 12/859,138.

United States Patent and Trademark Office, Notice of Allowance dated Jun. 22, 2015, in U.S. Appl. No. 13/052,869.

United States Patent and Trademark Office, Notice of Allowance dated Oct. 2, 2015, in U.S. Appl. No. 13/052,869.

United States Patent and Trademark Office, Notice of Allowance dated Jan. 8, 2016, in U.S. Appl. No. 13/052,869.

United States Patent and Trademark Office, Corrected Notice of Allowability dated May 26, 2016, in U.S. Appl. No. 13/052,869.

United States Patent and Trademark Office, Notice of Allowance dated Oct. 2, 2015, in U.S. Appl. No. 13/722,788.

United States Patent and Trademark Office, Notice of Allowance dated Feb. 1, 2016, in U.S. Appl. No. 13/722,788.

United States Patent and Trademark Office, Notice of Allowance dated Oct. 5, 2015, in U.S. Appl. No. 13/915,477.

United States Patent and Trademark Office, Notice of Allowance dated Feb. 22, 2016, in U.S. Appl. No. 13/915,477.

United States Patent and Trademark Office, Notice of Allowance dated Sep. 30, 2015, in U.S. Appl. No. 13/857,836.

United States Patent and Trademark Office, Office Action dated Apr. 1, 2014, in U.S. Appl. No. 13/052,869.

United States Patent and Trademark Office, Office Action dated Aug. 20, 2015, in U.S. Appl. No. 13/646,268.

United States Patent and Trademark Office, Office Action dated May 17, 2016, in U.S. Appl. No. 13/646,268.

United States Patent and Trademark Office, Office Action dated Dec. 5, 2012, in U.S. Appl. No. 12/859,138.

United States Patent and Trademark Office, Office Action dated Feb. 15, 2013, in U.S. Appl. No. 13/052,869.

United States Patent and Trademark Office, Office Action dated Feb. 24, 2015, in U.S. Appl. No. 13/722,788.

United States Patent and Trademark Office, Office Action dated Jul. 31, 2013, in U.S. Appl. No. 12/859,138.

United States Patent and Trademark Office, Office Action dated Mar. 12, 2015, in U.S. Appl. No. 13/857,836.

United States Patent and Trademark Office, Notice of Allowance dated Feb. 10, 2016, in U.S. Appl. No. 13/857,836.

United States Patent and Trademark Office, Office Action dated Mar. 12, 2015, in U.S. Appl. No. 13/915,477.

United States Patent and Trademark Office, Office Action dated Nov. 5, 2014, in U.S. Appl. No. 13/052,869.

United States Patent and Trademark Office, Office Action dated Oct. 1, 2013, in U.S. Appl. No. 13/052,869.

United States Patent and Trademark Office, Office Action dated Mar. 7, 2016, in U.S. Appl. No. 14/293,280.

United States Patent and Trademark Office, Notice of Allowance dated Apr. 21, 2016, in U.S. Appl. No. 14/684,047.

United States Patent and Trademark Office, Office Action dated Apr. 20, 2016, in U.S. Appl. No. 14/488,176.

Chinese Patent Office, Office Action dated Apr. 24, 2014, in Application No. 201210099930.8.

Chinese Patent Office, Office Action dated Apr. 3, 2014, in Application No. 201210258359.X.

Chinese Patent Office, Office Action dated May 14, 2014, in Application No. 201110123187.0.

Chinese Patent Office, Office Action dated Nov. 22, 2013, in Application No. 201110376439.0.

Chinese Patent Office, Office Action dated Apr. 15, 2015, in Application No. 201410053176.3.

Liang et al., "Differential Detection Method of MOSFET Drain-source Voltage Valley Time," (Mar. 31, 2010).

Taiwanese Patent Office, Office Action dated Mar. 6, 2014, in Application No. 101102919.

Taiwanese Patent Office, Office Action dated Nov. 10, 2014, in Application No. 101118856.

Taiwanese Patent Office, Office Action dated Oct. 22, 2013, in Application No. 100120903.

Taiwanese Patent Office, Office Action dated Sep. 2, 2014, in Application No. 101144020.

Taiwanese Patent Office, Office Action dated Dec. 15, 2015, in Application No. 103140986.

United States Patent and Trademark Office, Office Action dated Jun. 9, 2015, in U.S. Appl. No. 14/536,514.

United States Patent and Trademark Office, Notice of Allowance dated Dec. 2, 2015, in U.S. Appl. No. 14/536,514.

(56) References Cited

OTHER PUBLICATIONS

United States Patent and Trademark Office, Office Action dated Nov. 18, 2015, in U.S. Appl. No. 14/273,339.
United States Patent and Trademark Office, Office Action dated Jul. 27, 2016, in U.S. Appl. No. 14/273,339.
United States Patent and Trademark Office, Office Action dated Feb. 22, 2016, in U.S. Appl. No. 14/726,295.
United States Patent and Trademark Office, Notice of Allowance dated Aug. 24, 2016, in U.S. Appl. No. 14/726,295.
United States Patent and Trademark Office, Office Action dated Aug. 10, 2016, in U.S. Appl. No. 14/728,815.
United States Patent and Trademark Office, Office Action dated Nov. 22, 2016, in U.S. Appl. No. 13/646,268.
United States Patent and Trademark Office, Notice of Allowance dated Sep. 22, 2016, in U.S. Appl. No. 14/293,280.
United States Patent and Trademark Office, Notice of Allowance dated Oct. 21, 2016, in U.S. Appl. No. 14/684,047.
United States Patent and Trademark Office, Notice of Allowance dated Oct. 13, 2016, in U.S. Appl. No. 14/488,176.
United States Patent and Trademark Office, Office Action dated Nov. 2, 2016, in U.S. Appl. No. 14/824,018.
United States Patent and Trademark Office, Office Action dated Dec. 27, 2016, in U.S. Appl. No. 15/054,026.
United States Patent and Trademark Office, Notice of Allowance dated Jan. 13, 2017, in U.S. Appl. No. 15/054,032.
Chinese Patent Office, Office Action dated Apr. 14, 2017, in Application No. 201510622975.2.
United States Patent and Trademark Office, Notice of Allowance dated Feb. 14, 2017, in U.S. Appl. No. 15/055,366.
United States Patent and Trademark Office, Notice of Allowance dated Apr. 14, 2017, in U.S. Appl. No. 14/273,339.
United States Patent and Trademark Office, Notice of Allowance dated Apr. 14, 2017, in U.S. Appl. No. 15/054,032.
United States Patent and Trademark Office, Notice of Allowance dated Apr. 19, 2017, in U.S. Appl. No. 14/728,815.
United States Patent and Trademark Office, Notice of Allowance dated Jul. 26, 2017, in U.S. Appl. No. 13/646,268.
United States Patent and Trademark Office, Office Action dated Jun. 30, 2017, in U.S. Appl. No. 14/824,018.
United States Patent and Trademark Office, Notice of Allowance dated Jul. 5, 2017, in U.S. Appl. No. 15/040,674.
United States Patent and Trademark Office, Office Action dated May 26, 2017, in U.S. Appl. No. 15/081,523.
United States Patent and Trademark Office, Office Action dated Mar. 30, 2017, in U.S. Appl. No. 15/376,290.
United States Patent and Trademark Office, Office Action dated Jun. 2, 2017, in U.S. Appl. No. 15/054,026.
United States Patent and Trademark Office, Notice of Allowance dated Jun. 29, 2017, in U.S. Appl. No. 15/054,032.
United States Patent and Trademark Office, Notice of Allowance dated Jun. 5, 2017, in U.S. Appl. No. 15/055,366.
United States Patent and Trademark Office, Notice of Allowance dated Jul. 12, 2017, in U.S. Appl. No. 14/728,815.
United States Patent and Trademark Office, Notice of Allowance dated Sep. 19, 2017, in U.S. Appl. No. 13/646,268.
United States Patent and Trademark Office, Notice of Allowance dated Sep. 11, 2017, in U.S. Appl. No. 15/040,674.
United States Patent and Trademark Office, Office Action dated Aug. 29, 2017, in U.S. Appl. No. 15/098,002.
United States Patent and Trademark Office, Office Action dated Oct. 4, 2017, in U.S. Appl. No. 15/099,419.
United States Patent and Trademark Office, Office Action dated Aug. 8, 2017, in U.S. Appl. No. 15/376,290.
United States Patent and Trademark Office, Office Action dated Dec. 29, 2016, in U.S. Appl. No. 15/040,674.
United States Patent and Trademark Office, Office Action dated Mar. 7, 2017, in U.S. Appl. No. 15/099,419.
United States Patent and Trademark Office, Notice of Allowance dated Jan. 24, 2018, in U.S. Appl. No. 14/273,339.
United States Patent and Trademark Office, Notice of Allowance dated Jan. 18, 2018, in U.S. Appl. No. 14/824,018.
United States Patent and Trademark Office, Notice of Allowance dated Nov. 14, 2017, in U.S. Appl. No. 14/824,018.
United States Patent and Trademark Office, Notice of Allowance dated Dec. 1, 2017, in U.S. Appl. No. 15/081,523.
United States Patent and Trademark Office, Notice of Allowance dated Nov. 17, 2017, in U.S. Appl. No. 15/376,290.
Chinese Patent Office, Office Action dated Oct. 10, 2017, in Application No. 201610177113.8.
Chinese Patent Office, Office Action dated Oct. 23, 2017, in Application No. 201610177276.6.
Chinese Patent Office, Office Action dated Dec. 25, 2017, in Application No. 201610177097.2.
United States Patent and Trademark Office, Notice of Allowance dated Sep. 21, 2017, in U.S. Appl. No. 14/273,339.
United States Patent and Trademark Office, Notice of Allowance dated Oct. 17, 2017, in U.S. Appl. No. 15/054,026.
United States Patent and Trademark Office, Notice of Allowance dated Dec. 18, 2017, in U.S. Appl. No. 15/054,026.
United States Patent and Trademark Office, Office Action dated Oct. 5, 2017, in U.S. Appl. No. 15/352,133.
Chinese Patent Office, Office Action dated Jul. 2, 2018, in Application No. 201610177276.6.
United States Patent and Trademark Office, Notice of Allowance dated Jun. 22, 2018, in U.S. Appl. No. 15/352,133.
United States Patent and Trademark Office, Notice of Allowance dated Sep. 20, 2018, in U.S. Appl. No. 15/352,133.
United States Patent and Trademark Office, Office Action dated Mar. 1, 2018, in U.S. Appl. No. 15/683,489.
United States Patent and Trademark Office, Notice of Allowance dated Feb. 12, 2018, in U.S. Appl. No. 15/707,184.
United States Patent and Trademark Office, Notice of Allowance dated Jun. 15, 2018, in U.S. Appl. No. 15/707,184.
United States Patent and Trademark Office, Notice of Allowance dated Aug. 9, 2018, in U.S. Appl. No. 15/683,402.
United States Patent and Trademark Office, Notice of Allowance datled Sep. 28, 2018, in U.S. Appl. No. 15/812,922.
United States Patent and Trademark Office, Office Action dated Oct. 4, 2018, in U.S Appl. No. 15/683,489.
United States Patent and Trademark Office, Notice of Allowance dated Feb. 23, 2018, in U.S. Appl. No. 15/081,523.
United States Patent and Trademark Office, Notice of Allowance dated Jun. 25, 2018, in U.S. Appl. No. 15/081,523.
United States Patent and Trademark Office, Office Action dated Feb. 23, 2018, in U.S. Appl. No. 15/098,002.
United States Patent and Trademark Office, Notice of Allowance dated Jul. 16, 2018, in U.S. Appl. No. 15/098,002.
United States Patent and Trademark Office, Office Action dated Mar. 20, 2018, in U.S. Appl. No. 15/835,344.
United States Patent and Trademark Office, Office Action dated Mar. 20, 2018, in U.S. Appl. No. 15/849,438.
United States Patent and Trademark Office, Notice of Allowance dated Sep. 20, 2018, in U.S. Appl. No. 15/849,438.
United States Patent and Trademark Office, Notice of Allowance dated Oct. 19, 2018, in U.S. Appl. No. 15/081,523.
United States Patent and Trademark Office, Notice of Allowance dated Nov. 23, 2018, in U.S. Appl. No. 15/098,002.
United States Patent and Trademark Office, Notice of Allowance dated Nov. 27, 2018, in U.S. Appl. No. 15/835,344.
United States Patent and Trademark Office, Office Action dated Nov. 19, 2018, in U.S. Appl. No. 16/014,685.
United States Patent and Trademark Office, Notice of Allowance dated Jan. 8, 2019, in U.S. Appl. No. 15/683,402.

\* cited by examiner

SYSTEMS AND METHODS FOR CONSTANT VOLTAGE MODE AND CONSTANT CURRENT MODE IN FLYBACK POWER CONVERTERS WITH PRIMARY-SIDE SENSING AND REGULATION

1. CROSS-REFERENCES TO RELATED APPLICATIONS

This application is a continuation of U.S. patent application Ser. No. 13/915,477, filed Jun. 11, 2013, which is a continuation of U.S. patent application Ser. No. 13/071,384, filed Mar. 24, 2011, which claims priority to Chinese Patent Application No. 201110051423.2, filed Feb. 28, 2011, all of which are commonly assigned and incorporated by reference herein for all purposes. Additionally, U.S. patent application Ser. No. 13/071,384, filed Mar. 24, 2011, is a continuation-in-part of U.S. patent application Ser. No. 12/581,775, filed Oct. 19, 2009, which claims priority to U.S. Provisional No. 61/107,249, filed Oct. 21, 2008, all three applications being commonly assigned and incorporated by reference herein for all purposes.

Additionally, this application is related to U.S. patent application Ser. No. 12/502,866, commonly assigned, incorporated by reference herein for all purposes.

2. BACKGROUND OF THE INVENTION

The present invention is directed to integrated circuits. More particularly, the invention provides systems and methods for constant voltage mode and constant current mode. Merely by way of example, the invention has been applied to a flyback power converter with primary-side sensing and regulation. But it would be recognized that the invention has a much broader range of applicability.

Flyback power converters have been used extensively for their simple structures and low costs in low power applications. But in traditional flyback converters, the output voltage regulation often is performed with secondary-side feedback, using an isolated arrangement of TL431 and an opto-coupler. In addition to increasing the system cost, the voltage drop due to the cable loss usually is difficult to compensate.

FIG. 1 is a simplified conventional diagram for a switch-mode flyback power conversion system with secondary-side control. As shown in FIG. 1, a PWM controller 110 is used to control and drive a power MOSFET M1. The power MOSFET M1 is turned on and off to control the power delivered to the load on the secondary side. Consequently, the constant output voltage (CV) mode and the constant output current (CC) mode may be achieved by the secondary-side regulation.

FIG. 2 is a simplified conventional diagram showing characteristics of output voltage and output current of a flyback power conversion system. As shown in FIG. 2, if the output current $I_o$ is in the range of from zero to $I_{max}$, the system operates in the constant voltage (CV) mode. In the CV mode, the output voltage $V_o$ is, for example, equal to $V_{max}$. Alternatively, if the output voltage is below $V_{max}$, the system may operate in the constant current (CC) mode. In the CC mode, the output current $I_o$ is, for example, equal to $I_{max}$. In another example, if the output terminal of the system is connected to a discharged battery, the system operates in the CC mode.

To reduce cost and size of the switch-mode flyback power converter and to also improve its efficiency, the power converter with primary-side regulation has become more and more popular. With the primary-side regulation, the output voltage is sensed by detecting the voltage of an auxiliary winding that is tightly coupled to the secondary winding. Since the voltage of the auxiliary winding images the output voltage that is associated with the secondary winding, the voltage sensed in the auxiliary winding can be utilized to regulate the secondary-side output voltage. The expensive parts of TL431 and opto-coupler usually are not needed, so the cost and size can be reduced. Additionally, using sensed information of the output voltage, the output current can be regulated based on internal computation of the controller. Therefore the sensing resistor for output current often is not needed, so the overall conversion efficiency can be improved.

FIG. 3 is a simplified conventional diagram for a switch-mode flyback power conversion system with primary-side sensing and regulation. FIG. 4 is another simplified conventional diagram for a switch-mode flyback power conversion system with primary-side sensing and regulation.

As shown, the output voltage $V_{out}$ is mapped to the DC voltage $V_{INV}$ at the node INV, and is therefore regulated through the regulation of $V_{INV}$. With primary-side regulation, the relationship of $V_{INV}$ and $V_{out}$ can be expressed as:

$$V_{INV} = \frac{n \times R_2}{R_1 + R_2} \times (V_{out} + V_{D2}) - \frac{R_2}{R_1 + R_2} \times V_{D1} \quad (1)$$

where n is the ratio of auxiliary-winding turns to secondary-winding turns. Additionally, $V_{D1}$ and $V_{D2}$ are the forward diode drop voltages.

Setting $$k = \frac{R_1 + R_2}{n \times R_2},$$

$V_{out}$ is therefore given by:

$$V_{out} = k \times V_{INV} + \frac{1}{n} V_{D1} - V_{D2} \quad (2)$$

The output voltage is regulated through the regulation of the voltage for the auxiliary winding. For example, the sensed voltage, $V_{INV}$, is compared with a predetermined voltage level, $V_{REF}$. The difference between $V_{INV}$ and $V_{REF}$ is associated with an error signal, which is amplified by an error amplifier. Based at least in part on the amplified error signal, a PWM/PFM signal is generated.

The PWM/PFM signal controls turning on/off of a power switch and thus controls the power delivered to the secondary side. As a result, the difference between $V_{INV}$ and $V_{REF}$ becomes smaller and smaller, and eventually $V_{INV}$ becomes equal to $V_{REF}$. Since $V_{INV}$ is the image of the output voltage $V_{out}$, the output voltage $V_{out}$ can be linearly dependent on $V_{INV}$ and thus $V_{REF}$, if certain conditions are satisfied.

Specifically, as shown below, the output voltage $V_{out}$ linearly depends on $V_{REF}$ if the forward voltage across diodes D1 and D2 are constant.

$$V_{out} = k \times V_{REF} + \frac{1}{n} V_{D1} - V_{D2} \quad (3)$$

But the forward voltage of a diode often depends on the current that flows through the diode. Hence the forward voltage of D2 changes if the load current changes. The forward voltage of D1 is almost constant since the current flowing through D1 does not change even if the output load current changes.

FIG. 5 is yet another simplified conventional diagram for a switch-mode flyback power conversion system with primary-side sensing and regulation. The power conversion system 2000 includes a primary winding 2010, a secondary winding 2012, an auxiliary winding 2014, a power switch 2020, a current sensing resistor 2030, an equivalent resistor 2040 for an output cable, resistors 2050 and 2052, and rectifying diodes 2060 and 2062. For example, the power switch 2020 is an NPN bipolar transistor. In another example, the power switch 2020 is a MOSFET transistor. In yet another example, the power switch 2020 is an IGBT transistor.

As shown in FIG. 5, to regulate the output voltage within a predetermined range, information related to the output voltage and the output loading often needs to be extracted. In the discontinuous conduction mode (DCM), such information can be extracted through the auxiliary winding 2014. When the power switch 2020 is turned on, the energy is stored in the secondary winding 2012. Then, when the power switch 2020 is turned off, the stored energy is released to the output terminal, and the voltage of the auxiliary winding 2014 maps the output voltage on the secondary side as shown below.

$$V_{FB} = \frac{1}{k} \times (V_o + V_{D2} + I_o \times R_{eq}) - \frac{V_{D1}}{k \times n} \quad (4)$$

where $V_{FB}$ represents a voltage at a node 2054. $R_1$ and $R_2$ represent the resistance values of the resistors 2050 and 2052 respectively. Additionally, n represents a turns ratio between the auxiliary winding 2014 and the secondary winding 2012. Specifically, n is equal to the number of turns of the auxiliary winding 2014 divided by the number of turns of the secondary winding 2012. $V_o$ and $I_o$ represent the output voltage and the output current respectively. Moreover, $V_{D1}$ represents the forward voltage of the rectifying diode 2062, and $V_{D2}$ represents the forward voltage of the rectifying diode 2060 respectively. Also, $R_{eq}$ represents the resistance value of the equivalent resistor 2040, and k represents a feedback coefficient equal to $$\frac{R_1 + R_2}{n \times R_2}.$$

FIG. 6 is a simplified diagram showing a conventional operation mechanism for the flyback power conversion system 2000. As shown in FIG. 6, the controller chip of the conversion system 2000 uses a sample-and-hold mechanism. When the demagnetization process on the secondary side is almost completed and the current $I_{sec}$ of the secondary winding 2012 almost becomes zero, the voltage $V_{FB}$ at the node 2054 (which is proportional to $V_{aux}$ of the auxiliary winding 2012) is sampled at, for example, point A of FIG. 6. The sampled voltage value is usually held until the next voltage sampling is performed. Through a negative feedback loop, the sampled voltage value can become equal to a reference voltage $V_{REF}$. Therefore, $$V_{FB} = V_{REF} \quad (5)$$

Combining Equations 4 and 5, the following can be obtained:

$$V_o = k \times V_{REF} + \frac{1}{n} V_{D1} - V_{D2} - I_o \times R_{eq} \quad (6)$$

Based on Equation 6, the output voltage decreases with the increasing output current. Additionally, the control scheme as described above often has poor regulation for output voltage due to the change in the forward voltage of the diode D2.

Furthermore, if the power conversion system 2000 operates in the discontinuous conduction mode (DCM), the output current can also be regulated in order to achieve a constant output current. As shown in FIG. 6, the output current is equal to the average value of the current $I_{sec}$ of the secondary winding 2012 in each switching cycle as shown below:

$$I_o = \frac{1}{2} \times I_{sec\_pk} \times \frac{T_{Demag}}{T_s} \quad (7)$$

$$\text{Therefore, } I_o = \frac{1}{2} \times N \times \frac{1}{T} \times \int_0^T \frac{V_{cs\_pek}}{R_s} \times \frac{T_{Demag}}{T_s} dt \quad (8)$$

where N represents a turns ratio between the primary winding 2010 and the secondary winding 2012. Specifically, N is equal to the number of turns of the primary winding 2010 divided by the number of turns of the secondary winding 2012. Additionally, T represents an integration period, and $T_s$ represents a switching period that is equal to the inverse of the switching frequency of the power conversion system 2000. For example, T is equal to or larger than $T_s$. Moreover, $R_s$ represents the resistance value of the current sensing resistor 2030. Also, $V_{cs\_pk}$ represents the peak value of the sensed voltage $V_{cs}$ by the current sensing resistor 2030 within each switching cycle, and $T_{Demag}$ represents duration of the demagnetization process within each switching cycle. According to some conventional technology, the output current may depend on the inductance of the primary winding; therefore the output current often suffers from large variations, which usually cannot be effectively compensated in mass production.

Hence it is highly desirable to improve techniques for output voltage regulation and output current control, such as primary-winding inductance compensation, is highly desirable.

3. BRIEF SUMMARY OF THE INVENTION

The present invention is directed to integrated circuits. More particularly, the invention provides systems and methods for constant voltage mode and constant current mode. Merely by way of example, the invention has been applied to a flyback power converter with primary-side sensing and regulation. But it would be recognized that the invention has a much broader range of applicability.

According to one embodiment, a system for regulating a power converter includes a first signal generator configured to receive at least an input signal and generate at least a first output signal associated with demagnetization and a second output signal associated with sampling. Additionally, the system includes a sampling component configured to receive at least the input signal and the second output signal, sample the input signal based on at least information associated with the second output signal, and generate at least a third output signal associated with one or more sampled magnitudes. Moreover, the system includes an error amplifier configured to receive at least the third output signal and a first threshold voltage and generate at least a fourth output signal with a capacitor, the capacitor being coupled to the error amplifier. Also, the system includes a compensation component configured to receive at least the fourth output signal and generate at least a compensation signal. The input signal is a combination of the compensation signal and a first sensed signal. The first sensed signal is associated with a first winding coupled to a secondary winding for a power converter, and the secondary winding is related to an output current and an output voltage for the power converter. Additionally, the system includes the first controller for regulating at least the output current. For example, the first controller is configured to receive at least the first output signal and the third output signal and generate at least a first control signal based on at least information associated with the first output signal and the third output signal. Moreover, the system includes a second controller for regulating at least the output voltage. For example, the second controller being configured to receive at least the fourth output signal and generate at least a second control signal and a third control signal based on at least information associated with the fourth output signal. Also, the system includes an oscillator configured to receive at least the first control signal and the second control signal and generate at least a clock signal, and a second signal generator configured to receive at least the clock signal, the third control signal, and a fourth control signal, and generate at least a modulation signal. Additionally, the system includes a gate driver configured to receive at least the modulation signal and output at least a drive signal to a switch. For example, the switch is configured to affect a first current flowing through a primary winding coupled to the secondary winding. Moreover, the system includes a third controller for regulating at least a peak current. For example, the third controller being configured to receive the third control signal, a second sensed signal, and a second threshold voltage, and output the fourth control signal to the second signal generator. In another example, the second sensed signal is associated with the first current flowing through the primary winding for the power converter.

According to another embodiment, a system for regulating a power converter includes a sampling component configured to receive at least an input signal, sample the input signal, and generate at least a first output signal associated with one or more sampled magnitudes. For example, the input signal being associated with at least a first winding coupled to a secondary winding for a power converter, and the secondary winding is related to an output current and an output voltage for the power converter. Additionally, the system includes an error amplifier configured to receive at least the first output signal and a threshold voltage, generate a second output signal with a capacitor, and generate a third output signal, the capacitor being coupled to the error amplifier. Moreover, the system includes a feed forward component configured to receive the third output signal and generate a fourth output signal based on at least information associated with the third output signal, and a controller for regulating at least the output voltage. For example, the controller is configured to receive at least the second output signal and the fourth output signal, and generate at least a first control signal. Also, the system includes a signal generator configured to receive at least the first control signal and generate at least a modulation signal based on at least information associated with the first control signal, and a gate driver configured to receive at least the modulation signal and output at least a drive signal to a switch. For example, the switch is configured to affect a first current flowing through a primary winding coupled to the secondary winding.

According to yet another embodiment, a system for regulating a power converter includes a sampling component configured to receive at least an input signal, sample the input signal, and generate at least a first output signal associated with one or more sampled magnitudes, and an error amplifier configured to receive at least the first output signal and a threshold voltage, generate a second output signal with a capacitor, and generate a third output signal, the capacitor being coupled to the error amplifier. Additionally, the system includes a feed forward component configured to receive the third output signal and generate a fourth output signal based on at least information associated with the third output signal, and a controller configured to receive at least the second output signal and the fourth output signal, and generate at least a control signal. Moreover, the system includes a compensation component configured to receive at least the second output signal and generate at least a compensation signal based on at least information associated with the second output signal, the input signal being a combination of the compensation signal and another signal.

According to yet another embodiment, a system for regulating a power converter includes a first signal generator configured to receive at least an input signal and generate at least a first output signal associated with demagnetization and a second output signal associated with sampling. For example, the input signal is associated with at least a first winding coupled to a secondary winding for a power converter, and the secondary winding is related to an output current and an output voltage for the power converter. Additionally, the system includes a sampling component configured to receive at least the input signal and the second output signal, sample the input signal based on at least information associated with the second output signal, and generate at least a third output signal associated with one or more sampled magnitudes. Moreover, the system includes a first controller for regulating at least the output current, which is configured to receive at least the first output signal and the third output signal and generate at least a first control signal based on at least information associated with the first output signal and the third output signal. Also, the system includes an oscillator configured to receive at least the first control signal and generate at least a clock signal based on at least information associated with the first control signal, and a second signal generator configured to receive at least the clock signal and a second control signal, and generate at least a modulation signal based on at least information associated with the clock signal and the second control signal. Additionally, the system includes a gate driver configured to receive at least the modulation signal and output at least a drive signal to a switch. For example, the switch is configured to affect a first current flowing through a primary winding coupled to the secondary winding. Moreover, the system includes a third controller for regulating at least a peak current is configured to receive at least a sensed signal and a threshold voltage, and output the second control signal to the second signal generator. For example, the sensed signal is associated with the first current flowing through the primary winding for the power converter. The modulation signal corresponds to a switching frequency, and the first output signal corresponds to a demagnetization pulse width.

According to yet another embodiment, a system for regulating a power converter includes a controller for regulating at least a peak current. For example, the controller is configured to receive at least a sensed signal and a first threshold voltage and generate at least a first control signal, and the sensed signal is associated with a first current flowing through a primary winding for a power converter. Additionally, the system includes a signal generator configured to receive at least the first control signal and generate at least a modulation signal, and a gate driver configured to receive at least the modulation signal and output at least a drive signal to a switch. For example, the switch is configured to affect the first current. In another example, the controller includes a first comparator configured to receive the sensed signal and the first threshold voltage and generate a comparison signal based on at least information associated with the sensed signal and the first threshold voltage, and a charge pump configured to receive the comparison signal and generate a second control signal based on at least information associated with the comparison signal. Additionally, the controller includes a threshold generator configured to receive the second control signal and generate a second threshold voltage based on at least information associated with the second control signal, and a second comparator configured to receive the second threshold voltage and the sensed signal and generate the first control signal based on at least information associated with the second threshold voltage and the sensed signal.

According to yet another embodiment, a method for regulating a power converter includes receiving at least an input signal by a first signal generator, and generating at least a first output signal associated with demagnetization and a second output signal associated with sampling based on at least information associated with the input signal. Additionally, the method includes receiving at least the input signal and the second output signal by a sampling component, sampling the input signal based on at least information associated with the second output signal, generating at least a third output signal associated with one or more sampled magnitudes, receiving at least the third output signal and a first threshold voltage by an error amplifier, and generating at least a fourth output signal with a capacitor coupled to the error amplifier. Moreover, the method includes receiving at least the fourth output signal by a compensation component, and generating at least a compensation signal based on at least information associated with the fourth output signal. For example, the input signal is a combination of the compensation signal and a first sensed signal. In another example, the first sensed signal is associated with a first winding coupled to a secondary winding for a power converter, and the secondary winding is related to an output current and an output voltage for the power converter. Also, the method includes receiving at least the first output signal and the third output signal by a first controller for regulating at least the output current, generating at least a first control signal based on at least information associated with the first output signal and the third output signal, receiving at least the fourth output signal by a second controller for regulating at least the output voltage, and generating at least a second control signal and a third control signal based on at least information associated with the fourth output signal. Additionally, the method includes receiving at least the first control signal and the second control signal by an oscillator, generating at least a clock signal by the oscillator, receiving at least the clock signal, the third control signal, and a fourth control signal by a second signal generator, and generating at least a modulation signal by the second signal generator. Moreover, the method includes receiving at least the modulation signal by a gate driver, outputting at least a drive signal to a switch to affect a first current flowing through a primary winding coupled to the secondary winding, receiving the third control signal, a second sensed signal, and a second threshold voltage by a third controller for regulating at least a peak current; and outputting the fourth control signal to the second signal generator. For example, the second sensed signal is associated with the first current flowing through the primary winding for the power converter.

According to yet another embodiment, a method for regulating a power converter includes receiving at least an input signal by a sampling component. For example, the input signal is associated with at least a first winding coupled to a secondary winding for a power converter, and the secondary winding is related to an output current and an output voltage for the power converter. Additionally, the method includes sampling the input signal by the sampling component, generating at least a first output signal associated with one or more sampled magnitudes, receiving at least the first output signal and a threshold voltage by an error amplifier, and generating a second output signal with a capacitor coupled to the error amplifier. Moreover, the method includes generating a third output signal by the error amplifier, receiving the third output signal by a feed forward component, generating a fourth output signal based on at least information associated with the third output signal, receiving at least the second output signal and the fourth output signal by a controller for regulating at least the output voltage, and generating at least a first control signal based on at least information associated with the second output signal and the fourth output signal. Also, the method includes receiving at least the first control signal by a signal generator, generating at least a modulation signal based on at least information associated with the first control signal, receiving at least the modulation signal by a gate driver, and outputting at least a drive signal to a switch to affect a first current flowing through a primary winding coupled to the secondary winding.

According to yet another embodiment, a method for regulating a power converter includes receiving at least an input signal by a sampling component, sampling the input signal by the sampling component, and generating at least a first output signal associated with one or more sampled magnitudes. Additionally, the method includes receiving at least the first output signal and a threshold voltage by an error amplifier, generating a second output signal with a capacitor coupled to the error amplifier based on at least information associated with the first output signal and the threshold voltage, and generating a third output signal based on at least information associated with the first output signal and the threshold voltage. Moreover, the method includes receiving the third output signal by a feed forward component, generating a fourth output signal based on at least information associated with the third output signal, receiving at least the second output signal and the fourth output signal by a controller, and generating at least a control signal based on at least information associated with the second output signal and the fourth output signal. Also, the method includes receiving at least the second output signal by a compensation component, and generating at least a compensation signal based on at least information associated with the second output signal, the input signal being a combination of the compensation signal and another signal.

According to yet another embodiment, a method for regulating a power converter includes receiving at least an input signal by a first signal generator. For example, the input signal is associated with at least a first winding coupled to a secondary winding for a power converter, and the secondary winding is related to an output current and an output voltage for the power converter. Additionally, the method includes generating at least a first output signal associated with demagnetization and a second output signal associated with sampling based on at least information associated with the input signal, receiving at least the input signal and the second output signal by a sampling component, sampling the input signal based on at least information associated with the second output signal, and generating at least a third output signal associated with one or more sampled magnitudes. Moreover, the method includes receiving at least the first output signal and the third output signal by a first controller for regulating at least the output current, generating at least a first control signal based on at least information associated with the first output signal and the third output signal, receiving at least the first control signal by an oscillator, and generating at least a clock signal based on at least information associated with the first control signal. Also, the method includes receiving at least the clock signal and a second control signal by a second signal generator, generating at least a modulation signal based on at least information associated with the clock signal and the second control signal, receiving at least the modulation signal by a gate driver, and outputting at least a drive signal to a switch to affect a first current flowing through a primary winding coupled to the secondary winding. Additionally, the method includes receiving at least a sensed signal and a threshold voltage by a third controller for regulating at least a peak current, and outputting the second control signal to the second signal generator. The sensed signal being associated with the first current flowing through the primary winding for the power converter, the modulation signal corresponds to a switching frequency, and the first output signal corresponds to a demagnetization pulse width.

According to yet another embodiment, a method for regulating a power converter includes receiving at least a sensed signal and a first threshold voltage by a controller for regulating at least a peak current. For example, the sensed signal is associated with a first current flowing through a primary winding for a power converter. Additionally, the method includes generating at least a first control signal based on at least information associated with the sensed signal and the first threshold voltage, receiving at least the first control signal by a signal generator, generating at least a modulation signal based on at least information associated with the first control signal, receiving at least the modulation signal by a gate driver, and outputting at least a drive signal to a switch to affect the first current. The process for generating at least a first control signal includes receiving the sensed signal and the first threshold voltage by a first comparator, generating a comparison signal based on at least information associated with the sensed signal and the first threshold voltage, receiving the comparison signal by a charge pump, generating a second control signal based on at least information associated with the comparison signal, receiving the second control signal by a threshold generator, generating a second threshold voltage based on at least information associated with the second control signal, receiving the second threshold voltage and the sensed signal by a second comparator, and generating the first control signal based on at least information associated with the second threshold voltage and the sensed signal.

Many benefits are achieved by way of the present invention over conventional techniques. Certain embodiments of the present invention can reduce parts count and/or decrease system cost. Some embodiments of the present invention can improve reliability and/or efficiency. Certain embodiments of the present invention can simplify circuit design in switch mode flyback power converters. Some embodiments of the present invention provide a primary side sensing and regulation scheme. For example, the primary side sensing and regulation scheme can improve the load regulation. In another example, the primary side sensing and regulation scheme can compensate the primary winding inductance variation to achieve constant output current in a flyback converter that employs the primary side regulation. Certain embodiments of the present invention can provide, in the CC mode, a constant output current that does not change as primary winding inductance changes.

According to yet another embodiment, a system for regulating a power converter includes a first signal generator configured to receive a first sensed signal and generate an output signal associated with demagnetization. The first sensed signal is related to a first winding coupled to a secondary winding for a power converter, and the secondary winding is associated with at least an output current for the power converter. Additionally, the system includes a ramping signal generator configured to receive the output signal and generate a ramping signal, and a first comparator configured to receive the ramping signal and a first threshold signal and generate a first comparison signal based on at least information associated with the ramping signal and the first threshold signal. Moreover, the system includes a second comparator configured to receive a second sensed signal and a second threshold signal and generate a second comparison signal. The second sensed signal is associated with a first current flowing through a primary winding coupled to the secondary winding for the power converter. Also, the system includes a second signal generator configured to receive at least the first comparison signal and the second comparison signal and generate a modulation signal, and a gate driver configured to receive the modulation signal and output a drive signal to a switch. The switch is configured to affect the first current flowing through the primary winding. The output signal is associated with a demagnetization duration, and the drive signal is associated with a switching period. The system is further configured to keep a ratio of the demagnetization duration to the switching period constant.

According to yet another embodiment, a method or regulating a power converter includes receiving a first sensed signal. The first sensed signal is associated with a first winding coupled to a secondary winding for a power converter, and the secondary winding is related to at least an output current for the power converter. Additionally, the method includes generating an output signal based on at least information associated with the first sensed signal. The output signal is related to demagnetization. Moreover, the method includes receiving the output signal, generating a ramping signal based on at least information associated with the output signal, receiving the ramping signal and a first threshold signal, processing information associated with the ramping signal and the first threshold signal, and generating a first comparison signal based on at least information associated with the ramping signal and the first threshold signal. Also, the method includes receiving a second sensed signal and a second threshold signal. The second sensed signal is associated with a first current flowing through a primary winding coupled to the secondary winding for the power converter. Additionally, the method includes processing information associated with the second sensed signal and the second threshold signal, generating a second comparison signal based on at least information associated with the second sensed signal and the second threshold signal, receiving the first comparison signal and the second comparison signal, processing information associated with the first comparison signal and the second comparison signal, and generating a modulation signal based on at least information associated with the first comparison signal and the second comparison signal. Moreover, the method includes receiving the modulation signal, and outputting to a switch a drive signal based on at least information associated with the modulation signal to affect the first current flowing through the primary winding. The output signal is associated with a demagnetization duration, and the drive signal is associated with a switching period. A ratio of the demagnetization duration to the switching period is kept constant.

According to yet another embodiment, a system for regulating a power converter includes a first signal generator configured to receive at least an input signal and generate at least an output signal associated with demagnetization, the input signal being related to at least an output current for a power converter. Additionally, the system includes a first controller configured to receive at least the output signal and generate at least a first control signal based on at least information associated with the output signal, and a second controller configured to receive a first sensed signal and a first threshold signal and generate a second control signal. The first sensed signal is associated with a first current flowing through a primary winding for the power converter. Moreover, the system includes an oscillator configured to receive at least the first control signal and generate at least a clock signal based on at least information associated with the first control signal, and a second signal generator configured to receive at least the clock signal and the second control signal and generate at least a modulation signal. Also, the system includes a gate driver configured to receive at least the modulation signal and output at least a drive signal to a switch. The switch is configured to affect the first current flowing through the primary winding. The output signal is associated with a demagnetization duration, and the drive signal is associated with a switching period. The system is further configured to keep a ratio of the demagnetization duration to the switching period constant, and keep a peak of the first sensed signal constant in magnitude.

According to yet another embodiment, a method for regulating a power converter includes receiving at least an input signal, and generating at least an output signal based on at least information associated with the input signal. The input signal is related to at least an output current for a power converter, and the output signal is related to demagnetization. Additionally, the method includes receiving at least the output signal, processing information associated with the output signal, and generating at least a clock signal based on at least information associated with the output signal. Moreover, the method includes receiving a sensed signal and a threshold signal. The sensed signal is associated with a first current flowing through a primary winding for the power converter. Also, the method includes processing information associated with the sensed signal and the threshold signal, generating a control signal based on at least information associated with the sensed signal and the threshold signal, receiving at least the clock signal and the control signal, processing information associated with the clock signal and the control signal, and generating at least a modulation signal based on at least information associated with the clock signal and the control signal. Additionally, the method includes receiving at least the modulation signal, and outputting to a switch at least a drive signal based on at least information associated with the modulation signal to affect the first current flowing through the primary winding. The output signal is associated with a demagnetization duration, and the drive signal is associated with a switching period. A ratio of the demagnetization duration to the switching period is kept constant, and a peak of the first sensed signal is kept constant in magnitude.

According to yet another embodiment, a system for regulating a power converter includes a first signal generator configured to receive a first sensed signal and generate a first output signal associated with demagnetization. The first sensed signal is associated with a first winding coupled to a secondary winding for a power converter, and the secondary winding is related to at least an output current for the power converter. Additionally, the system includes a first ramping signal generator configured to receive the first output signal and generate a first ramping signal, and a first comparator configured to receive the first ramping signal and a first threshold signal and generate a first comparison signal based on at least information associated with the first ramping signal and the first threshold signal. Moreover, the system includes a peak detector configured to receive a drive signal and a second sensed signal and generate a peak signal. The second sensed signal is associated with a first current flowing through a primary winding coupled to the secondary winding for the power converter. Also, the system includes an amplifier configured to receive the peak signal and a second threshold signal and generate a second output signal with a capacitor, the capacitor being coupled to the amplifier, and a second comparator configured to receive the second output signal and a second ramping signal and generate a second comparison signal. Additionally, the system includes a second signal generator configured to receive at least the first comparison signal and the second comparison signal and generate a modulation signal, and a gate driver configured to receive the modulation signal and output the drive signal to the peak detector and a switch. The switch is configured to affect the first current flowing through the primary winding.

According to yet another embodiment, a method for regulating a power converter includes receiving a first sensed signal. The first sensed signal is associated with a first winding coupled to a secondary winding for a power converter, and the secondary winding is related to at least an output current for the power converter. Additionally, the method includes generating a first output signal based on at least information associated with the first sensed signal, receiving the first output signal, and generating a first ramping signal based on at least information associated with the first output signal. The first output signal is related to demagnetization. Moreover, the method includes receiving the first ramping signal and a first threshold signal, processing information associated with the first ramping signal and the first threshold signal, generating a first comparison signal based on at least information associated with the first ramping signal and the first threshold signal, and receiving a drive signal and a second sensed signal. The second sensed signal is associated with a first current flowing through a primary winding coupled to the secondary winding for the power converter. Also, the method includes processing information associated with the drive signal and the second sensed signal, generating a peak signal based on at least information associated with the drive signal and the second sensed signal, receiving the peak signal and a second threshold signal, processing information associated with the peak signal and the second threshold signal, and generating a second output signal based on at least information associated with the peak signal and the second threshold signal. Additionally, the method includes receiving the second output signal and a second ramping signal, processing information associated with the second output signal and the second ramping signal, and generate a second comparison signal based on at least information associated with the second output signal and the second ramping signal. Moreover, the method includes receiving the first comparison signal and the second comparison signal, processing information associated with the first comparison signal and the second comparison signal, and generating a modulation signal based on at least information associated with the first comparison signal and the second comparison signal. Also, the method includes receiving the modulation signal, and outputting the drive signal based on at least information associated with the modulation signal to affect the first current flowing through the primary winding.

According to yet another embodiment, a system for regulating a power converter includes a first signal generator configured to receive a first sensed signal and generate an output signal associated with demagnetization. The first sensed signal is associated with a first winding coupled to a secondary winding for a power converter, and the secondary winding is related to at least an output current for the power converter. Additionally, the system includes a peak detector configured to receive a drive signal and a second sensed signal and generate a peak signal. The second sensed signal is associated with a first current flowing through a primary winding coupled to the secondary winding for the power converter. Moreover, the system includes a second signal generator configured to process at least information associated with the output signal and the peak signal and generate a modulation signal. Also, the system includes a gate driver configured to receive the modulation signal and output the drive signal to the peak detector and a switch. The switch is configured to affect the first current flowing through the primary winding. The output signal is associated with a demagnetization duration, and the drive signal is associated with a switching period. The system is further configured to keep a ratio of the demagnetization duration to the switching period constant, and keep an average magnitude of the peak signal over a first duration constant.

According to yet another embodiment, a method for regulating a power converter includes receiving a first sensed signal. The first sensed signal is associated with a first winding coupled to a secondary winding for a power converter, and the secondary winding is related to at least an output current for the power converter. Additionally, the method includes generating an output signal based on at least information associated with the first sensed signal, receiving a drive signal and a second sensed signal, and processing information associated with the drive signal and the second sensed signal. The first sensed signal is related to demagnetization, and the second sensed signal is associated with a first current flowing through a primary winding coupled to the secondary winding for the power converter. Moreover, the method includes generating a peak signal based on at least information associated with the drive signal and the second sensed signal, processing at least information associated with the output signal and the peak signal, and generating a modulation signal based on at least information associated with the output signal and the peak signal. Also, the method includes receiving the modulation signal, and outputting to a switch the drive signal based on at least information associated with the modulation signal to at least affect the first current flowing through the primary winding. The output signal is associated with a demagnetization duration, and the drive signal is associated with a switching period. A ratio of the demagnetization duration to the switching period is kept constant, and an average magnitude of the peak signal over a first duration is kept constant.

According to yet another embodiment, a system for regulating a power converter includes a first signal generator configured to receive a first sensed signal and generate a first output signal associated with demagnetization. The first sensed signal is related to a first winding coupled to a secondary winding for a power converter, and the secondary winding is associated with at least an output current for the power converter. Additionally, the system includes a peak detector configured to receive a drive signal and a second sensed signal and generate a peak signal. The second sensed signal is associated with a first current flowing through a primary winding coupled to the secondary winding for the power converter. Moreover, the system includes a second signal generator configured to receive the drive signal, the first output signal, and the peak signal, and generate a second output signal, and an amplifier configured to receive the second output signal and a threshold signal and generate a third output signal with a capacitor, the capacitor being coupled to the amplifier. Also, the system includes a comparator configured to receive the third output signal and a ramping signal and generate a comparison signal, and a third signal generator configured to receive at least the comparison signal and a clock signal and generate a modulation signal. Additionally, the system includes a gate driver configured to receive the modulation signal and output the drive signal to the peak detector, the second signal generator and a switch. The switch is configured to affect the first current flowing through the primary winding.

According to yet another embodiment, a method for regulating a power converter includes receiving a first sensed signal. The first sensed signal is associated with a first winding coupled to a secondary winding for a power converter, and the secondary winding is related to at least an output current for the power converter. Additionally, the method includes generating a first output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and the second sensed signal, and generating a peak signal based on at least information associated with the drive signal and the second sensed signal. Also, the method includes receiving the drive signal, the first output signal, and the peak signal, processing information associated with the drive signal, the first output signal, and the peak signal, and generating a second output signal based on at least information associated with the drive signal, the first output signal, and the peak signal. Additionally, the method includes receiving the second output signal and a threshold signal, processing information associated with the second output signal and the threshold signal, and generating a third output signal based on at least information associated with the second output signal and the threshold signal. Moreover, the method includes receiving the third output signal and a ramping signal, processing information associated with the third output signal and the ramping signal, and generating a comparison signal based on at least information associated with the third output signal and the ramping signal. Also, the method includes receiving the comparison signal and a clock signal, processing information associated with the comparison signal and the clock signal, and generating a modulation signal based on at least information associated with the comparison signal and the clock signal. Additionally, the method includes receiving the modulation signal, and outputting the drive signal based on at least information associated with the modulation signal to affect the first current flowing through the primary winding.

According to yet another embodiment, a system for regulating a power converter includes a first signal generator configured to receive a first sensed signal and generate a first output signal associated with demagnetization. The first sensed signal is associated with a first winding coupled to a secondary winding for a power converter, and the secondary winding being related to at least an output current for the power converter. Additionally, the system includes a peak detector configured to receive a drive signal and a second sensed signal and generate a peak signal. The second sensed signal is associated with a first current flowing through a primary winding coupled to the secondary winding for the power converter, and a second signal generator configured to receive the drive signal, the first output signal and the peak signal, and generate a second output signal. Moreover, the system includes an amplifier configured to receive the second output signal and a threshold signal and generate a third output signal with a capacitor, and a third signal generator configured to receive the third output signal and a first input signal and generate a fourth output signal. The capacitor is coupled to the amplifier, and the first input signal is proportional to a second input signal received by the primary winding. Also, the system includes a comparator configured to receive the fourth output signal and the second sensed signal and generate a comparison signal, and a fourth signal generator configured to receive at least the comparison signal and a clock signal and generate a modulation signal. Additionally, the system includes a gate driver configured to receive the modulation signal and output the drive signal to the peak detector, the second signal generator, and a switch. The switch is configured to affect the first current flowing through the primary winding.

According to yet another embodiment, a method for regulating a power converter includes receiving a first sensed signal. The first sensed signal is associated with a first winding coupled to a secondary winding for a power converter, and the secondary winding is related to at least an output current for the power converter. Additionally, the method includes generating a first output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and a second sensed signal, and generating a peak signal based on at least information associated with the drive signal and the second sensed signal. Also, the method includes receiving the drive signal, the first output signal, and the peak signal, processing information associated with the drive signal, the first output signal, and the peak signal, and generating a second output signal based on at least information associated with the drive signal, the first output signal, and the peak signal. Additionally, the method includes receiving the second output signal and a threshold signal, processing information associated with the second output signal and the threshold signal, generating a third output signal based on at least information associated with the second output signal and the threshold signal, and receiving the third output signal and a first input signal. The first input signal is proportional to a second input signal received by the primary winding. Moreover, the method includes processing information associated with the third output signal and the first input signal, generating a fourth output signal based on at least information associated with the third output signal and the first input signal, receiving the fourth output signal and the second sensed signal, processing information associated with the fourth output signal and the second sensed signal, and generating a comparison signal based on at least information associated with the fourth output signal and the second sensed signal. Also, the method includes receiving at least the comparison signal and a clock signal, processing information associated with the comparison signal and the clock signal, and generating a modulation signal based on at least information associated with the comparison signal and the clock signal. Additionally, the method includes receiving the modulation signal, and outputting the drive signal based on at least information associated with the modulation signal to affect the first current flowing through the primary winding.

According to yet another embodiment, a system for regulating a power converter includes a first signal generator configured to receive a first sensed signal and generate a first output signal associated with demagnetization. The first sensed signal is associated with a first winding coupled to a secondary winding for a power converter, and the secondary winding is related to at least an output current for the power converter. Additionally, the system includes a peak detector configured to receive a drive signal and a second sensed signal. The second sensed signal is associated with a first current flowing through a primary winding coupled to the secondary winding for the power converter. Moreover, the system includes a second signal generator configured to receive the drive signal, the first output signal, and the peak signal, and generate a second output signal, and an amplifier configured to receive the second output signal and a threshold signal and generate a third output signal with a capacitor, the capacitor being coupled to the amplifier. Also, the system includes a third signal generator configured to receive the first sensed signal, the third output signal and the drive signal and generate a fourth output signal, and a comparator configured to receive the fourth output signal and the second sensed signal and generate a comparison signal. Additionally, the system includes a fourth signal generator configured to receive at least the comparison signal and a clock signal and generate a modulation signal, and a gate driver configured to receive the modulation signal and output the drive signal to the peak detector, the second signal generator, the third signal generator, and a switch, the switch being configured to affect the first current flowing through the primary winding.

According to yet another embodiment, a method for regulating a power converter includes receiving a first sensed signal. The first sensed signal is associated with a first winding coupled to a secondary winding for a power converter, and the secondary winding is related to at least an output current for the power converter. Additionally, the method includes generating a first output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and the second sensed signal, and generating a peak signal based on at least information associated with the drive signal and the second sensed signal. Additionally, the method includes receiving the drive signal, the first output signal, and the peak signal, processing information associated with the drive signal, the first output signal, and the peak signal, and generating a second output signal based on at least information associated with the drive signal, the first output signal, and the peak signal. Moreover, the method includes receiving the second output signal and a threshold signal, processing information associated with the second output signal and the threshold signal, and generating a third output signal based on at least information associated with the second output signal and the threshold signal. Also, the method includes receiving the first sensed signal, the third output signal and the drive signal, processing information associated with the first sensed signal, the third output signal and the drive signal, and generating a fourth output signal based on at least information associated with the first sensed signal, the third output signal and the drive signal. Additionally, the method includes receiving the fourth output signal and the second sensed signal, processing information associated with the fourth output signal and the second sensed signal, and generating a comparison signal based on at least information associated with the fourth output signal and the second sensed signal. Moreover, the method includes receiving the comparison signal and a clock signal, processing information associated with the comparison signal and the clock signal, and generating a modulation signal based on at least information associated with the comparison signal and the clock signal. Also, the method includes receiving the modulation signal, and outputting the drive signal based on at least information associated with the modulation signal to affect the first current flowing through the primary winding.

According to yet another embodiment, a system for regulating a power converter includes a first signal generator configured to receive a first sensed signal and generate an output signal associated with demagnetization. The first sensed signal is associated with a first winding coupled to a secondary winding for a power converter, and the secondary winding is related to at least an output current for the power converter. Additionally, the system includes a peak detector configured to receive a drive signal and a second sensed signal and generate a peak signal. The second sensed signal is associated with a first current flowing through a primary winding coupled to the secondary winding for the power converter. Moreover, the system includes a second signal generator configured to process at least information associated with the output signal and the peak signal and generate a modulation signal, and a gate driver configured to receive the modulation signal and output the drive signal to at least the peak detector and a switch. The switch is configured to affect the first current flowing through the primary winding. The drive signal is associated with a switching period, and the output signal is associated with a demagnetization duration. The demagnetization duration multiplied by the peak signal in magnitude is equal to a demagnetization peak value. The system is further configured to keep the switching period constant, keep an average magnitude of the demagnetization peak value over a first duration constant, and keep the output current constant.

According to yet another embodiment, a method for regulating a power converter includes receiving a first sensed signal. The first sensed signal is associated with a first winding coupled to a secondary winding for a power converter, and the secondary winding is related to at least an output current for the power converter. Additionally, the method includes generating an output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and the second sensed signal, generating a peak signal based on at least information associated with the drive signal and the second sensed signal, processing information associated with the output signal and the peak signal, and generating a modulation signal based on at least information associated with the output signal and the peak signal. Also, the method includes receiving the modulation signal, and outputting the drive signal based on at least information associated with the modulation signal to affect the first current flowing through the primary winding. The drive signal is associated with a switching period, and the output signal is associated with a demagnetization duration. The demagnetization duration multiplied by the peak signal in magnitude is equal to a demagnetization peak value. The switching period is kept constant, an average magnitude of the demagnetization peak value over a first duration is kept constant, and the output current is kept constant.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for constant voltage mode and constant current mode. Merely by way of example, the invention has been applied to a flyback power converter with primary-side sensing and regulation. But it would be recognized that the invention has a much broader range of applicability.

Figure 7:
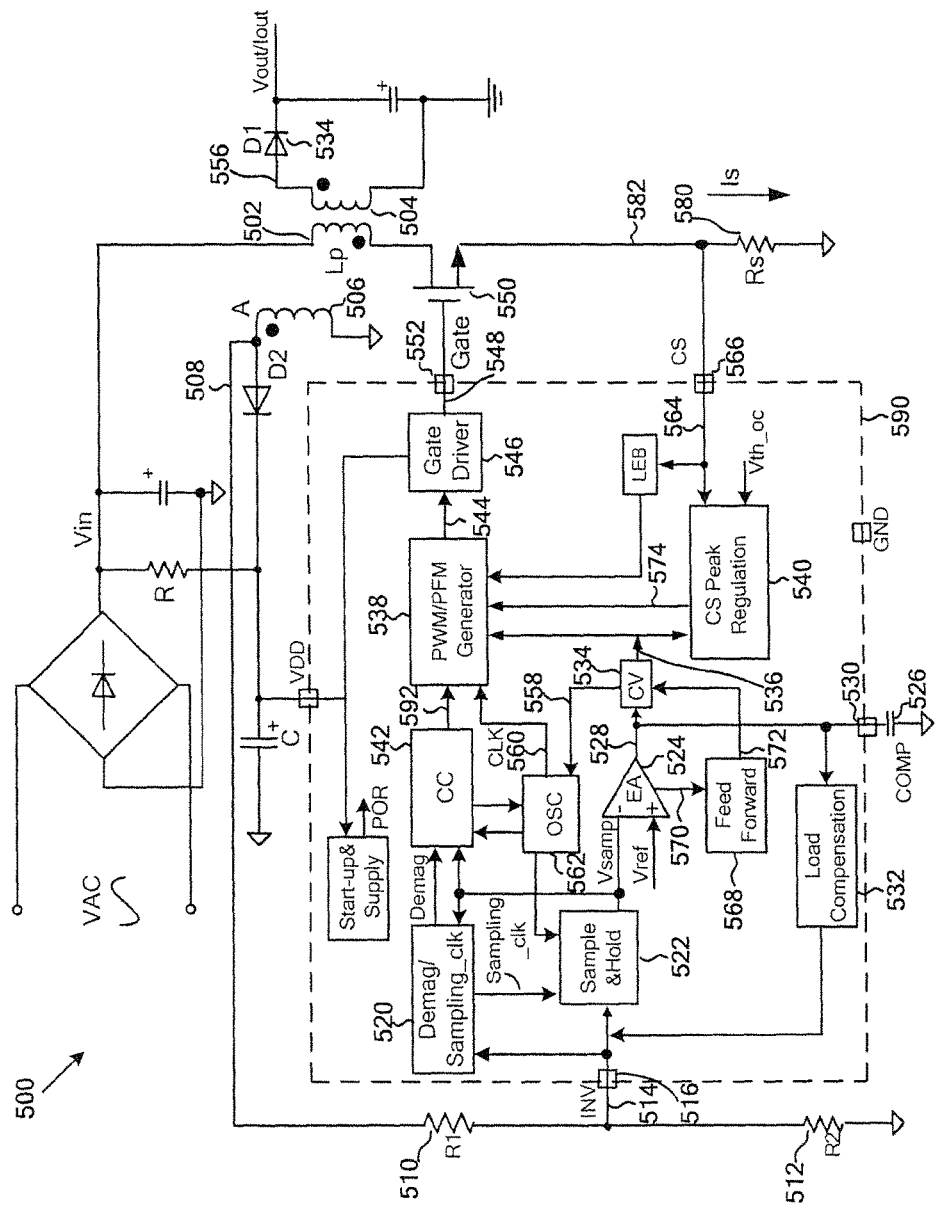
FIG. 7 is a simplified diagram for a switch-mode power conversion system with primary-side sensing and regulation according to an embodiment of the present invention.

FIG. 7 is a simplified diagram for a switch-mode power conversion system with primary-side sensing and regulation according to an embodiment of the present invention. This diagram is merely an example, which should not unduly limit the scope of the claims. One of ordinary skill in the art would recognize many variations, alternatives, and modifications.

A switch-mode power conversion system 500 includes a primary winding 502, a secondary winding 504, and an auxiliary winding 506. Additionally, the conversion system 500 includes resistors 510, 512, and 580. Moreover, the conversion system 500 includes a capacitor 526, a switch 550, and a diode 554. Also, the conversion system 500 includes the following components:
- a component 520 for generating a Demag signal and a Sampling_clk signal;
- a component 522 for sampling and holding one or more signals;
- an error amplifier 524;
- a component 532 for load compensation;
- a component 534 for constant voltage (CV) control;
- a component 538 for generating a PWM/PFM modulation signal;
- a component 540 for current sensing (CS) peak regulation;
- a component 542 for constant current (CC) control;
- a component 546 for generating a gate drive signal;
- an oscillator 562; and
- a component 568 for feed forward.

In one embodiment, the components 520, 522, 532, 534, 538, 540, 542, 546, and 568, the error amplifier 524, and the oscillator 562 are located on a chip 590. For example, the chip 590 includes at least terminals 516, 530, 552, and 566. Although the above has been shown using a selected group of components for the system 500, there can be many alternatives, modifications, and variations. For example, some of the components may be expanded and/or combined. Other components may be inserted to those noted above. Depending upon the embodiment, the arrangement of components may be interchanged with others replaced. For example, the system 500 is a switch-mode flyback power conversion system. Further details of these components are found throughout the present specification and more particularly below.

As shown in FIG. 7, an output voltage $V_{out}$ is sensed by the primary side of the conversation system 500 according to an embodiment of the present invention. For example, the sensing of the output voltage $V_{out}$ depends at least in part on the ratio of turns between the secondary winding 504 and the auxiliary winding 506. For example, the secondary winding 504 is coupled tightly to the auxiliary winding 506. In another example, the secondary winding 504 sends a signal 556 to the diode 554, and is coupled to the output of the conversion system 500 through the diode 554.

In one embodiment, an output signal 508 of the auxiliary winding 506 is represented by $V_{AUX}$. In another embodiment, the output signal 508 is processed by a voltage divider including the resistor 510 (i.e., $R_1$) and the resistor 512 (i.e., $R_2$). From the voltage divider, an output signal 514 (i.e., $V_{INV}$) is fed into the terminal 516 (i.e., the terminal INV). For example, the output signal 514 is load compensated by the component 532. In another example, the compensated signal 514 is fed into both the components 520 and 522.

Figure 10:
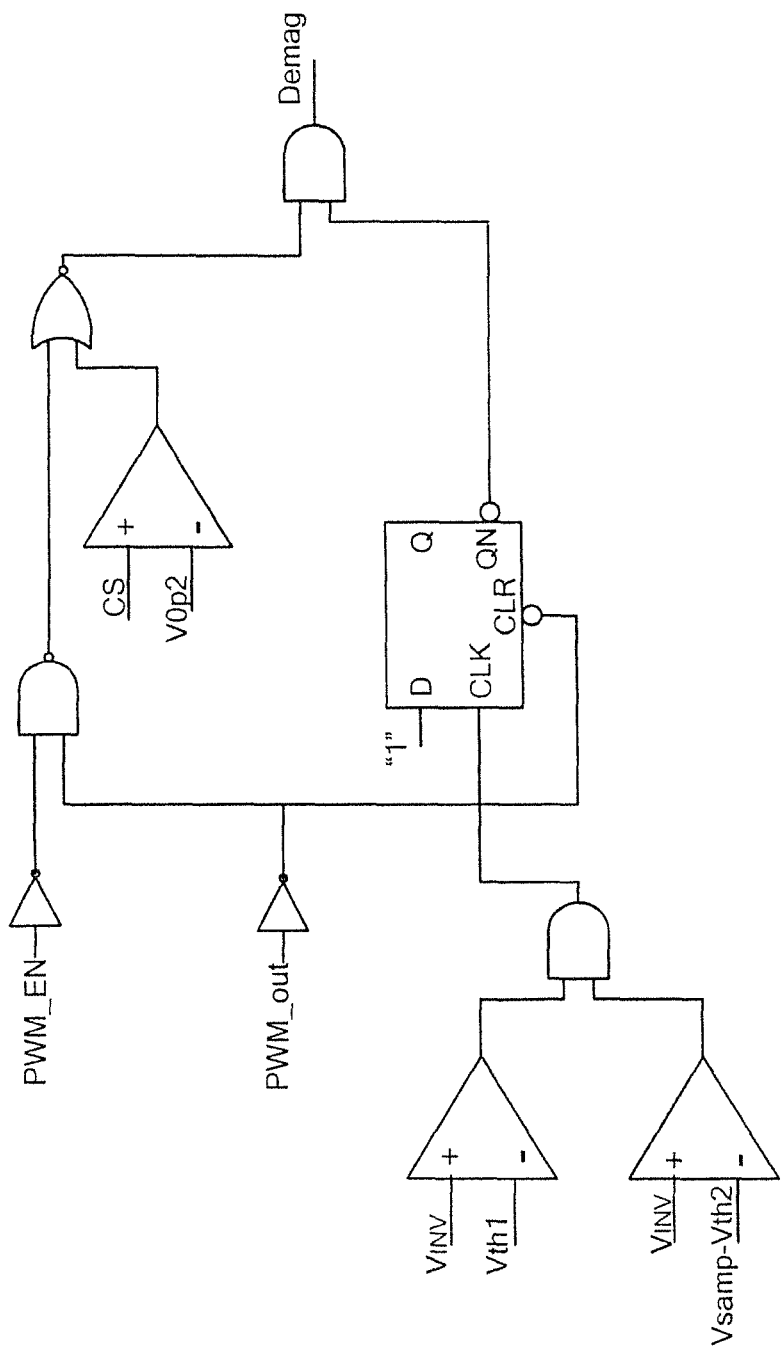
FIG. 10 is a simplified diagram showing certain devices for generating the Demag signal for a component as part of the switch-mode power conversion system according to an embodiment of the present invention.
Figure 11:
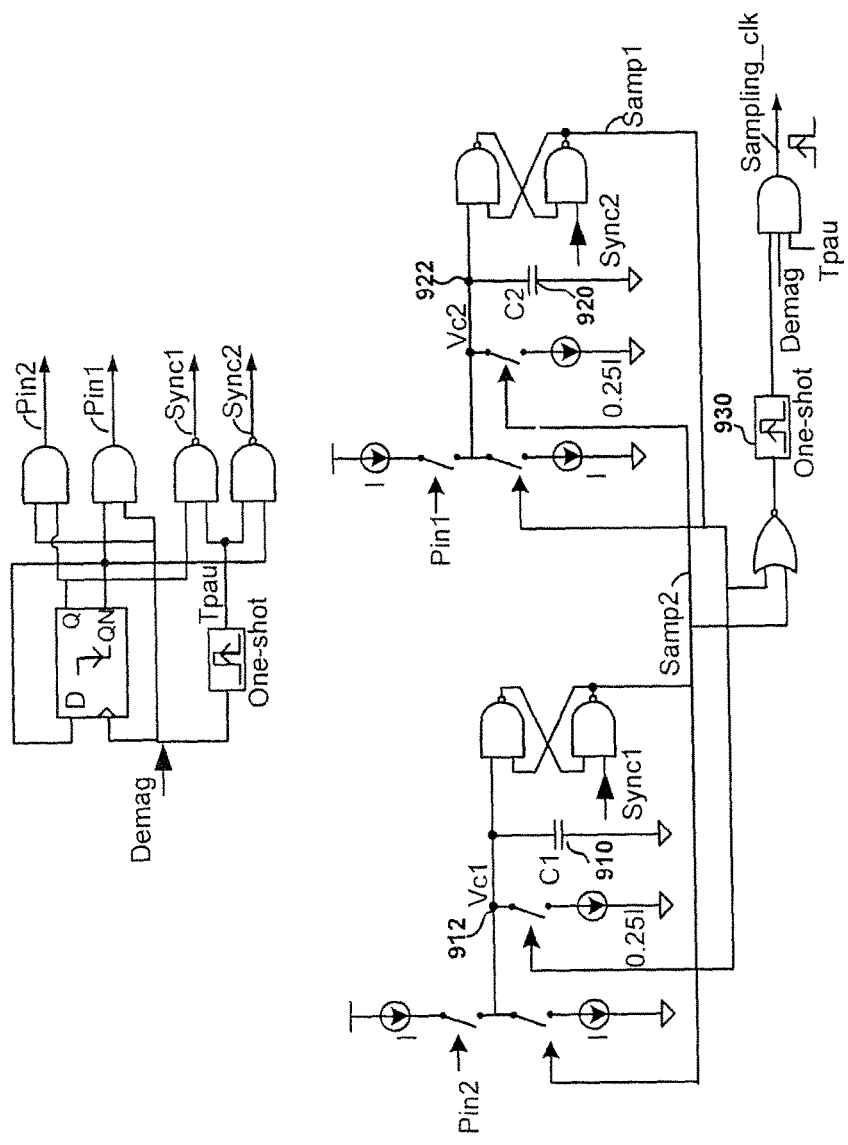
FIG. 11 is a simplified diagram showing certain devices for generating the Sampling_clk signal for a component as part of the switch-mode power conversion system according to an embodiment of the present invention.
Figure 14A:
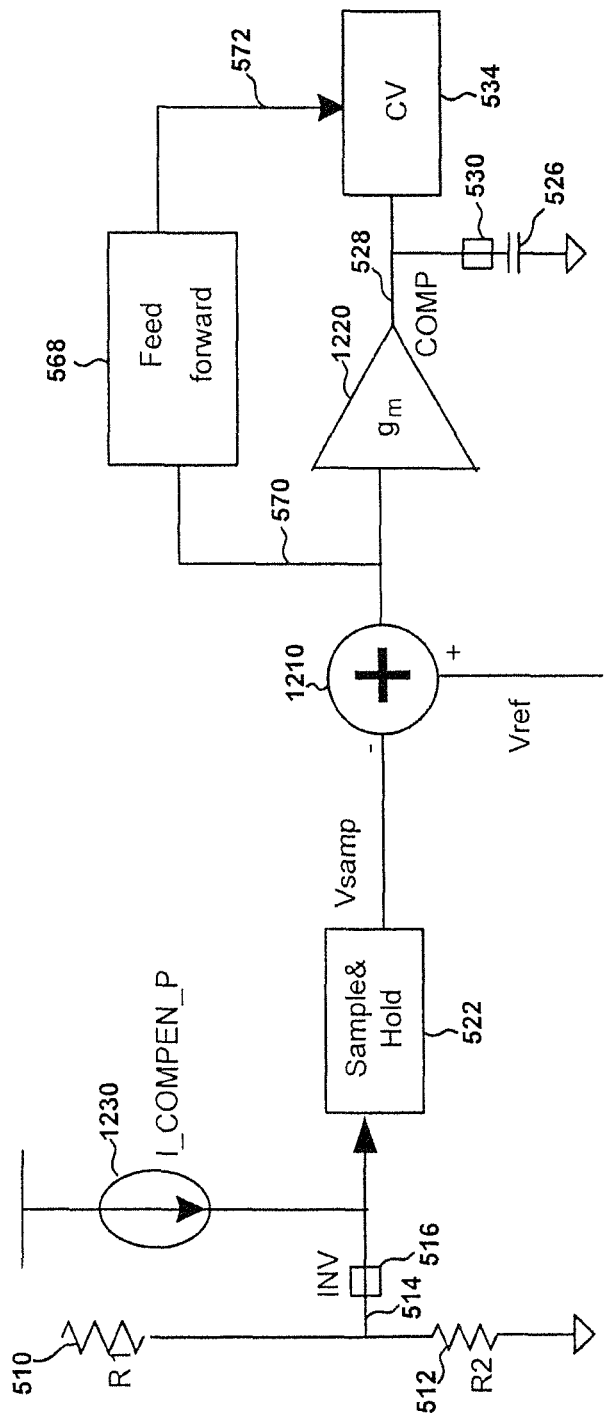
FIG. 14(a) is a simplified diagram showing certain devices for a component and an error amplifier as parts of the switch-mode power conversion system according to an embodiment of the present invention.

According to an embodiment, the component 532 includes one or more devices as shown in FIGS. 14(a), 14(b), 15(a), and/or 15(b). According to another embodiment, the component 520 includes certain devices as shown in FIGS. 10 and 11. For example, the component 520 outputs the Sampling_clk signal to the component 522. Using the Sampling_clk signal, the component 522 generates a Holding_clk signal.

Figure 8:
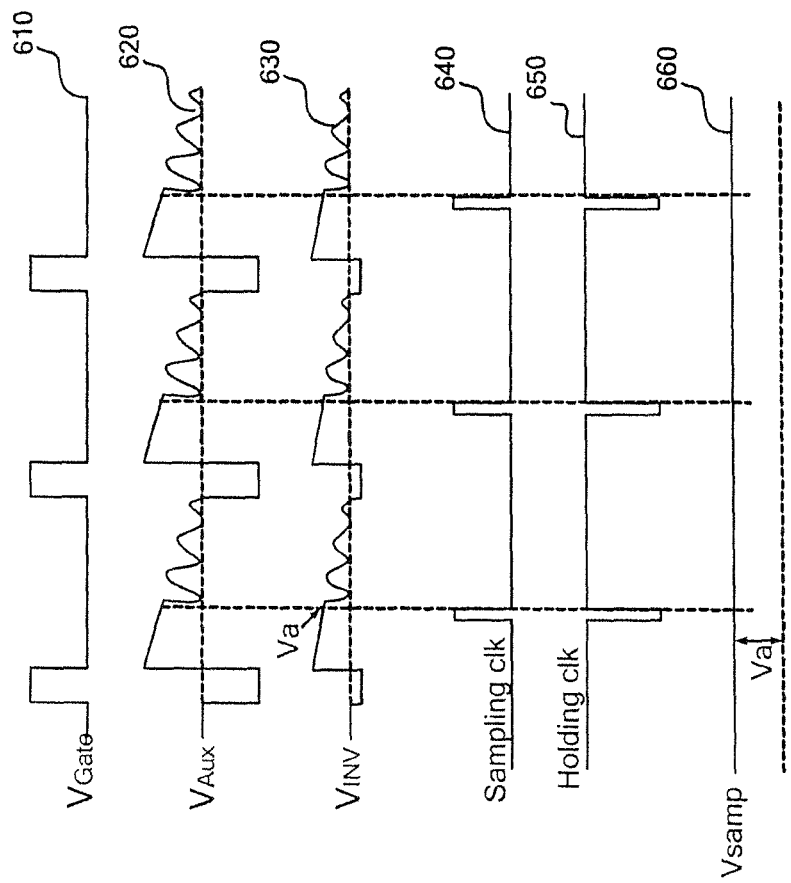
FIG. 8 is a simplified timing diagram for signal sampling and holding as performed by a component as part of the switch-mode power conversion system according to an embodiment of the present invention.

In one embodiment, the component 522 samples the compensated signal 514 based on the Sampling_clk signal, and holds the sampled signal based on the Holding_clk signal. For example, the component 522 samples the compensated signal 514 near the end of de-magnetization and holds the sampled signal until the next sampling. In another example, the sampling and holding process is shown in FIG. 8.

Also as shown in FIG. 7, a sampled and held signal $V_{samp}$ is sent from the component 522 to the error amplifier 524. According to certain embodiments, the component 524 includes some devices as shown in FIGS. 14(a), 14(b), 15(a), and/or 15(b). The error amplifier 524 also receives a reference signal $V_{ref}$. For example, the reference signal $V_{ref}$ is compensated based on the output loading of the conversion system 500. In another example, the signal $V_{samp}$ is compared with the reference signal $V_{ref}$, and their difference is amplified by the error amplifier 524. In one embodiment, the error amplifier 524 generates an output signal 528 with the capacitor 526. For example, the capacitor 526 is connected to the error amplifier 524 through the terminal 530 (i.e., the terminal COMP). In another example, the output signal 528 (i.e., $V_{COMP}$) reflects the load condition. In yet another example, $V_{COMP}$ is used to affect the PWM/PFM switching frequency and the PWM/PFM pulse width in order to regulate the output voltage $V_{out}$.

As shown in FIG. 7, the output signal 528 is sent to the components 532 and 534. For example, the component 534 keeps the output voltage $V_{out}$ constant in the constant voltage (CV) mode. In another example, the component 534 sends a control signal 536 to the component 538 and a control signal 558 to the oscillator 562. In response, the oscillator 562 outputs a clock signal 560 to the component 538.

Additionally, in one embodiment, the error amplifier 524 also outputs a signal 570 to the component 568, which, in response, generates and sends a signal 572 to the component 534. In another embodiment, the component 534 receives both the signal 572 and the signal 528.

Figure 17:
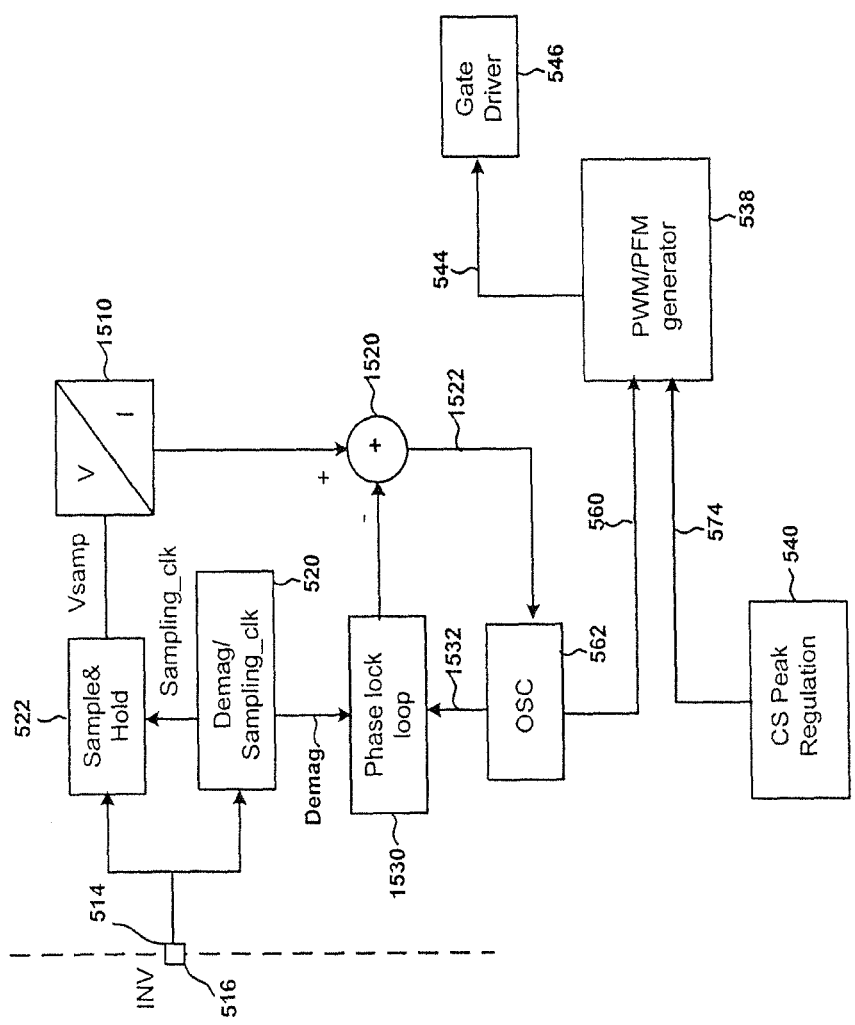
FIG. 17 is a simplified diagram showing certain devices for a component as a part of the switch-mode power conversion system according to an embodiment of the present invention.

As shown in FIG. 7, the component 520 also sends a Demag signal to the component 542, which also receives the signal $V_{samp}$. In response, the component 542 outputs a control signal 592. According to an embodiment, the control signal 592 is used to keep an output current $I_{out}$ constant in the constant current (CC) mode. For example, the component 542 includes one or more devices as shown in FIG. 17. In another example, the component 542, through the oscillator 562, locks the switching frequency according to the primary-winding inductance and thus compensates for the variations in primary-winding inductance. In yet another example, the output current $I_{out}$ in the constant current (CC) mode is made independent of primary-winding inductance.

According to one embodiment, the component 538 receives at least the signals 560, 536 and 592 and a signal 574 from the component 540. The component 540 receives Vth_oc in addition to a signal 564 from the terminal 566 (i.e., the terminal CS). For example, Vth_oc represents a predetermined threshold voltage level. In another example, the signal 564 is a voltage signal. In response, the component 538 outputs a control signal 544 to the component 546, which in turns sends a drive signal 548 to the switch 550. For example, the control signal 544 is a modulation signal. In another example, the switch is a power MOSFET. In yet another example, the switch is a power BJT. In yet another example, the switch is connected to the component 546 through the terminal 552 (i.e., the terminal Gate). In yet another example, the drive signal 548 is represented by $V_{Gate}$.

According to one embodiment, the control signal 544 is used to determine the turn-on time and the switching frequency for PWM/PFM control. For example, the larger magnitude of $V_{COMP}$ results in longer turn-on time and thus higher level of power delivered to the output. In another example, the larger magnitude of $V_{COMP}$ results in higher switching frequency and thus higher level of power delivered to the output. According to another embodiment, the turn-on time for PWM/PFM control is determined by the component 538, and the switching frequency for PWM/PFM control is determined by the oscillator 562.

Figure 1:
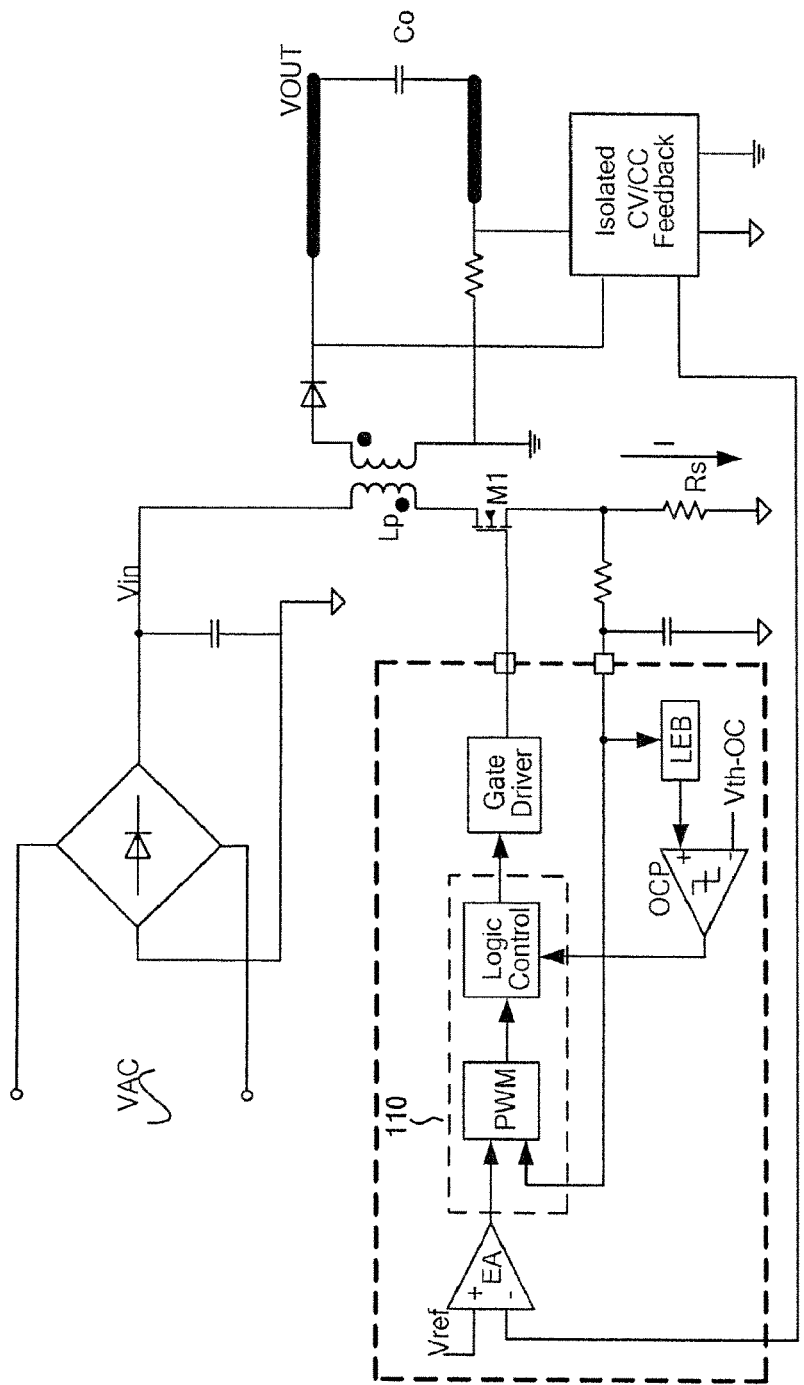
FIG. 1 is a simplified conventional diagram for a switch-mode flyback power conversion system with secondary-side control.
Figure 2:
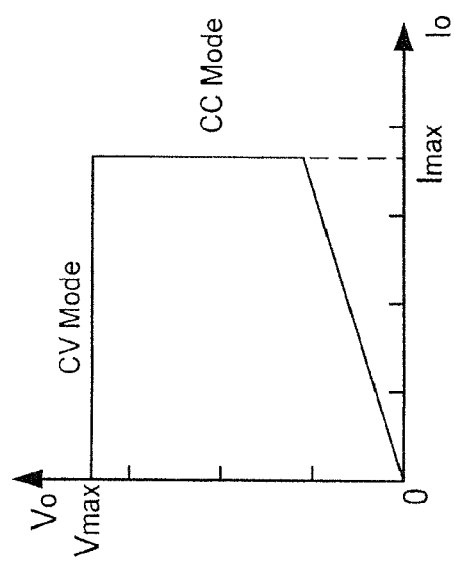
FIG. 2 is a simplified conventional diagram showing characteristics of output voltage and output current of a flyback power conversion system
Figure 3:
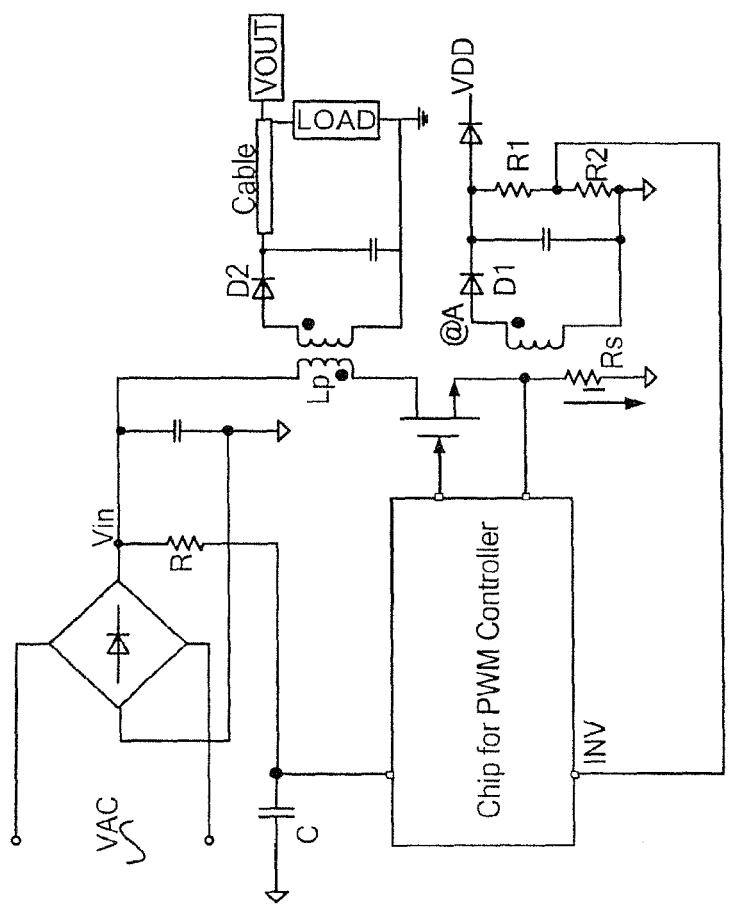
FIG. 3 is a simplified conventional diagram for a switch-mode flyback power conversion system with primary-side sensing and regulation.
Figure 4:
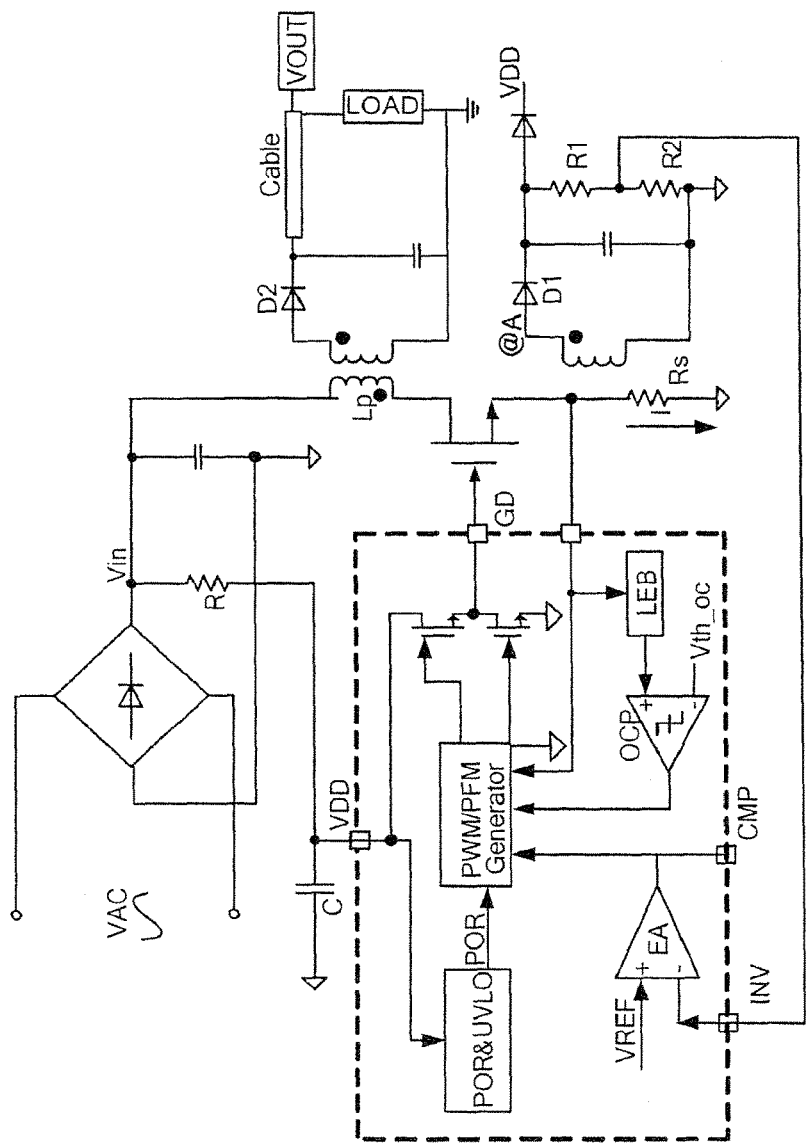
FIG. 4 is another simplified conventional diagram for a switch-mode flyback power conversion system with primary-side sensing and regulation.
Figure 5:
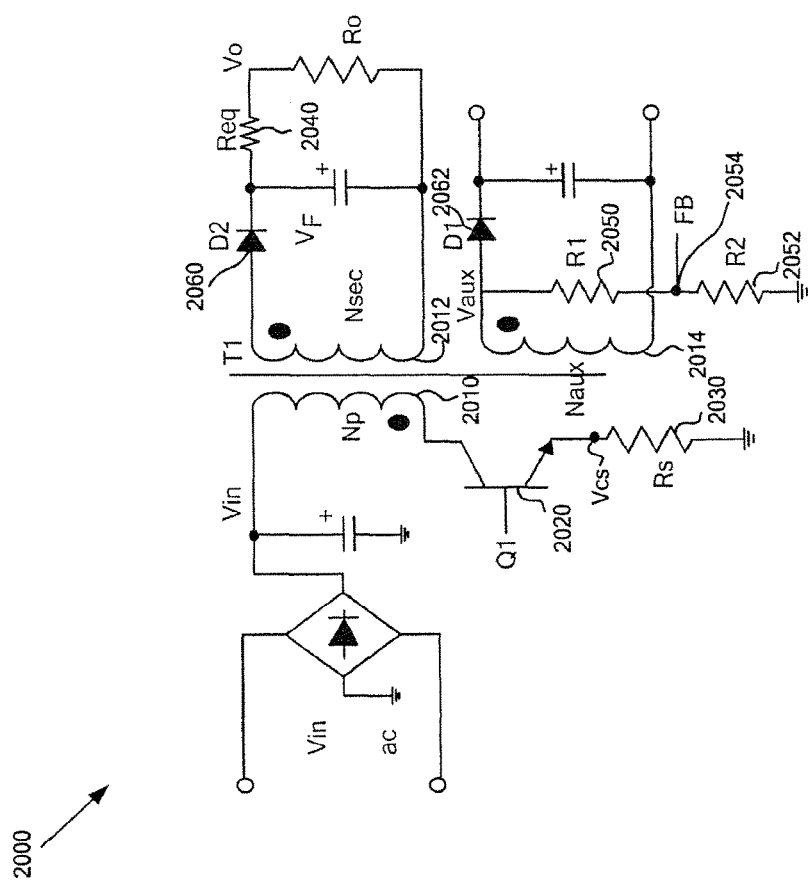
FIG. 5 is yet another simplified conventional diagram for a switch-mode flyback power conversion system with primary-side sensing and regulation.
Figure 6:
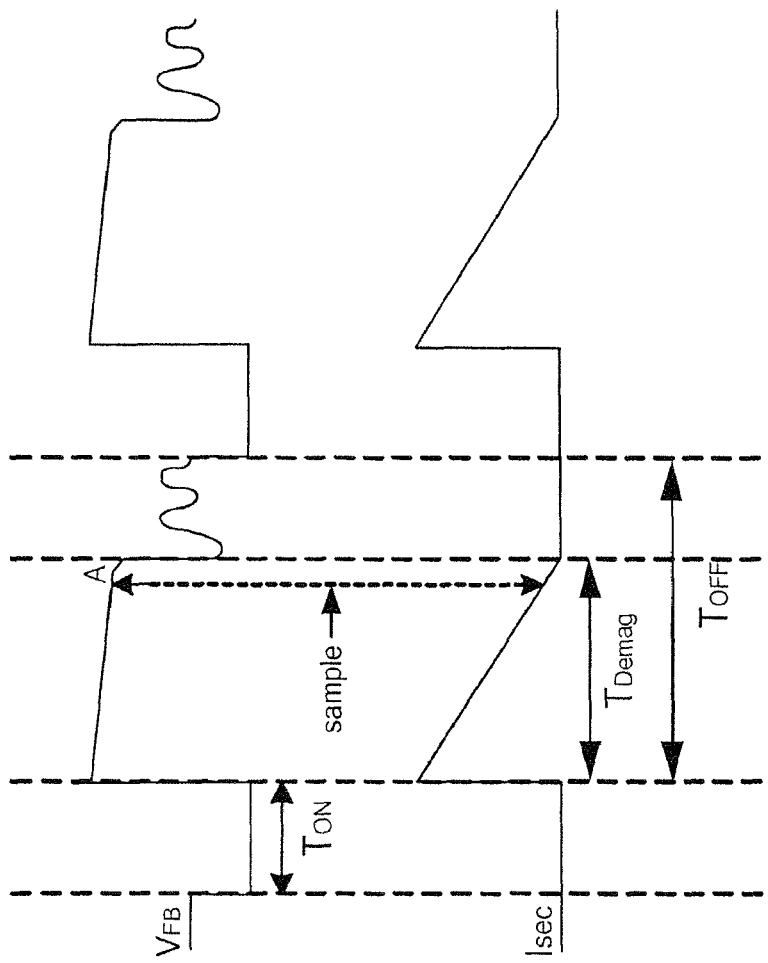
FIG. 6 is a simplified diagram showing a conventional operation mechanism for the flyback power conversion system.

As discussed above and further emphasized here, FIG. 7 is merely an example, which should not unduly limit the scope of the claims. One of ordinary skill in the art would recognize many variations, alternatives, and modifications. For example, the conversion system 500 includes one or more components that are not shown in FIG. 5. In another example, the conversion system 500 includes one or more connections that are not shown in FIG. 5. In yet another example, the conversion system 500 includes one or more components that are different from ones shown in FIG. 5. In yet another example, the conversion system 500 includes one or more connections that are different from ones shown in FIG. 5. In yet another example, the capacitor 526 can be replaced by another circuit for loop stabilization compensation.

FIG. 8 is a simplified timing diagram for signal sampling and holding as performed by the component 522 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 8, the waveform 610 represents $V_{Gate}$ as a function of time, the waveform 620 represents $V_{AUX}$ as a function of time, the waveform 630 represents $V_{INV}$ as a function of time, and the waveform 660 represents $V_{samp}$ as a function of time. Additionally, the waveform 640 represents the Sampling_clk signal as a function of time, and the waveform 650 represents the Holding_clk signal as a function of time.

Referring to FIG. 7, the signal $V_{Gate}$ as shown by the waveform 610 is sent to the switch 550. For example, after the switch 550 is turned off by $V_{Gate}$, the energy stored in the primary winding 502 is transferred to both the auxiliary winding 506 and the secondary winding 504 according to an embodiment of the present invention. In another example, the signal $V_{AUX}$ as shown by the waveform 620 resembles the signal 556 at the secondary winding 504. In one embodiment, the signal 556 reflects the output voltage $V_{out}$ near the end of each de-magnetization period. In yet another example, the signal $V_{INV}$ as shown by the waveform 630 resembles the signal $V_{AUX}$ as shown by the waveform 620 during each de-magnetization period.

Additionally, the waveform 640 shows that pulses of the Sampling_clk signal are generated at ends of de-magnetization periods according to an embodiment of the present invention. According to another embodiment, the waveform 650 shows that pulses of the Holding_clk signal are generated at ends of the de-magnetization periods.

As shown by the waveform 630, the signal $V_{INV}$ is sampled at the falling edges of the Sampling_clk signal and held during the rest of clock periods according to an embodiment. For example, the sampled and held values for the signal $V_{INV}$ is used to generate the signal $V_{samp}$. In another example, the signal amplitude $V_a$ reflects the output voltage of the component 522.

As discussed above and further emphasized here, FIG. 8 is merely an example, which should not unduly limit the scope of the claims. One of ordinary skill in the art would recognize many variations, alternatives, and modifications. For example, $V_a$ changes from one sampling clock period to another sampling clock period, so $V_{samp}$ also changes in magnitude from one sampling clock period to another sampling clock period.

Figure 9:
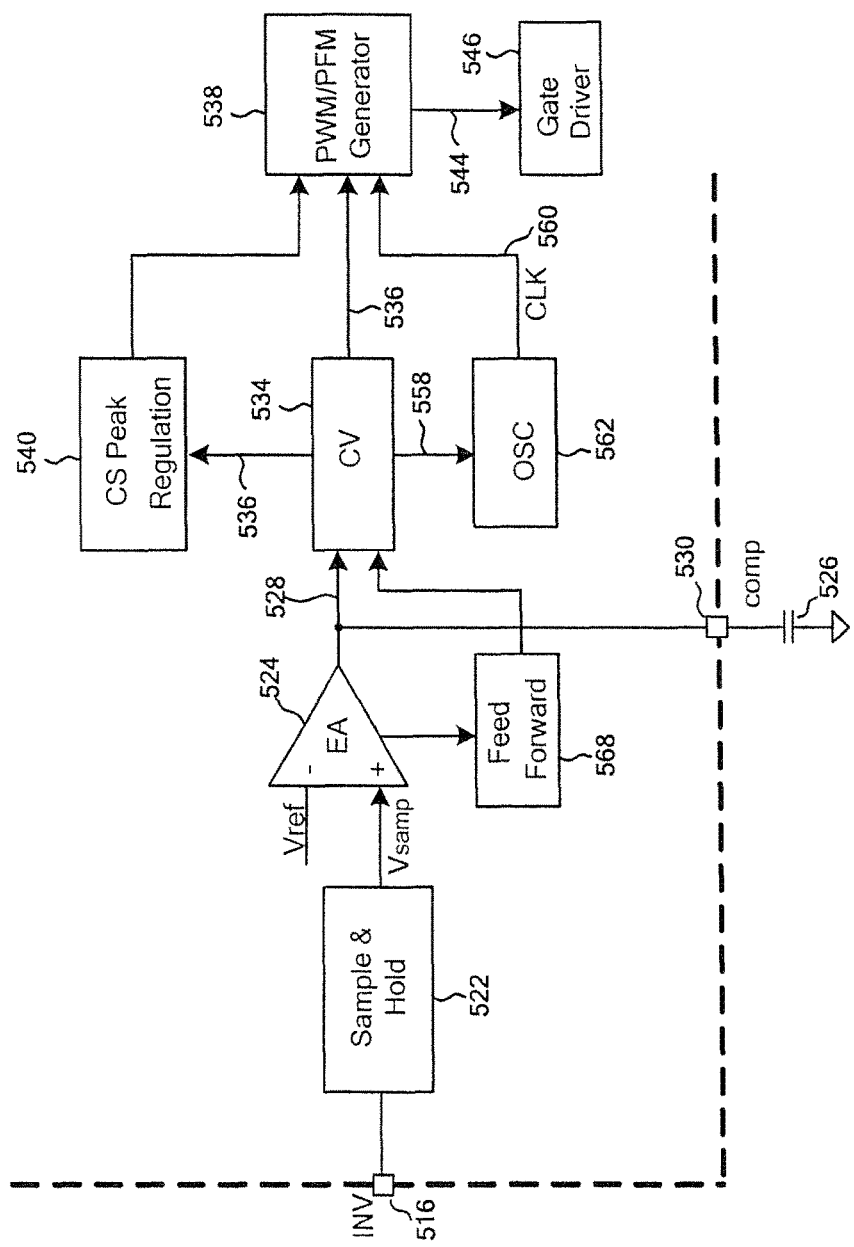
FIG. 9 is a simplified diagram showing certain components for output voltage regulation by the switch-mode power conversion system according to an embodiment of the present invention.

FIG. 9 is a simplified diagram showing certain components for output voltage regulation by the switch-mode power conversion system 500 according to an embodiment of the present invention. This diagram is merely an example, which should not unduly limit the scope of the claims. One of ordinary skill in the art would recognize many variations, alternatives, and modifications.

As shown in FIGS. 7 and 9, the voltage divider receives the signal 508 from the auxiliary winding 506, and outputs the signal 514 to the terminal NV according to an embodiment. In another embodiment, the signal 514 is load compensated by the component 532. The compensated signal 514 is fed into both the components 520 and 522.

For example, the component 522 samples the compensated signal 514 near the end of de-magnetization and hold the sampled signal until the next sampling. The sampled and held signal $V_{samp}$ is sent from the component 522 to the error amplifier 524, which also receives a reference signal $V_{ref}$. The signal $V_{samp}$ is compared with the reference signal $V_{ref}$, and their difference is amplified by the error amplifier 524.

In one embodiment, the error amplifier 524 generates an output signal 528 with the capacitor 526. For example, the capacitor 526 is connected to the error amplifier 524 through the terminal 530 (i.e., the terminal COMP). In another example, the output signal 528 (i.e., $V_{COMP}$) reflects the load condition and affects the PWM/PFM switching frequency and the PWM/PFM pulse width in order to regulate the output voltage $V_{out}$.

As shown in FIGS. 7 and 9, the output signal 528 (i.e., $V_{COMP}$) is sent to the component 534 according to an embodiment. For example, the component 534 sends a control signal 536 to the component 538 and a control signal 558 to the oscillator 562. In one embodiment, the control signal 558 is the current injected into the oscillator 562. In response, the oscillator 562 processes the control signal 558 in order to determine the frequency of the clock signal 560, and also outputs the clock signal 560 to the component 538. In another example, the component 538 receives both the signals 560 and 536, and outputs a control signal 544 to the component 546. The component 546 processes the control signal 544 in order to determine both the PWM/PFM switching frequency and the PWM/PFM pulse width. In one embodiment, the PWM/PFM pulse width is used to determine the current of the primary winding 502. The current of the primary winding 502 and the PWM/PFM switching frequency together are used to regulate the output voltage and maintain its constant magnitude in the CV mode.

According to one embodiment, if the magnitude of $V_{comp}$ is smaller than a predetermined value, the power conversion system 500 is in the CV mode. For example, if the voltage $V_{samp}$ is equal to $V_{ref}$ in magnitude, $V_{comp}$ is smaller than the predetermined value. In the CV mode, $V_{comp}$ is used to adjust the PWM/PFM switching frequency, and/or pulse width. For example, the PWM/PFM switching frequency and the PWM/PFM pulse width both are controlled in order to keep the output voltage $V_{out}$ constant.

According to another embodiment, if the magnitude of $V_{comp}$ exceeds the predetermined value, the power conversion system 500 is in the CC mode. For example, if the voltage $V_{samp}$ is lower than $V_{ref}$ in magnitude, $V_{comp}$ would exceed the predetermined value. In the CC mode, to regulate the output current $I_{out}$, the voltage $V_{samp}$ is used to control the switching frequency. For example, the PWM/PFM switching frequency is linearly proportional to $V_{samp}$, which in turn is proportional to the output voltage $V_{out}$.

As discussed above, referring to FIG. 7, the component 520 includes devices as shown in FIGS. 10 and 11 according to some embodiments of the present invention.

FIG. 10 is a simplified diagram showing certain devices for generating the Demag signal for the component 520 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIGS. 7 and 10, the signal $V_{INV}$ is received by the component 520 and is compared with two threshold voltages. One threshold voltage is $V_{th1}$, and the other threshold voltage is $V_{samp}-V_{th2}$. $V_{th1}$ and $V_{th2}$ are predetermined constants, and $V_{samp}$ is the previously sampled voltage received from the component 522. Based at least in part on the comparison between the signal $V_{INV}$ and the two threshold voltages, the Demag signal is generated. For example, the de-magnetization period is detected in order to generate the Demag signal.

FIG. 11 is a simplified diagram showing certain devices for generating the Sampling_clk signal for the component 520 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 10, the Demag signal is generated. Based at least in part on the Demag signal, other signals $P_{in1}$, $P_{in2}$, $S_{ync1}$, $S_{ync2}$, Samp1 and Samp2 are also generated as shown in FIG. 11. The duration information for the Demag signal is stored by integrators. For example, the integrators include switches and capacitors 910 and 920 (i.e., capacitors C1 and C2 respectively). In another example, the voltages for the capacitors C1 and C2 are $V_{C1}$ at the node 912 and $V_{C2}$ at the node 922, respectively.

In one embodiment, the switches are controlled by the signals $P_{in1}$ and $P_{in2}$. In another embodiment, the stored duration information for the Demag signal is used to determine the timing for the next pulse of the Sampling_clk signal. For example, the next pulse of the Sampling_clk signal appears right before the end of the de-magnetization period as shown in FIG. 8. Additionally, the width of the next pulse is determined by a one-shot device 930.

Figure 12:
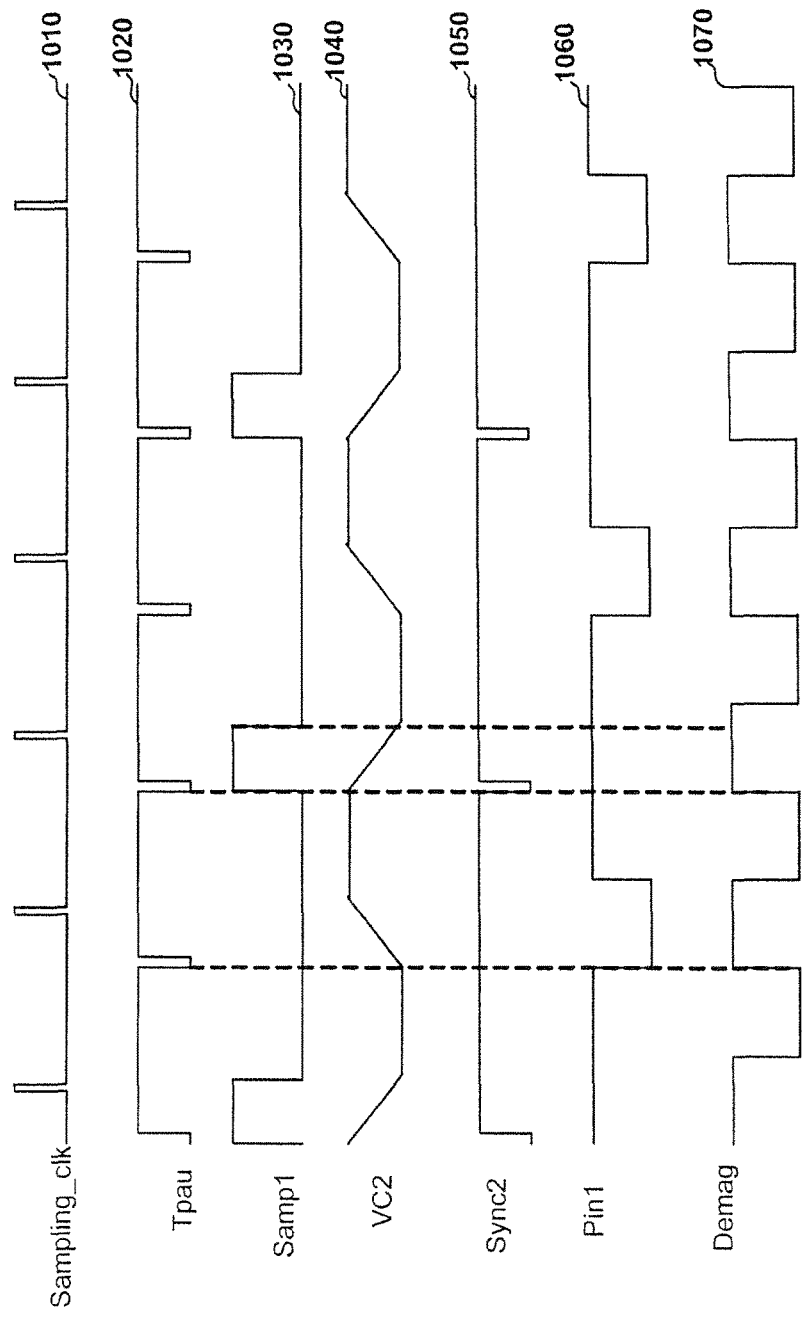
FIG. 12 is a simplified timing diagram for generating the Sampling_clk signal by a component as part of the switch-mode power conversion system according to an embodiment of the present invention.

FIG. 12 is a simplified timing diagram for generating the Sampling_clk signal by the component 520 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 12, the waveform 1010 represents the Sampling_clk signal as a function of time, the waveform 1020 represents the Tpau signal as a function of time, and the waveform 1030 represents the Samp1 signal as a function of time. Additionally, the waveform 1040 represents $V_{c2}$ as a function of time. Also, the waveform 1050 represents the $S_{ync}$ signal as a function of time, the waveform 1060 represents the $P_{in1}$ signal as a function of time, and the waveform 1070 represents the Demag signal as a function of time. For example, the Sampling_clk signal, the Tpau signal, the Samp1 signal, the $S_{ync2}$ signal, the $P_{in1}$ signal, and the Demag signal According to one embodiment, the m ng of the Sampling_clk signal is determined based on timing and duration of the Demag signal in the previous period, and the $P_{in1}$ and $P_{in2}$ signals are each generated based at least in part on duration of the Demag signal in the current period. For example, the duration of the Demag signal is the pulse width of the Demag signal as shown in FIG. 12. According to another embodiment, the Samp1 signal has the same pulse width as the Samp2 signal. For example, the pulse width is equal to the time interval between turning off the switch 550 and the next sampling. In another example, the Samp1 and Samp2 signals are used to determine the timing for the Sampling_clk signal.

In one embodiment, the relationship between the $P_{in1}$ signal and the Samp2 signal can be described by the difference equation below.

$$\beta P_{in1}(k-1) - \alpha * Samp_2(k-1) - A * \delta(k) = Samp_2(k) \tag{9}$$

where $P_{in1}$ represents the $P_{in1}$ signal, and $Samp_2$ represents the Samp2 signal. The relationship can be further described by the following Z-transform:

$$\beta P_{in1}(Z)Z^{-1} - \alpha * Samp_2(Z)Z^{-1} - A = Samp_2(Z) \tag{10}$$

$$\text{and } Samp_2(Z) = \frac{\beta * P_{in1}(Z)Z^{-1} - A}{1 + \alpha * Z^{-1}} \tag{11}$$

$$= \frac{\beta * P_{in1}(Z)Z^{-1}}{1 + \alpha * Z^{-1}} - \frac{A}{1 + \alpha * Z^{-1}}$$

where A is a constant initial value. Additionally, the second term $$\frac{A}{1 + \alpha * Z^{-1}} \to 0 \text{ (time} \to \infty);$$

therefore $$Samp_2 \approx \frac{\beta * P_{in1} Z^{-1}}{1 + \alpha * Z^{-1}} \tag{12}$$

From Equation 12, it can be seen that the pulse width for the Samp2 signal is updated every cycle according to the duration of the Demag signal in the previous period.

Figure 13:
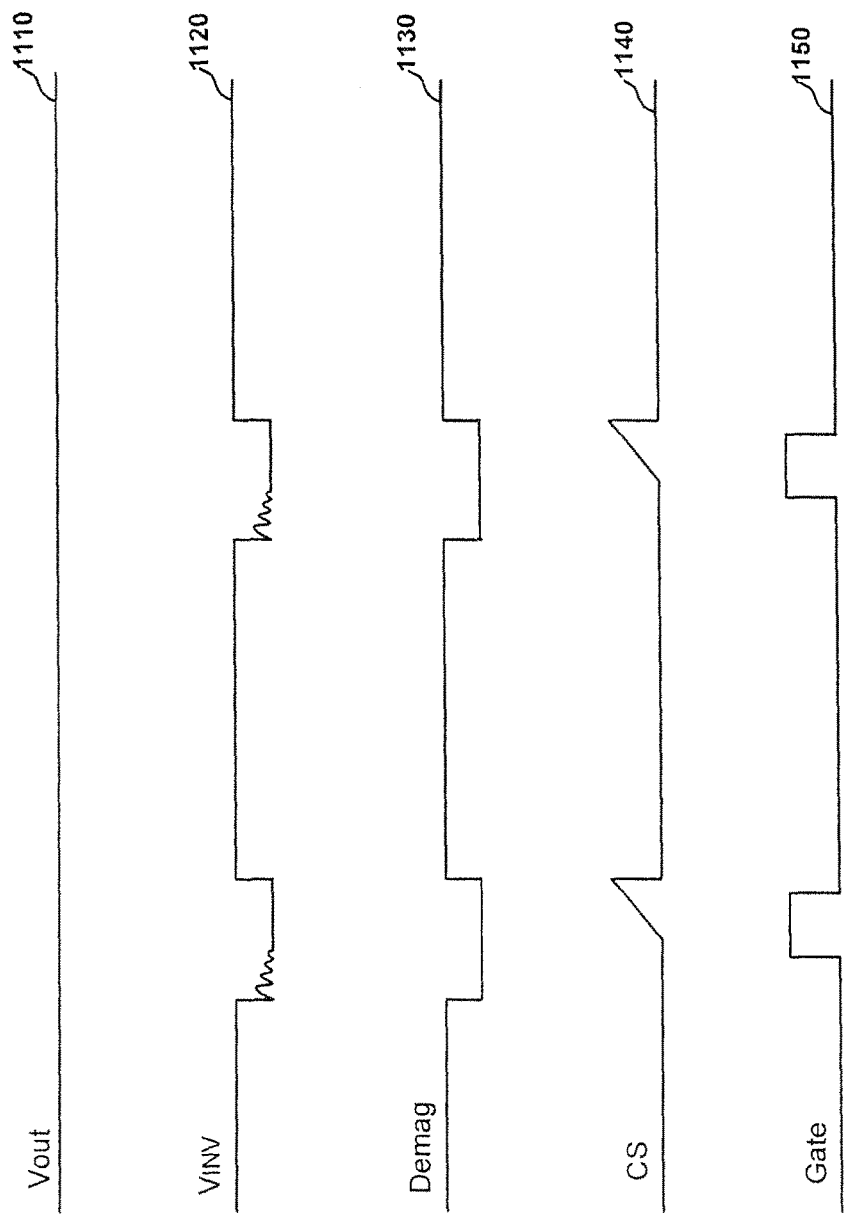
FIG. 13 is a simplified timing diagram for the switch-mode power conversion system according to another embodiment of the present invention.

FIG. 13 is a simplified timing diagram for the switch-mode power conversion system 500 according to another embodiment of the present invention. This diagram is merely an example, which should not unduly limit the scope of the claims. One of ordinary skill in the art would recognize many variations, alternatives, and modifications.

As shown in FIG. 13, the waveform 1110 represents $V_{out}$ as a function of time, the waveform 1120 represents $V_{INV}$ as a function of time, and the waveform 1130 represents the Demag signal as a function of time. Additionally, the waveform 1140 represents the voltage level for the signal 564 at the terminal CS as a function of time, and the waveform 1150 represents the signal 548 at the terminal Gate as a function of time.

Figure 14:
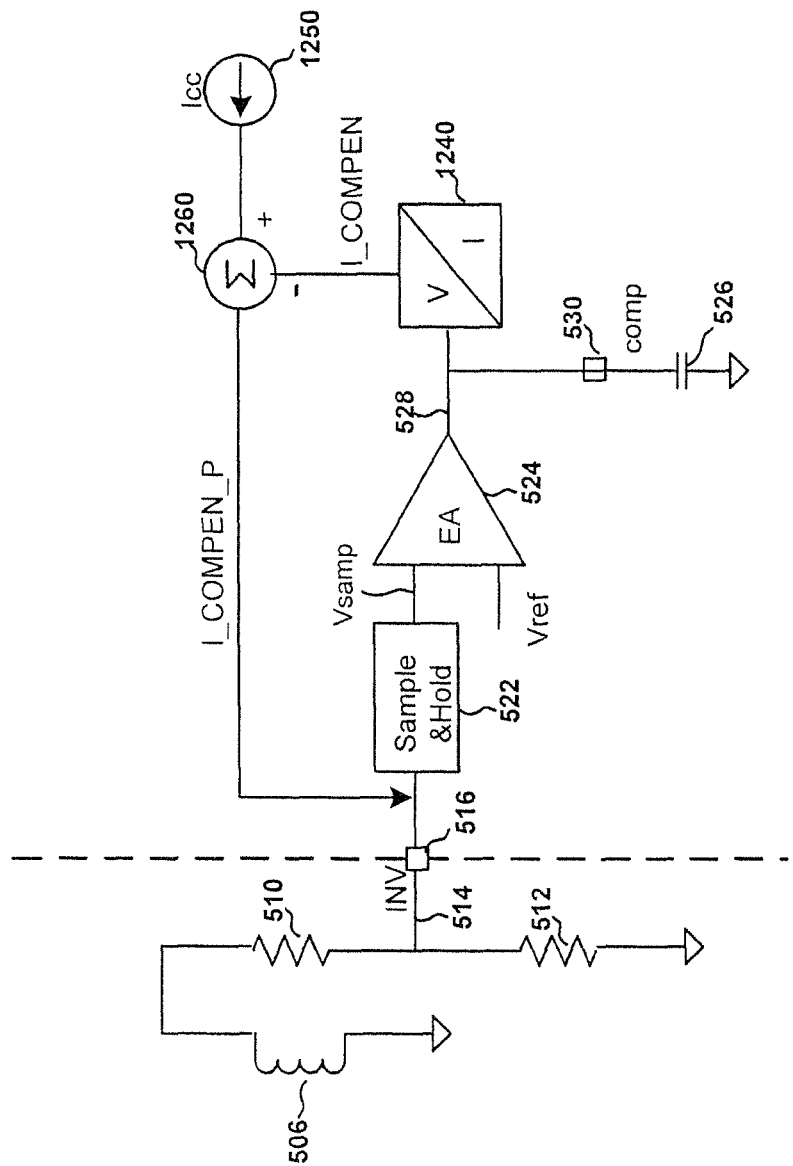
FIG. 14(b) is a simplified diagram showing certain devices for a current source as part of a component in the switch-mode power conversion system according to an embodiment of the present invention.

As discussed above, referring to FIG. 7, the component 532 includes one or more devices as shown in FIGS. 14(*a*), 14(*b*), 15(*a*), and/or 15(*b*), and the component 524 includes some devices as shown in FIGS. 14(*a*), 14(*b*), 15(*a*), and/or 15(*b*) according to certain embodiments of the present invention.

FIG. 14(*a*) is a simplified diagram showing certain devices for the component 532 and the error amplifier 524 as parts of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 14(*a*), the component 532 includes a current source 1230, and the error amplifier 524 includes a component 1210 and a transconductance amplifier 1220. For example, the component 1210 determines the difference between two input signals in magnitude.

For example, the component 1210 receives the voltage signal $V_{samp}$ and the reference signal $V_{ref}$ and generates the signal 570 whose magnitude is equal to $V_{ref}-V_{samp}$. In another example, the transconductance amplifier 1220 amplifies the signal 570 to generate the output signal 528. According to one embodiment, the output signal 528 is received by the capacitor 526. For example, the capacitor 526 serves as a low-pass filter for the closed loop. Additionally, the component 568 as a part of a feed forward path provides a zero to the closed loop in order to improve operation stability of the conversion system 500.

The current source 1230 generates a current I_COMPEN_P that varies with the output loading. The current I_COMPEN_P flows through the terminal INV and the resistor 512. For example, the current I_COMPEN_P is used to compensate for voltage drop from the cable and other voltage loss that vary with the output current $I_{out}$. In another example, the I_COMPEN_P current reaches its maximum at no load condition, and becomes zero at full load condition.

According to one embodiment, with load compensation, the output voltage $V_{out}$ can be expressed as follows.

$$V_{out} = k \cdot V_{Ref} + \frac{1}{n} V_{D1} - k \cdot \text{I\_COMPEN\_P} \cdot (R_1 // R_2) \quad (13)$$

where n is the ratio of turns between the auxiliary winding 506 and the secondary winding 504. Additionally, $V_{D1}$ is the forward diode drop voltage for the diode 554, and $$k = \frac{R_1 + R_2}{n \cdot R_2} \quad (14)$$

For example, the last term in Equation 13 represents a compensation factor for canceling the voltage drop from the cable.

FIG. 14(*b*) is a simplified diagram showing certain devices for the current source 1230 as part of the component 532 in the switch-mode power conversion system 500 according to an embodiment of the present invention. This diagram is merely an example, which should not unduly limit the scope of the claims. One of ordinary skill in the art would recognize many variations, alternatives, and modifications.

Referring to FIG. 14(*a*), the component 532 includes the current source 1230. As shown in FIG. 14(*b*), the current source 1230 includes a voltage-to-current converter 1240, a constant current source 1250, and a component 1260. For example, the component 1260 determines the difference between two input signals in magnitude.

For example, the signal 528 (i.e., $V_{COMP}$) is received by the voltage-to-current converter 1240 and converted into a current I_COMPEN. In another example, the constant current source 1250 generates a constant current Icc. Both the currents Icc and I_COMPEN are received by the component 1260, which generates the current I_COMPEN_P. In one embodiment, the current I_COMPEN_P is equal to Icc−I_COMPEN. In another embodiment, if $V_{COMP}$ becomes larger, the current I_COMPEN_P becomes smaller.

Figure 15:
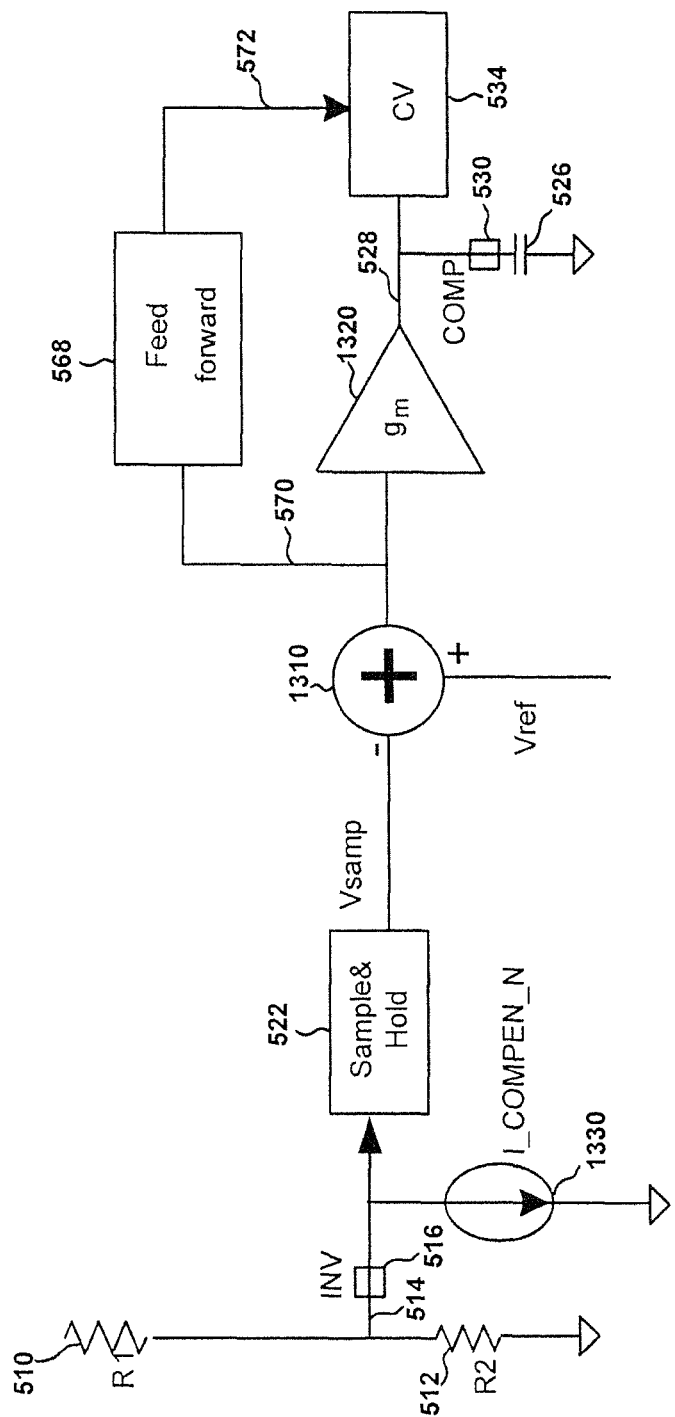
FIG. 15(a) is a simplified diagram showing certain devices for a component and an error amplifier as parts of the switch-mode power conversion system according to another embodiment of the present invention.
FIG. 15(b) is a simplified diagram showing certain devices for a current source as part of a component in the switch-mode power conversion system according to an embodiment of the present invention.
Figure 15:
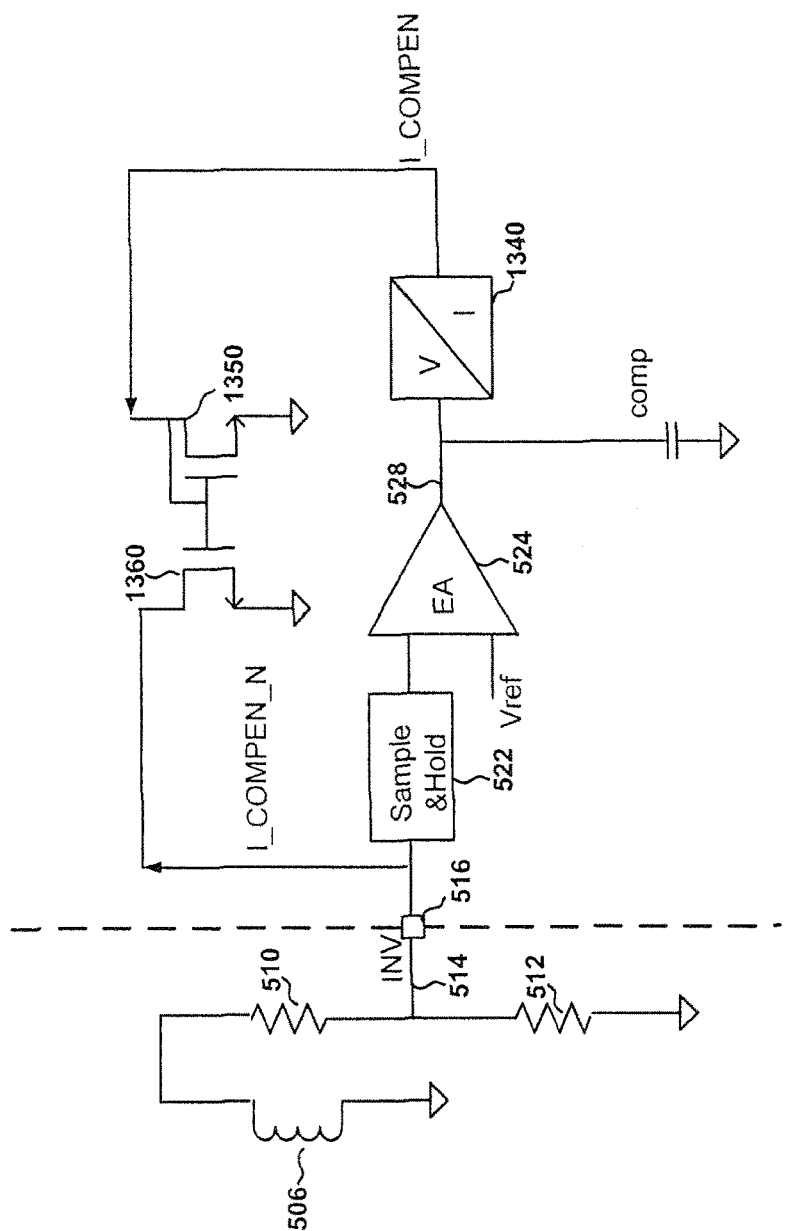

FIG. 15(*a*) is a simplified diagram showing certain devices for the component 532 and the error amplifier 524 as parts of the switch-mode power conversion system 500 according to another embodiment of the present invention. This diagram is merely an example, which should not unduly limit the scope of the claims. One of ordinary skill in the art would recognize many variations, alternatives, and modifications.

As shown in FIG. 15(*a*), the component 532 includes a current sink 1330, and the error amplifier 524 includes a component 1310 and a transconductance amplifier 1320. For example, the component 1310 determines the difference between two input signals in magnitude.

For example, the component 1310 receives the voltage signal $V_{samp}$ and the reference signal $V_{ref}$ and generates the signal 570 whose magnitude is equal to $V_{ref}-V_{samp}$. In another example, the transconductance amplifier 1320 amplifies the signal 570 and generates the output signal 528. According to one embodiment, the output signal 528 is received by the capacitor 526. For example, the capacitor 526 serves as a low-pass filter for the closed loop. Additionally, the component 568 as a part of a feed forward path provides a zero to the closed loop in order to improve operation stability of the conversion system 500.

The current sink 1330 generates a current I_COMPEN_N that varies with the output loading. The current I_COMPEN_N flows from the resistor 510 and the terminal INV. For example, the current I_COMPEN_N is used to compensate for voltage drop from the cable and other voltage loss that vary with the output current $I_{out}$. In another example, the I_COMPEN_N current reaches its maximum at full load condition, and becomes zero at no load condition.

FIG. 15(*b*) is a simplified diagram showing certain devices for the current sink 1330 as part of the component 532 in the switch-mode power conversion system 500 according to an embodiment of the present invention. This diagram is merely an example, which should not unduly limit the scope of the claims. One of ordinary skill in the art would recognize many variations, alternatives, and modifications.

Referring to FIG. 15(a), the component 532 includes the current sink 1330. As shown in FIG. 15(b), the current sink 1330 includes a voltage-to-current converter 1340 and a current mirror including transistors 1350 and 1360. For example, the signal 528 (i.e., $V_{COMP}$) is received by the voltage-to-current converter 1340 and converted into a current I_COMPEN. In another example, the current I_COMPEN is received by the current mirror, which generates the current I_COMPEN_N. In one embodiment, the current I_COMPEN_N is equal to m×I_COMPEN, and m is a positive integer. In another embodiment, if $V_{COMP}$ becomes larger, the current I_COMPEN_N also becomes larger.

Figure 16:
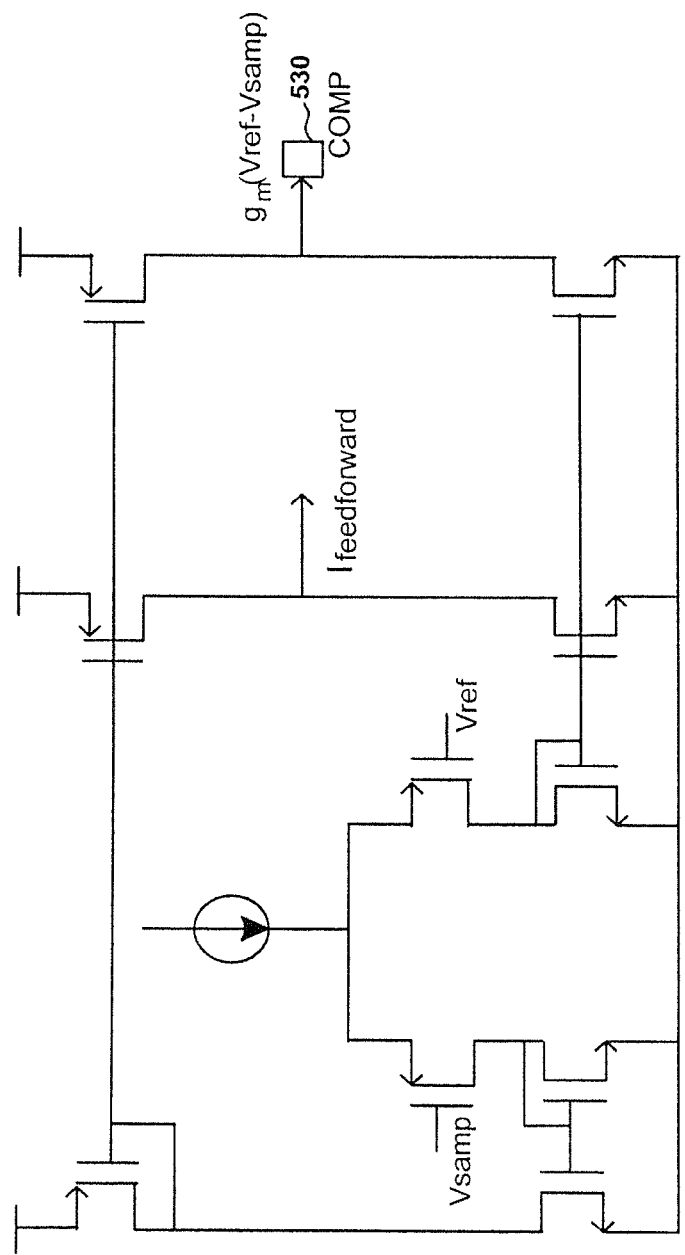
FIG. 16 is a simplified diagram showing CMOS implementation of a component and an error amplifier as parts of the switch-mode power conversion system according to an embodiment of the present invention.

FIG. 16 is a simplified diagram showing CMOS implementation of the component 568 and the error amplifier 524 as parts of the switch-mode power conversion system 500 according to an embodiment of the present invention. This diagram is merely an example, which should not unduly limit the scope of the claims. One of ordinary skill in the art would recognize many variations, alternatives, and modifications.

FIG. 17 is a simplified diagram showing certain devices for the component 542 as a part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 17, the component 542 includes a voltage-to-current converter 1510, a component 1520, and a phase-lock loop 1530. For example, the component 1520 determines the difference between two input signals in magnitude. In another example, the component 1520 receives a signal 1512 from the voltage-to-current converter 1510 and a signal 1534 from the phase-lock loop 1530, and outputs a signal 1522 representing the difference between the signal 1512 and the signal 1534 in magnitude.

As shown in FIGS. 7 and 17, the component 522 samples the signal 514 and generates the signal $V_{samp}$. Additionally, the Demag signal is generated by the component 520. In one embodiment, the duration of the Demag signal is proportional to the current of the primary winding 502 and also to the current of the secondary winding 504. For example, the duration of the Demag signal is the pulse width of the Demag signal as shown in FIG. 12.

In one embodiment, if the signal $V_{samp}$ is smaller than the signal $V_{ref}$ in magnitude, the magnitude of $V_{comp}$ exceeds the predetermined value, and the power conversion system 500 is in the CC mode. For example, the magnitude of $V_{comp}$ reaches its maximum, and the CC mode is detected. In another embodiment, in CC mode, the PWM/PFM switching frequency is controlled by the voltage $V_{samp}$. For example, the PWM/PFM switching frequency is linearly proportional to $V_{samp}$, which in turn is proportional to the output voltage $V_{out}$.

For example, in CC mode, $V_{out}$ under discontinuous conduction mode (DCM) is given by the following equation:

$$Po = Vo * Io = \tfrac{1}{2}\eta L_P F_{SW} I_p^2 \qquad (15)$$

where Po represents the output power of the conversion system 500. Additionally, Vo and Io represent the output voltage $V_{out}$ and the output current $I_{out}$ respectively. Moreover, Lp represents the inductance of the primary winding 502, Fsw represents the switching frequency, and Ip represents the peak current of the primary winding 502. η is constant.

If Fsw is proportional to $V_{samp}$, Fsw is also proportional to Vo as follows.

$$F_{SW} = \varepsilon Vo \qquad (16)$$

where ε is constant. Combining Equations 15 and 16, then $$Io = \frac{1}{2}\eta L_P \frac{F_{SW}}{Vo} I_p^2 = \frac{1}{2}\eta L_P \varepsilon I_p^2 \qquad (17)$$

Since η and ε are constants, the output current Io is constant if Ip and Lp both are precisely controlled. But if Lp is not precisely controlled, To may change even in the CC mode.

Alternatively, if $$L_P \frac{F_{SW}}{Vo} = \alpha \qquad (18)$$

where α is constant, then $$Io = \tfrac{1}{2}\eta \alpha I_p^2 \qquad (19)$$

Hence Io can be made constant if Ip is precisely controlled and if Equation 18 is satisfied.

Additionally, for flyback operation, according to an embodiment, the demagnetization duration can be determined by inductance Ls of the secondary winding 504, the peak current $I_{P\_sec}$ of the secondary winding 504, and the output voltage Vo as follows. For example, the demagnetization duration is the same as the duration of the Demag signal, such as the pulse width of the Demag signal as shown in FIG. 12.

$$T_{Demag} = \frac{Ls \times I_{P\_sec}}{Vo} \qquad (20)$$

Since Ls is proportional to Lp and $I_{P\_sec}$ is proportional to Ip, $$T_{Demag} = \beta \frac{Lp \times I_P}{Vo} \qquad (21)$$

where β is a constant. If Equation 18 is satisfied, then $$T_{Demag} \times F_{SW} = \beta \frac{Lp \times I_P}{Vo} \times F_{SW} = \alpha\beta I_p \qquad (22)$$

Hence, if Ip is precisely controlled, $$T_{Demag} \times F_{SW} = \gamma \qquad (23)$$

$$\text{and } I_p = \frac{\gamma}{\alpha\beta} \qquad (24)$$

where γ is constant. Combining Equations 19 and 24, $$Io = \frac{1}{2\beta}\eta\gamma I_p \quad (25)$$

According to an embodiment, as shown in FIGS. 7 and 17, in the CC mode, the PWM/PFM switching frequency is locked by the phase locked loop 1530.

For example, $$F_{SW} = \frac{\gamma}{T_{Demag}} \quad (26)$$

and $Io \propto \gamma I_p$ (27)

According to another embodiment, by adjusting $F_{SW}$ based on $T_{Demag}$ according to Equation 26, γ remains constant. For example, γ is a constant equal to or larger than 0.25 and equal to or smaller than 0.75. Hence, the output current Io is kept constant, so long as $I_p$, in addition to γ, is also controlled to be constant, according to Equation 27.

For example, the component 542 locks the switching frequency $F_{SW}$ according to inductance of the primary winding 502 and thus compensates for the variations in the primary-winding inductance. In yet another example, the output current $I_{out}$ in the constant current (CC) mode is made independent of primary-winding inductance. As shown in FIGS. 7 and 17, the oscillator 562 receives the signal 1522 from the component 1520 as part of the component 542, and also sends a clock signal 1532 to the phase-lock loop 1530 as part of the component 542, according to an embodiment.

Figure 18:
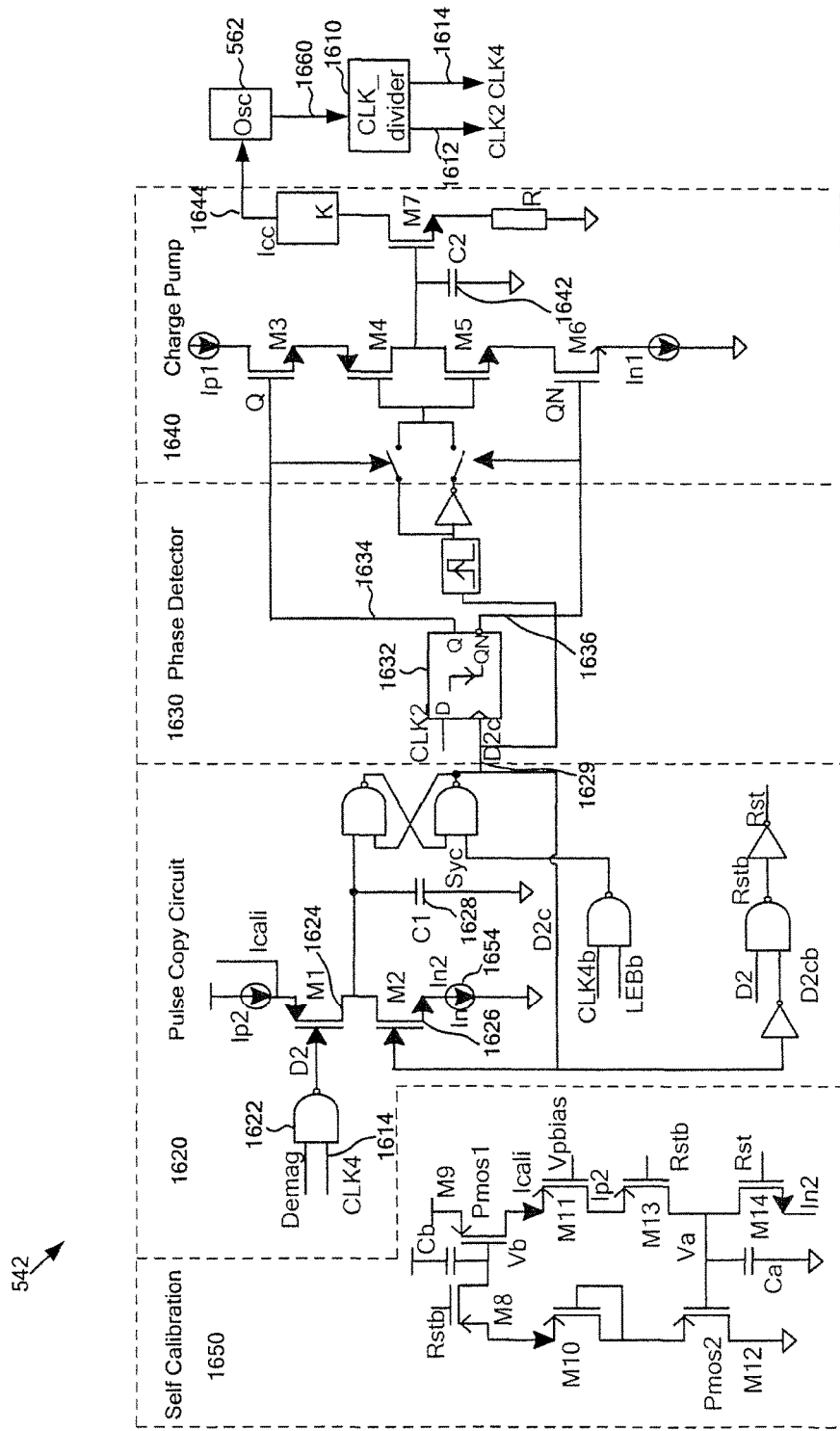
FIG. 18 is a simplified diagram showing certain devices for a component for constant output current (CC) control as part of the switch-mode power conversion system according to an embodiment of the present invention.

FIG. 18 is a simplified diagram showing certain devices for the component 542 for constant output current (CC) control as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 18, the component 542 includes a pulse copy circuit 1620, a phase detector 1630, a charge pump 1640, and a self calibration circuit 1650. In one embodiment, the pulse copy circuit 1620 receives the Demag signal from the component 520 and a clock signal 1614 from a clock divider 1610, and generates a signal 1629. The clock signal 1614 is represented by CLK4, and the signal 1629 is represented by D2C. For example, the signal D2C is a copy of the Demag signal but synchronized with the clock signal CLK4.

In another embodiment, the pulse copy circuit 1620 includes a NAND gate 1622, MOS transistors 1624 and 1626, and a capacitor 1628. For example, the NAND gate 1622 receives the Demag signal and the clock signal 1614, and generates a voltage signal D2. As shown in FIG. 18, the voltage signal D2 controls the MOS transistor 1624. For example, if the signal D2 is at a logic low level, the MOS transistor 1624 charges the capacitor 1628 with a current $I_{p2}$. In another example, if the signal D2 is at a logic high level, the MOS transistor 1626 discharges the capacitor 1628 with a current $I_{n2}$. According to one embodiment, immediately prior to such discharge, the voltage of the capacitor 1628 reflects the pulse width at the low voltage level for the signal D2. According to another embodiment, the current $I_{p2}$ is equal to the current $I_{n2}$. For example, the pulse width at the low voltage level for the signal D2 is the same as the pulse width at the high voltage level for the signal D2C. In another example, the rising edge of the signal D2C is synchronized with the falling edge of the clock signal 1614. In yet another example, the rising edge of the signal D2C is synchronized with the falling edge of a clock signal 1612, which is represented by CLK2.

Figure 19:
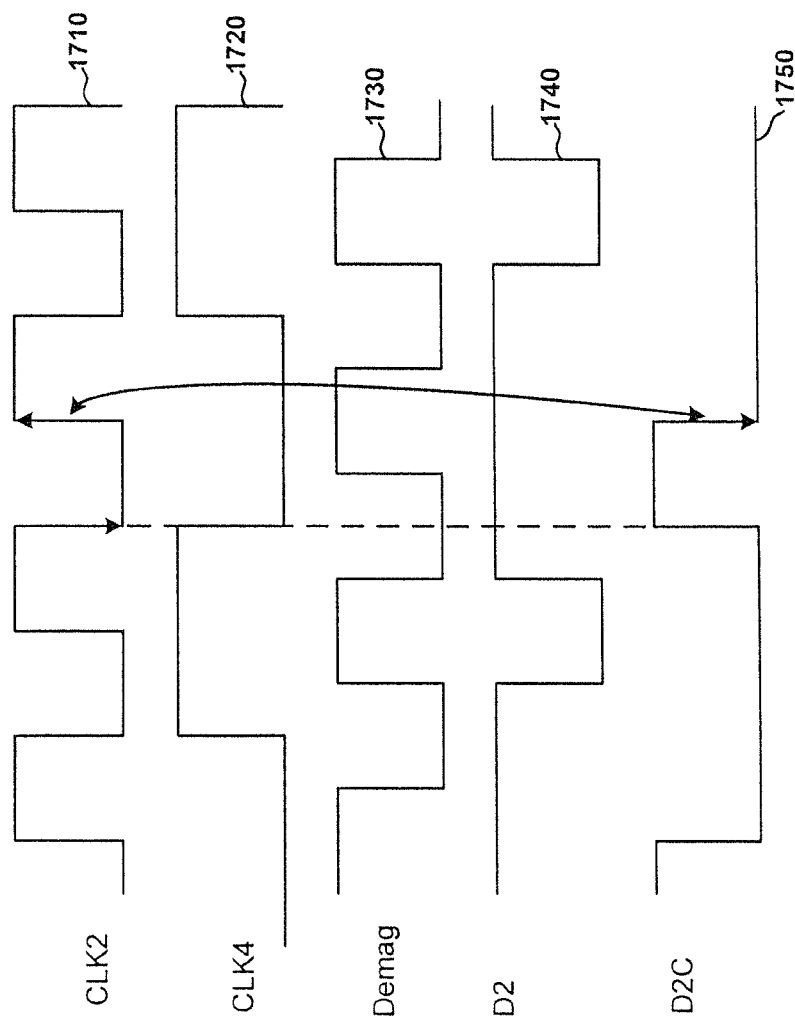
FIG. 19 is a simplified timing diagram for generating the D2C signal by a pulse copy circuit as part of the switch-mode power conversion system according to an embodiment of the present invention.

FIG. 19 is a simplified timing diagram for generating the D2C signal by the pulse copy circuit 1620 as part of the switch-mode power conversion system 500 according to an embodiment of the present invention. This diagram is merely an example, which should not unduly limit the scope of the claims. One of ordinary skill in the art would recognize many variations, alternatives, and modifications.

The waveform 1710 represents the clock signal CLK2 as a function of time, the waveform 1720 represents the clock signal CLK4 as a function of time, and the waveform 1730 represents the Demag signal as a function of time. Additionally, the waveform 1740 represents the D2 signal as a function of time, and the waveform 1750 represents the D2C signal as a function of time.

As shown in FIG. 19, as the result, the rising edge of the D2C signal is synchronized with the falling edge of the clock signal CLK2 and the falling edge of the clock signal CLK4. Also, as shown in FIG. 19, the pulse width at the high voltage level for the Demag signal is the same as the pulse width at the high voltage level for the D2C signal.

Returning to FIG. 18, the signal 1629 is outputted from the pulse copy circuit 1620 to the phase detector 1630. The phase detector 1630 includes a D flip-flop 1632. For example, the D flip-flop 1632 compares the pulse width at the high voltage level for the D2C signal and the pulse width at the low voltage level for the clock signal CLK2.

In one embodiment, if the pulse width at the high voltage level for the D2C signal is larger than the pulse width at the low voltage level for the clock signal CLK2, a signal 1634 at the Q terminal is at the high voltage level and a signal 1636 at the QN terminal is at the low voltage level. In another embodiment, if the pulse width at the high voltage level for the D2C signal is smaller than the pulse width at the low voltage level for the clock signal CLK2, the signal 1634 at the Q terminal is at the low voltage level and the signal 1636 at the QN terminal is at the high voltage level.

As shown in FIG. 18, the signals 1634 and 1636 are received by the charge pump 1640. The charge pump 1640 includes a capacitor 1642. For example, the capacitor 1642 is charged or discharged in response to the signals 1634 and 1636. In another example, the charge and discharge of the capacitor 1642 is used to regulate a current signal 1644, which is represented by $I_{cc}$.

According to an embodiment, the current signal 1644 is received by the oscillator 562, which generates a clock signal 1660. For example, the current signal 1644 is used to regulate the bias current of the oscillator 562 in order to regulate the frequency of the clock signal 1660.

As discussed above and further emphasized here, FIG. 7 is merely an example, which should not unduly limit the scope of the claims. One of ordinary skill in the art would recognize many variations, alternatives, and modifications. For example, as shown in FIG. 18, the conversion system 500 includes a clock divider 1610, which receives the clock signal 1660 and generates the clock signals 1612 and 1614.

According to one embodiment, the frequency of the clock signal 1612 is half of the frequency of the clock signal 1660. According to another embodiment, the frequency of the clock signal 1612 is twice as much as the frequency of the clock signal 1614. For example, as shown in FIG. 19, the falling edge of the clock signal 1614 (i.e., the clock signal CLK4) is synchronized with the falling edge of the clock signal 1612 (i.e., the clock signal CLK2).

Returning to FIG. 18, the clock signals 1612 and 1614 are outputted to the component 542 for constant current (CC) control. For example, the clock signal 1532 as shown in FIG. 17 represents the clock signals 1612 and 1614. In another example, even though FIGS. 7 and 17 do not explicitly show the clock divider 1610, the clock divider 1610 is a part of the conversion system 500 according to an embodiment.

In response, the component 542 generates the current signal 1644, which is received by the oscillator 562. For example, the current signal 1644 is the signal 1534 as shown in FIG. 17. According to one embodiment, the oscillator 562, the clock divider 1610, and the component 542 forms a loop.

For example, the loop has a sufficiently high gain. In another example, after the loop becomes stable, the period of the clock signal 1612 is locked at twice as long as the pulse width at the high voltage level for the Demag signal. In one embodiment, the pulse width at the high voltage level for the Demag signal is the same as the pulse width at the high voltage level for the clock signal 1612 (i.e., the clock signal CLK2), as shown in FIG. 19. In another embodiment, the period for the clock signal 1612 is equal to a constant multiplied by the pulse width at the high voltage level for the Demag signal. For example, the constant is equal to $1/\gamma$.

Also as shown in FIG. 19 and discussed above, the pulse width at the high voltage level for the Demag signal is the same as the pulse width at the high voltage level for the D2C signal according to an embodiment of the present invention. Hence, for example, the pulse width at the high voltage level for the D2C signal is the same as the pulse width at the high voltage level for the clock signal CLK2.

Again returning to FIG. 18, the self calibration circuit 1650 is configured to calibrate the magnitude of the current $I_{p2}$ and the magnitude of the current $I_{n2}$. For example, the magnitude of the current $I_{p2}$ is equal to the magnitude of the current $I_{n2}$.

According to one embodiment, as shown in FIG. 18, the Demag signal and the clock signal CLK4 are fed into the loop that includes the oscillator 562, the clock divider 1610, and the component 542. The loop adjusts the frequency of the clock signal CLK2 such that the frequency of the clock signal CLK2 is locked to the frequency of the Demag signal. For example, the frequency of the clock signal CLK2 is equal to the switching frequency of the drive signal 548, as shown in Equation 26.

As discussed above, in one embodiment, the output current $I_{out}$ is determined by the peak current $I_p$ of the primary winding 502 when the switch 550 turns off. But the peak current $I_p$ may change with an AC input voltage (e.g., VAC in FIG. 7) due to the propagation delay of the control circuit. For example, the higher AC input voltage results in the higher peak current $I_p$ and vice versa. Therefore, the peak current $I_p$ should be precisely controlled at a constant level regardless of the input AC voltage according to one embodiment.

Figure 20:
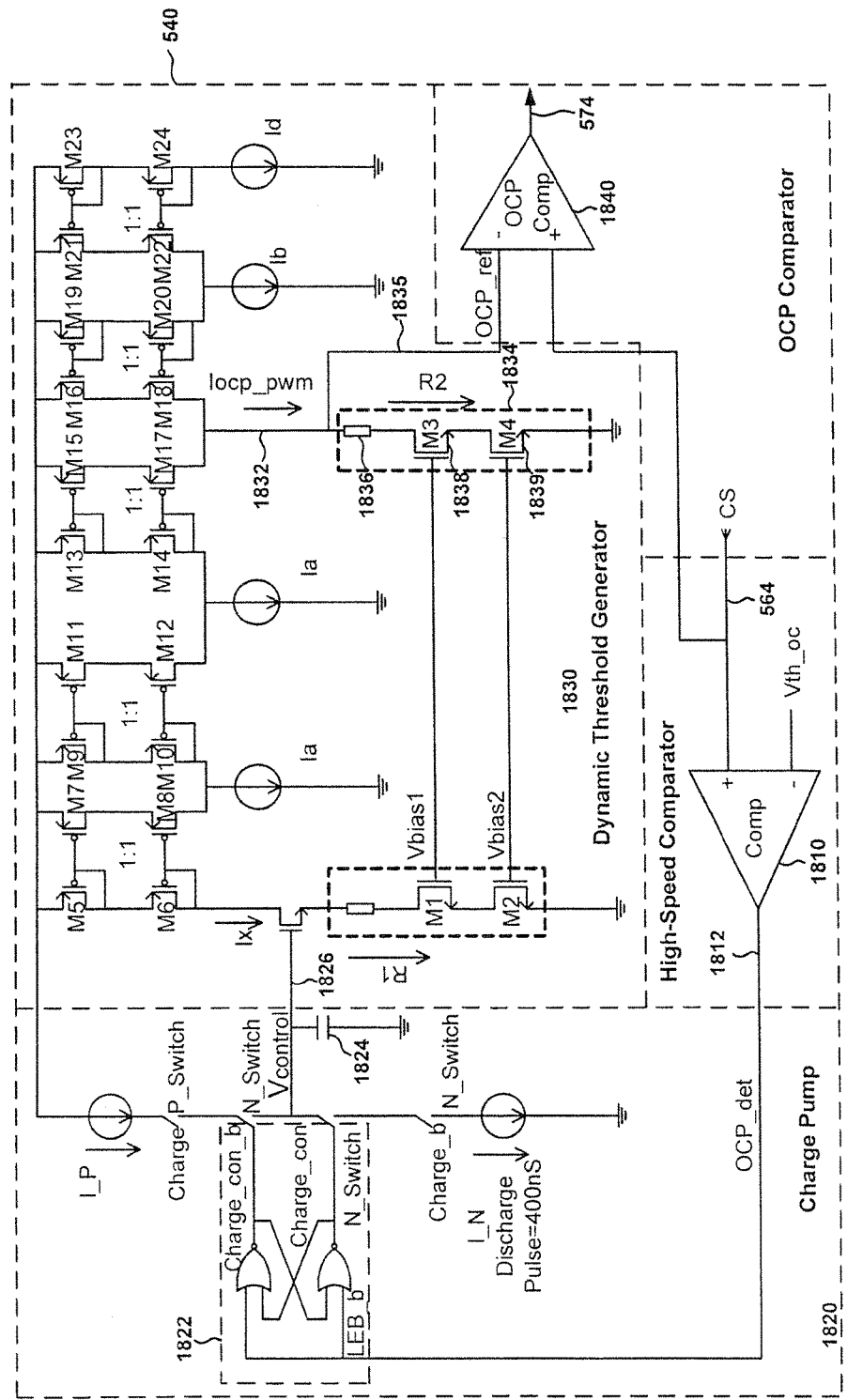
FIG. 20 is a simplified diagram showing certain devices for a component for current sensing (CS) peak regulation as part of the switch-mode power conversion system 500 according to an embodiment of the present invention.

FIG. 20 is a simplified diagram showing certain devices for the component 540 for current sensing (CS) peak regulation as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 20, the component 540 includes a high-speed comparator 1810, a charge pump 1820, a dynamic threshold generator 1830, and an over-current-protection (OCP) comparator 1840.

In one embodiment, the high-speed comparator 1810 receives Vth_oc in addition to the signal 564 from the terminal 566 (i.e., the terminal CS). For example, the current that flows through the primary winding 502 is sensed by the resistor 580, whose resistance is represented by Rs. As shown in FIG. 7, a current 582, whose magnitude is represented by Is, flows through the resistor 580, and in response, the resistor 580 generates the voltage signal 564, whose magnitude is represented by Vcs. In another example, at the time when the switch 550 is just being turned off, Vcs is compared with Vth_oc.

In another embodiment, the high-speed comparator 1810 compares Vth_oc with the signal 564, and generates a comparison signal 1812. The comparison signal 1812 is represented by OCP_det. For example, the comparison signal 1812 is received by the charge pump 1820. In another example, the charge pump 1820 includes an RS latch 1822 and a capacitor 1824. In one embodiment, the RS latch 1822 receives the comparison signal 1812 and in response controls charging and discharging of the capacitor 1824. In another embodiment, the capacitor 1824 provides a voltage signal 1826, which is received by the dynamic threshold generator 1830.

In yet another embodiment, the dynamic threshold generator 1830 converts the voltage signal 1826 into a current signal. For example, the converted current signal is processed by current mirrors, which generate a dynamic current signal 1832. The dynamic current signal 1832 is represented by Iocp_PWM. In another example, the current signal 1832 is received by a dynamic resistor 1834, which is represented by R2. In one embodiment, the dynamic resistor 1834 includes a linear resistor 1836 and transistors 1838 and 1839. For example, the transistors 1838 and 1839 provide temperature-related resistance compensation.

In another embodiment, the dynamic resistor 1834 converts the current signal 1832 into a voltage signal 1835. The voltage signal 1835 is represented by OCP_ref. For example, if Vth_oc is smaller than the voltage signal 564 in magnitude, the voltage signal 1835 would be adjusted lower by the dynamic threshold generator 1830. In another example, if Vth_oc is larger than the voltage signal 564 in magnitude, the voltage signal 1835 would be adjusted higher by the dynamic threshold generator 1830.

As shown in FIG. 20, the voltage signal 1835 is received by the over-current-protection (OCP) comparator 1840. The OCP comparator 1840 also receives the signal 564 from the terminal 566 (i.e., the terminal CS). For example, the OCP comparator 1840 compares OCP_ref with the signal 564, and generates the signal 574. In another example, the signal 574 is received by the component 538 in order to regulate the peak current of the primary winding 502.

As discussed above, the signal 564 is, for example, compared with Vth_OC by the high-speed comparator 1810, and compared with OCP_ref by the OCP comparator 1840. In one embodiment, the high-speed comparator 1810, the charge pump 1820, the dynamic threshold generator 1830, the OCP comparator 1840, and others form a loop with a high gain. In another embodiment, even if the change in line voltage causes the change of slope for the signal 564, the peak current of the primary winding 502 is maintained at a constant level. In yet another embodiment, even if the propagation delay for the PWM/PFM signal changes, the peak current of the primary winding 502 is maintained at a constant level.

According to yet another embodiment, as shown in FIG. 20, the comparison signal 1812 is used to control the charge pump 1820 in order to adjust the voltage signal 1835 that is represented by OCP_ref. For example, the voltage signal 1835 serves as the threshold voltage of the OCP comparator 1840. As a result, the peak current of the primary winding 502 is regulated by an internal loop such that the peak current equals to $$\frac{Vth\_oc}{Rs},$$

regardless of the magnitude of the line voltage, according to certain embodiments of the present invention. Therefore, based on Equation 25, the constant output current is, for example, as follows.

$$Io = \frac{1}{2\beta}\eta\gamma\frac{Vth\_oc}{Rs} \qquad (28)$$

In another example, the output voltage Vo is controlled by regulating the output signal 514 that is represented by $V_{INV}$. Therefore, the constant voltage Vo and the constant current Io can be obtained in the CV mode and the CC mode respectively, according to some embodiments of the present invention. For example, the CC mode is applicable for charging a battery until the voltage of the battery reaches the predetermined magnitude.

According to another embodiment, a system (e.g., as shown in FIG. 7) for regulating a power converter includes a first signal generator (e.g., as shown by the component 520) configured to receive at least an input signal and generate at least a first output signal associated with demagnetization and a second output signal associated with sampling. Additionally, the system includes a sampling component (e.g., as shown by the component 522) configured to receive at least the input signal and the second output signal, sample the input signal based on at least information associated with the second output signal, and generate at least a third output signal associated with one or more sampled magnitudes. Moreover, the system includes an error amplifier (e.g., as shown by the component 524) configured to receive at least the third output signal and a first threshold voltage and generate at least a fourth output signal with a capacitor, the capacitor being coupled to the error amplifier. Also, the system includes a compensation component (e.g., as shown by the component 532) configured to receive at least the fourth output signal and generate at least a compensation signal. The input signal is a combination of the compensation signal and a first sensed signal. The first sensed signal is associated with a first winding coupled to a secondary winding for a power converter, and the secondary winding is related to an output current and an output voltage for the power converter. Additionally, the system includes the first controller (e.g., as shown by the component 542) for regulating at least the output current. For example, the first controller is configured to receive at least the first output signal and the third output signal and generate at least a first control signal based on at least information associated with the first output signal and the third output signal. Moreover, the system includes a second controller (e.g., as shown by the component 534) for regulating at least the output voltage. For example, the second controller being configured to receive at least the fourth output signal and generate at least a second control signal (e.g., as shown by the signal 558) and a third control signal (e.g., as shown by the signal 536) based on at least information associated with the fourth output signal. Also, the system includes an oscillator (e.g., as shown by the component 562) configured to receive at least the first control signal and the second control signal and generate at least a clock signal, and a second signal generator (e.g., as shown by the component 538) configured to receive at least the clock signal, the third control signal, and a fourth control signal, and generate at least a modulation signal. Additionally, the system includes a gate driver (e.g., as shown by the component 546) configured to receive at least the modulation signal and output at least a drive signal to a switch. For example, the switch is configured to affect a first current flowing through a primary winding coupled to the secondary winding. Moreover, the system includes a third controller (e.g., as shown by the component 540) for regulating at least a peak current. For example, the third controller being configured to receive the third control signal, a second sensed signal, and a second threshold voltage, and output the fourth control signal to the second signal generator. In another example, the second sensed signal is associated with the first current flowing through the primary winding for the power converter.

For example, the system further includes a feed forward component (e.g., as shown by the component 568) configured to receive a fifth output signal from the error amplifier (e.g., as shown by the component 524) and output a sixth output signal to the second controller (e.g., as shown by the component 534). In another example, the system is configured to regulate the output current to a constant current level if the fourth output signal is larger than a predetermined value in magnitude and regulate the output voltage to a constant voltage level if the fourth output signal is smaller than the predetermined value in magnitude. In yet another example, the sampling component (e.g., as shown by the component 522) is further configured to perform at least one sampling process for the input signal at or near an end of a demagnetization period, generate a first sampled magnitude, and hold the first sampled magnitude until a second sampled magnitude is generated, the first sampled magnitude and the second sampled magnitude being two of the one or more sampled magnitudes. In yet another example, the first signal generator (e.g., as shown by the component 520 and as shown by FIGS. 7 and 10) is further configured to receive the third output signal, determine a third threshold voltage based on at least information associated with the third output signal, compare the third threshold voltage and the input signal in magnitude, and generate the first output signal based on at least information associated with the third threshold voltage and the input signal.

According to yet another embodiment, a system (e.g., as shown by FIGS. 7 and 9) for regulating a power converter includes a sampling component (e.g., as shown by the component 522) configured to receive at least an input signal, sample the input signal, and generate at least a first output signal associated with one or more sampled magnitudes. For example, the input signal being associated with at least a first winding coupled to a secondary winding for a power converter, and the secondary winding is related to an output current and an output voltage for the power converter. Additionally, the system includes an error amplifier (e.g., as shown by the component 524) configured to receive at least the first output signal and a threshold voltage, generate a second output signal with a circuit for loop stabilization compensation, and generate a third output signal. For example, the circuit for loop stabilization compensation is a capacitor (e.g., as shown by the capacitor 526), and the capacitor is coupled to the error amplifier. Moreover, the system includes a feed forward component (e.g., as shown by the component 568) configured to receive the third output signal and generate a fourth output signal based on at least information associated with the third output signal, and a controller (e.g., as shown by the component 534) for regulating at least the output voltage. For example, the controller is configured to receive at least the second output signal and the fourth output signal, and generate at least a first control signal. Also, the system includes a signal generator (e.g., as shown by the component 538) configured to receive at least the first control signal and generate at least a modulation signal based on at least information associated with the first control signal, and a gate driver (e.g., as shown by the component 546) configured to receive at least the modulation signal and output at least a drive signal to a switch. For example, the switch is configured to affect a first current flowing through a primary winding coupled to the secondary winding.

For example, the controller (e.g., as shown by the component 534) is further configured to regulate the output voltage to a constant voltage level if the second output signal is smaller than a predetermined value in magnitude. In another example, the system further includes a compensation component (e.g., as shown by the component 532) configured to receive at least the second output signal and generate a compensation signal based on at least information associated with the second output signal. For example, the input signal is a combination of the compensation signal and a sensed signal, and the sensed signal is associated with at least the first winding coupled to the secondary winding.

According to yet another embodiment, a system for regulating a power converter is shown by, for example, FIGS. 7, 14(*a*) and 14(*b*) or FIGS. 7, 15(*a*) and 15(*b*). The system includes a sampling component (e.g., as shown by the component 522) configured to receive at least an input signal, sample the input signal, and generate at least a first output signal associated with one or more sampled magnitudes, and an error amplifier (e.g., as shown by the component 524) configured to receive at least the first output signal and a threshold voltage, generate a second output signal with a capacitor, and generate a third output signal, the capacitor being coupled to the error amplifier. Additionally, the system includes a feed forward component (e.g., as shown by the component 568) configured to receive the third output signal and generate a fourth output signal based on at least information associated with the third output signal, and a controller (e.g., as shown by the component 534) configured to receive at least the second output signal and the fourth output signal, and generate at least a control signal. Moreover, the system includes a compensation component (e.g., as shown by the component 532) configured to receive at least the second output signal and generate at least a compensation signal based on at least information associated with the second output signal, the input signal being a combination of the compensation signal and another signal.

For example, the second output signal is a voltage signal, and the compensation signal is a current signal. In another example, the system further includes a signal generator (e.g., as shown by the component 538) configured to receive at least the control signal, and generate at least a modulation signal based on at least information associated with the control signal, and a gate driver (e.g., as shown by the component 546) configured to receive at least the modulation signal and output at least a drive signal to a switch, the switch being configured to affect a current flowing through a primary winding for a power converter.

According to yet another embodiment, a system (e.g., as shown by FIGS. 7 and 17) for regulating a power converter includes a first signal generator (e.g., as shown by the component 520) configured to receive at least an input signal and generate at least a first output signal associated with demagnetization and a second output signal associated with sampling. For example, the input signal is associated with at least a first winding coupled to a secondary winding for a power converter, and the secondary winding is related to an output current and an output voltage for the power converter. Additionally, the system includes a sampling component (e.g., as shown by the component 522) configured to receive at least the input signal and the second output signal, sample the input signal based on at least information associated with the second output signal, and generate at least a third output signal associated with one or more sampled magnitudes. Moreover, the system includes a first controller (e.g., as shown by the component 542) for regulating at least the output current, which is configured to receive at least the first output signal and the third output signal and generate at least a first control signal based on at least information associated with the first output signal and the third output signal. Also, the system includes an oscillator (e.g., as shown by the component 562) configured to receive at least the first control signal and generate at least a clock signal based on at least information associated with the first control signal, and a second signal generator (e.g., as shown by the component 538) configured to receive at least the clock signal and a second control signal, and generate at least a modulation signal based on at least information associated with the clock signal and the second control signal. Additionally, the system includes a gate driver (e.g., as shown by the component 546) configured to receive at least the modulation signal and output at least a drive signal to a switch. For example, the switch is configured to affect a first current flowing through a primary winding coupled to the secondary winding. Moreover, the system includes a third controller (e.g., as shown by the component 540) for regulating at least a peak current is configured to receive at least a sensed signal and a threshold voltage, and output the second control signal to the second signal generator (e.g., as shown by the component 538). For example, the sensed signal is associated with the first current flowing through the primary winding for the power converter. The modulation signal corresponds to a switching frequency, and the first output signal corresponds to a demagnetization pulse width.

For example, the switching frequency is inversely proportional to the demagnetization pulse width, the switching period is proportional to the demagnetization pulse width, and the output current is proportional to the peak current. In another example, the peak current is constant, and the output current is constant. In another example, the system of claim 12 (e.g., as shown by FIGS. 7 and 17) wherein the first controller (e.g., as shown by the component 542) includes a voltage-to-current converter (e.g., as shown by the component 1510) configured to receive the third output signal and generate a second current, a phase-lock loop (e.g., as shown by the component 1530) configured to receive at least the first output signal and the clock signal and generate a third current, and a determining component (e.g., as shown by the component 1520) configured to receive the second current and the third current, determine a difference between the second current and the third current in magnitude, and generate the first control signal based on at least information associated with the second current and the third current.

According to yet another embodiment, a system (e.g., as shown by FIGS. 7 and 20) for regulating a power converter includes a controller (e.g., as shown by the component 540) for regulating at least a peak current. For example, the controller is configured to receive at least a sensed signal and a first threshold voltage and generate at least a first control signal, and the sensed signal is associated with a first current flowing through a primary winding for a power converter. Additionally, the system includes a signal generator (e.g., as shown by the component 538) configured to receive at least the first control signal and generate at least a modulation signal, and a gate driver (e.g., as shown by the component 546) configured to receive at least the modulation signal and output at least a drive signal to a switch. For example, the switch is configured to affect the first current. In another example, the controller (e.g., as shown by the component 540) includes a first comparator (e.g., as shown by the component 1810) configured to receive the sensed signal and the first threshold voltage and generate a comparison signal based on at least information associated with the sensed signal and the first threshold voltage, and a charge pump (e.g., as shown by the component 1820) configured to receive the comparison signal and generate a second control signal based on at least information associated with the comparison signal. Additionally, the controller (e.g., as shown by the component 540) includes a threshold generator (e.g., as shown by the component 1830) configured to receive the second control signal and generate a second threshold voltage based on at least information associated with the second control signal, and a second comparator (e.g., as shown by the component 1840) configured to receive the second threshold voltage and the sensed signal and generate the first control signal based on at least information associated with the second threshold voltage and the sensed signal.

According to yet another embodiment, a method (e.g., as implemented by FIG. 7) for regulating a power converter includes receiving at least an input signal by a first signal generator (e.g., as shown by the component 520), and generating at least a first output signal associated with demagnetization and a second output signal associated with sampling based on at least information associated with the input signal. Additionally, the method includes receiving at least the input signal and the second output signal by a sampling component (e.g., as shown by the component 522), sampling the input signal based on at least information associated with the second output signal, generating at least a third output signal associated with one or more sampled magnitudes, receiving at least the third output signal and a first threshold voltage by an error amplifier (e.g., as shown by the component 524), and generating at least a fourth output signal with a capacitor coupled to the error amplifier. Moreover, the method includes receiving at least the fourth output signal by a compensation component (e.g., as shown by the component 532), and generating at least a compensation signal based on at least information associated with the fourth output signal. For example, the input signal is a combination of the compensation signal and a first sensed signal. In another example, the first sensed signal is associated with a first winding coupled to a secondary winding for a power converter, and the secondary winding is related to an output current and an output voltage for the power converter. Also, the method includes receiving at least the first output signal and the third output signal by a first controller (e.g., as shown by the component 542) for regulating at least the output current, generating at least a first control signal based on at least information associated with the first output signal and the third output signal, receiving at least the fourth output signal by a second controller (e.g., as shown by the component 534) for regulating at least the output voltage, and generating at least a second control signal (e.g., as shown by the signal 558) and a third control signal (e.g., as shown by the signal 536) based on at least information associated with the fourth output signal. Additionally, the method includes receiving at least the first control signal and the second control signal by an oscillator (e.g., as shown by the component 562), generating at least a clock signal by the oscillator (e.g., as shown by the component 562), receiving at least the clock signal, the third control signal, and a fourth control signal by a second signal generator (e.g., as shown by the component 538), and generating at least a modulation signal by the second signal generator (e.g., as shown by the component 538). Moreover, the method includes receiving at least the modulation signal by a gate driver (e.g., as shown by the component 546), outputting at least a drive signal to a switch to affect a first current flowing through a primary winding coupled to the secondary winding, receiving the third control signal, a second sensed signal, and a second threshold voltage by a third controller (e.g., as shown by the component 540) for regulating at least a peak current; and outputting the fourth control signal to the second signal generator. For example, the second sensed signal is associated with the first current flowing through the primary winding for the power converter.

In another example, the method further includes receiving a fifth output signal by a feed forward component (e.g., as shown by the component 568) from the error amplifier (e.g., as shown by the component 524), and outputting a sixth output signal to the second controller (e.g., as shown by the component 534) based on at least information associated with fifth output signal. In yet another example, the method further includes regulating the output current to a constant current level if the fourth output signal is larger than a predetermined value in magnitude, and regulating the output voltage to a constant voltage level if the fourth output signal is smaller than the predetermined value in magnitude. In yet another example, the process for sampling the input signal includes sampling the input signal at or near a first end of a first demagnetization period, generating a first sampled magnitude corresponding to the first demagnetization period, sampling the input signal at or near a second end of a second demagnetization period, and generating a second sampled magnitude corresponding to the second demagnetization period. The first sampled magnitude and the second sampled magnitude are two of the one or more sampled magnitudes. In yet anther example, the process for generating at least a third output signal includes holding the first sampled magnitude until the second sampled magnitude is generated. In yet another example, the method (e.g., as implemented by FIGS. 7 and 10) the process for generating at least a first output signal associated with demagnetization and a second output signal associated with sampling includes receiving the third output signal, determining a third threshold voltage based on at least information associated with the third output signal, comparing the third threshold voltage and the input signal in magnitude, and generating the first output signal based on at least information associated with the third threshold voltage and the input signal.

According to yet another embodiment, a method (e.g., as implemented by FIGS. 7 and 9) for regulating a power converter includes receiving at least an input signal by a sampling component (e.g., as shown by the component 522). For example, the input signal is associated with at least a first winding coupled to a secondary winding for a power converter, and the secondary winding is related to an output current and an output voltage for the power converter. Additionally, the method includes sampling the input signal by the sampling component (e.g., as shown by the component 522), generating at least a first output signal associated with one or more sampled magnitudes, receiving at least the first output signal and a threshold voltage by an error amplifier (e.g., as shown by the component 524), and generating a second output signal with a capacitor coupled to the error amplifier. Moreover, the method includes generating a third output signal by the error amplifier, receiving the third output signal by a feed forward component, generating a fourth output signal based on at least information associated with the third output signal, receiving at least the second output signal and the fourth output signal by a controller (e.g., as shown by the component 534) for regulating at least the output voltage, and generating at least a first control signal based on at least information associated with the second output signal and the fourth output signal. Also, the method includes receiving at least the first control signal by a signal generator (e.g., as shown by the component 538), generating at least a modulation signal based on at least information associated with the first control signal, receiving at least the modulation signal by a gate driver (e.g., as shown by the component 546), and outputting at least a drive signal to a switch to affect a first current flowing through a primary winding coupled to the secondary winding.

For example, the method further includes regulating the output voltage to a constant voltage level if the second output signal is smaller than a predetermined value in magnitude. In another example, the method includes receiving at least the second output signal by a compensation component (e.g., as shown by the component 532), and generating a compensation signal based on at least information associated with the second output signal. The input signal is a combination of the compensation signal and a sensed signal, and the sensed signal is associated with at least the first winding coupled to the secondary winding.

According to yet another embodiment, a method for regulating a power converter is implemented by, for example, FIGS. 7, 14(a) and 14(b) or FIGS. 7, 15(a) and 15(b). The method includes receiving at least an input signal by a sampling component (e.g., as shown by the component 522), sampling the input signal by the sampling component (e.g., as shown by the component 522), and generating at least a first output signal associated with one or more sampled magnitudes. Additionally, the method includes receiving at least the first output signal and a threshold voltage by an error amplifier (e.g., as shown by the component 524), generating a second output signal with a capacitor coupled to the error amplifier based on at least information associated with the first output signal and the threshold voltage, and generating a third output signal based on at least information associated with the first output signal and the threshold voltage. Moreover, the method includes receiving the third output signal by a feed forward component (e.g., as shown by the component 568), generating a fourth output signal based on at least information associated with the third output signal, receiving at least the second output signal and the fourth output signal by a controller (e.g., as shown by the component 534), and generating at least a control signal based on at least information associated with the second output signal and the fourth output signal. Also, the method includes receiving at least the second output signal by a compensation component (e.g., as shown by the component 532), and generating at least a compensation signal based on at least information associated with the second output signal, the input signal being a combination of the compensation signal and another signal.

For example, the second output signal is a voltage signal, and the compensation signal is a current signal. In another example, the method further includes receiving at least the control signal by a signal generator (e.g., as shown by the component 538), generating at least a modulation signal based on at least information associated with the control signal, receiving at least the modulation signal by a gate driver (e.g., as shown by the component 546), and outputting at least a drive signal to a switch to affect a current flowing through a primary winding for a power converter.

According to yet another embodiment, a method (e.g., as implemented by FIGS. 7 and 17) for regulating a power converter includes receiving at least an input signal by a first signal generator (e.g., as shown by the component 520). For example, the input signal is associated with at least a first winding coupled to a secondary winding for a power converter, and the secondary winding is related to an output current and an output voltage for the power converter. Additionally, the method includes generating at least a first output signal associated with demagnetization and a second output signal associated with sampling based on at least information associated with the input signal, receiving at least the input signal and the second output signal by a sampling component (e.g., as shown by the component 522), sampling the input signal based on at least information associated with the second output signal, and generating at least a third output signal associated with one or more sampled magnitudes. Moreover, the method includes receiving at least the first output signal and the third output signal by a first controller (e.g., as shown by the component 542) for regulating at least the output current, generating at least a first control signal based on at least information associated with the first output signal and the third output signal, receiving at least the first control signal by an oscillator (e.g., as shown by the component 562), and generating at least a clock signal based on at least information associated with the first control signal. Also, the method includes receiving at least the clock signal and a second control signal by a second signal generator (e.g., as shown by the component 538), generating at least a modulation signal based on at least information associated with the clock signal and the second control signal, receiving at least the modulation signal by a gate driver (e.g., as shown by the component 546), and outputting at least a drive signal to a switch to affect a first current flowing through a primary winding coupled to the secondary winding. Additionally, the method includes receiving at least a sensed signal and a threshold voltage by a third controller (e.g., as shown by the component 540) for regulating at least a peak current, and outputting the second control signal to the second signal generator (e.g., as shown by the component 538). The sensed signal being associated with the first current flowing through the primary winding for the power converter, the modulation signal corresponds to a switching frequency, and the first output signal corresponds to a demagnetization pulse width.

For example, the switching frequency is inversely proportional to the demagnetization pulse width, and the output current is proportional to the peak current. In another example, the peak current is constant, and the output current is constant.

In yet another example, as implemented by, for example, FIGS. 7 and 17, the process for generating at least a first control signal includes receiving the third output signal by a voltage-to-current converter (e.g., as shown by the component 1510), generating a second current based on at least information associated with the third output signal, receiving at least the first output signal and the clock signal by a phase-lock loop (e.g., as shown by the component 1530), and generating a third current based on at least information associated with the first output signal and the clock signal. Additionally, the process for generating at least a first control signal includes receiving the second current and the third current by a determining component (e.g., as shown by the component 1520) configured to determine a difference between the second current and the third current in magnitude, and generating the first control signal based on at least information associated with the second current and the third current.

According to yet another embodiment, a method (e.g., as implemented by FIGS. 7 and 20) for regulating a power converter includes receiving at least a sensed signal and a first threshold voltage by a controller (e.g., as shown by the component 540) for regulating at least a peak current. For example, the sensed signal is associated with a first current flowing through a primary winding for a power converter. Additionally, the method includes generating at least a first control signal based on at least information associated with the sensed signal and the first threshold voltage, receiving at least the first control signal by a signal generator (e.g., as shown by the component 538), generating at least a modulation signal based on at least information associated with the first control signal, receiving at least the modulation signal by a gate driver (e.g., as shown by the component 546), and outputting at least a drive signal to a switch to affect the first current. The process for generating at least a first control signal includes receiving the sensed signal and the first threshold voltage by a first comparator (e.g., as shown by the component 1810), generating a comparison signal based on at least information associated with the sensed signal and the first threshold voltage, receiving the comparison signal by a charge pump (e.g., as shown by the component 1820), generating a second control signal based on at least information associated with the comparison signal, receiving the second control signal by a threshold generator (e.g., as shown by the component 1830), generating a second threshold voltage based on at least information associated with the second control signal, receiving the second threshold voltage and the sensed signal by a second comparator (e.g., as shown by the component 1840), and generating the first control signal based on at least information associated with the second threshold voltage and the sensed signal.

Many benefits are achieved by way of the present invention over conventional techniques. Certain embodiments of the present invention can reduce parts count and/or decrease system cost. Some embodiments of the present invention can improve reliability and/or efficiency. Certain embodiments of the present invention can simplify circuit design in switch mode flyback power converters. Some embodiments of the present invention provide a primary side sensing and regulation scheme. For example, the primary side sensing and regulation scheme can improve the load regulation. In another example, the primary side sensing and regulation scheme can compensate the primary winding inductance variation to achieve constant output current in a flyback converter that employs the primary side regulation. Certain embodiments of the present invention can provide, in the CC mode, a constant output current that does not change as primary winding inductance changes.

Referring to Equation 8, if N is constant, in order to keep $I_o$ constant, $$\frac{1}{T} \times \int_0^T \frac{V_{cs\_pk}}{R_s} \times \frac{T_{Demag}}{T_s} dt$$

should also be kept constant. Since $R_s$ is constant, there are at least the following methods to keep $$\frac{1}{T} \times \int_0^T \frac{V_{cs\_pk}}{R_s} \times \frac{T_{Demag}}{T_s} dt$$

constant:
(a) keeping $V_{cs\_pk}$ constant and keeping $$\frac{T_{Demag}}{T_s}$$

constant;
(b) keeping $$\frac{1}{T} \times \int_0^T V_{cs\_pk} dt$$

constant and keeping $$\frac{T_{Demag}}{T_s}$$

constant; or
(c) keeping $$\frac{1}{T} \times \int_0^T V_{cs\_pk} \times T_{Demag} dt$$

constant and keeping $T_s$ constant;

Certain embodiments of the present invention use the above method (a), (b), or (c) in order to implement the constant current (CC) mode, where the output current is maintained at the constant level, regardless of the output voltage and the inductance levels of the primary winding, the secondary winding, and the auxiliary winding.

Figure 21:
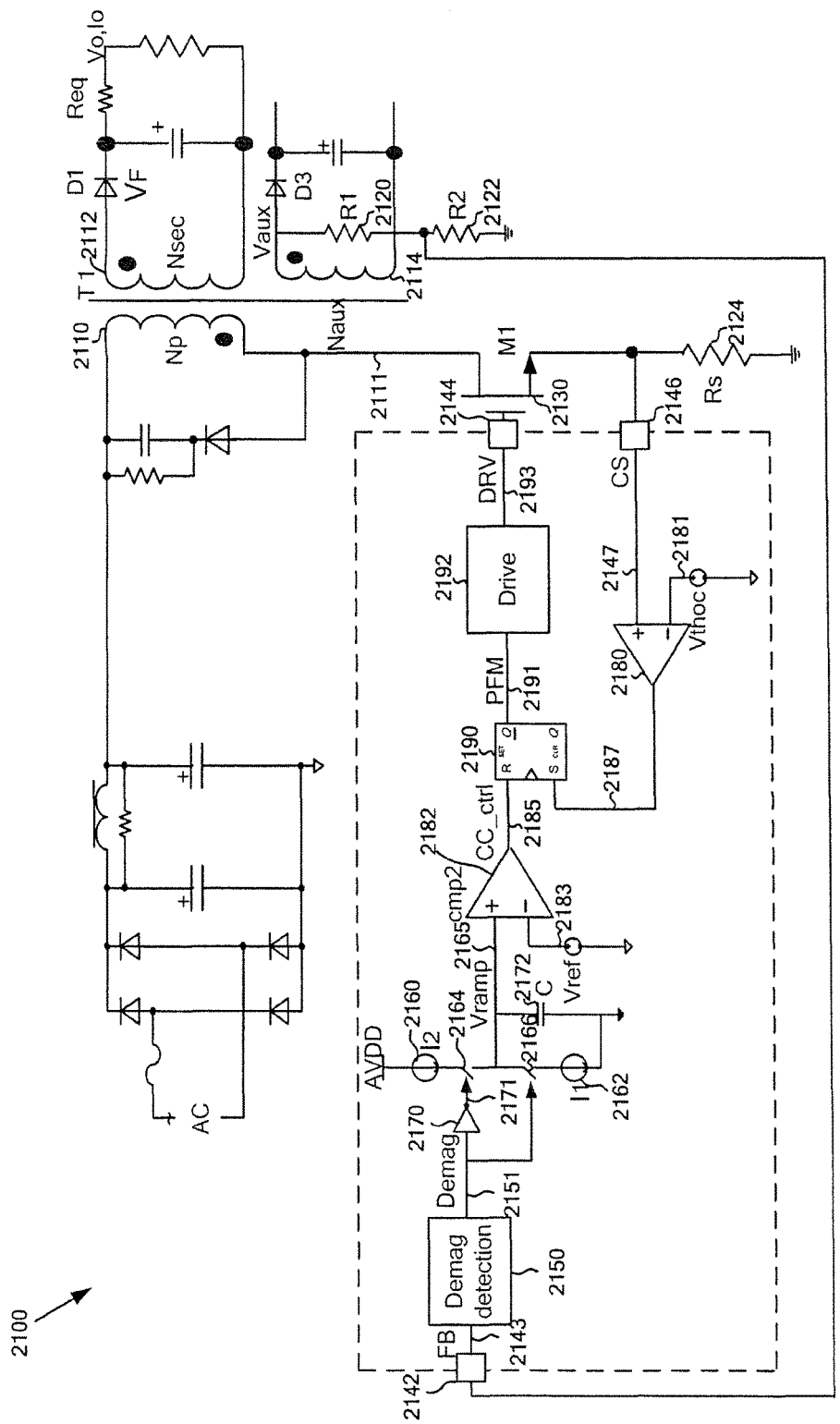
FIG. 21 is a simplified diagram for a switch-mode power conversion system with primary-side sensing and regulation according to yet another embodiment of the present invention.

FIG. 21 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications.

The power conversion system 2100 includes a primary winding 2110, a secondary winding 2112, an auxiliary winding 2114, resistors 2120, 2122, and 2124, a switch 2130, a demagnetization detection component 2150, a current source 2160, a current sink 2162, switches 2164 and 2166, a NOT gate 2170, a capacitor 2172, comparators 2180 and 2182, a flip-flop component 2190, and a drive component 2192. For example, the demagnetization detection component 2150, the current source 2160, the current sink 2162, the switches 2164 and 2166, the NOT gate 2170, the capacitor 2172, the comparators 2180 and 2182, the flip-flop component 2190, and the drive component 2192 are located on a chip 2140. In another example, the chip 2140 includes at least terminals 2142, 2144, and 2146. In yet another example, the system 2100 is a switch-mode flyback power conversion system.

As discussed above and further emphasized here, FIG. 21 is merely an example, which should not unduly limit the scope of the claims. One of ordinary skill in the art would recognize many variations, alternatives, and modifications. For example, a leading-edge blanking component is inserted between the terminal 2146 and the comparator 2180, and the inserted leading-edge blanking component receives a signal from the terminal 2146 and outputs the signal 2147 to the comparator 2180.

Figure 22:
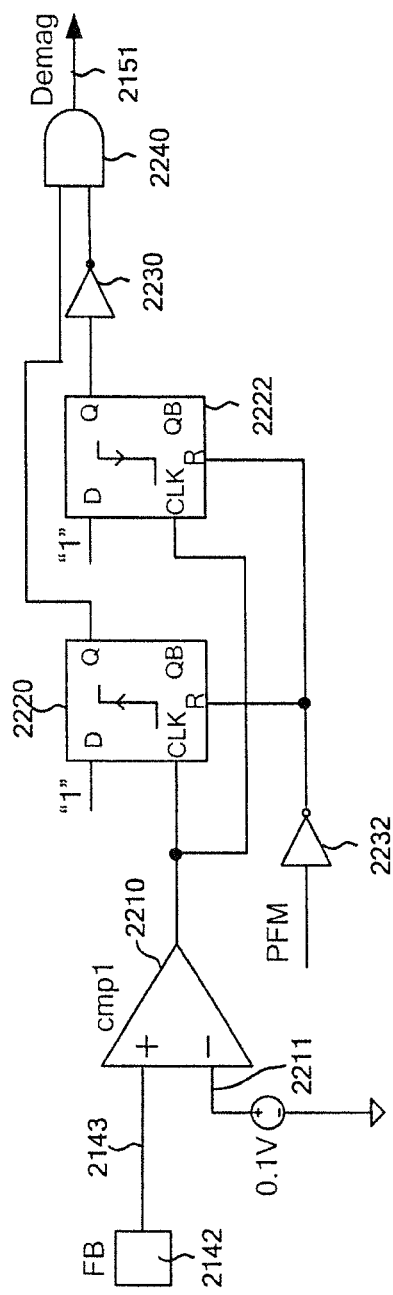
FIG. 22 is a simplified diagram for the demagnetization detection component as part of the switch-mode power conversion system according to an embodiment of the present invention.

FIG. 22 is a simplified diagram for the demagnetization detection component 2150 as part of the switch-mode power conversion system 2100 according to an embodiment of the present invention. This diagram is merely an example, which should not unduly limit the scope of the claims. One of ordinary skill in the art would recognize many variations, alternatives, and modifications. The demagnetization detection component 2150 includes a comparator 2210, flip-flop components 2220 and 2222, NOT gates 2230 and 2232, and an AND gate 2240.

Figure 23:
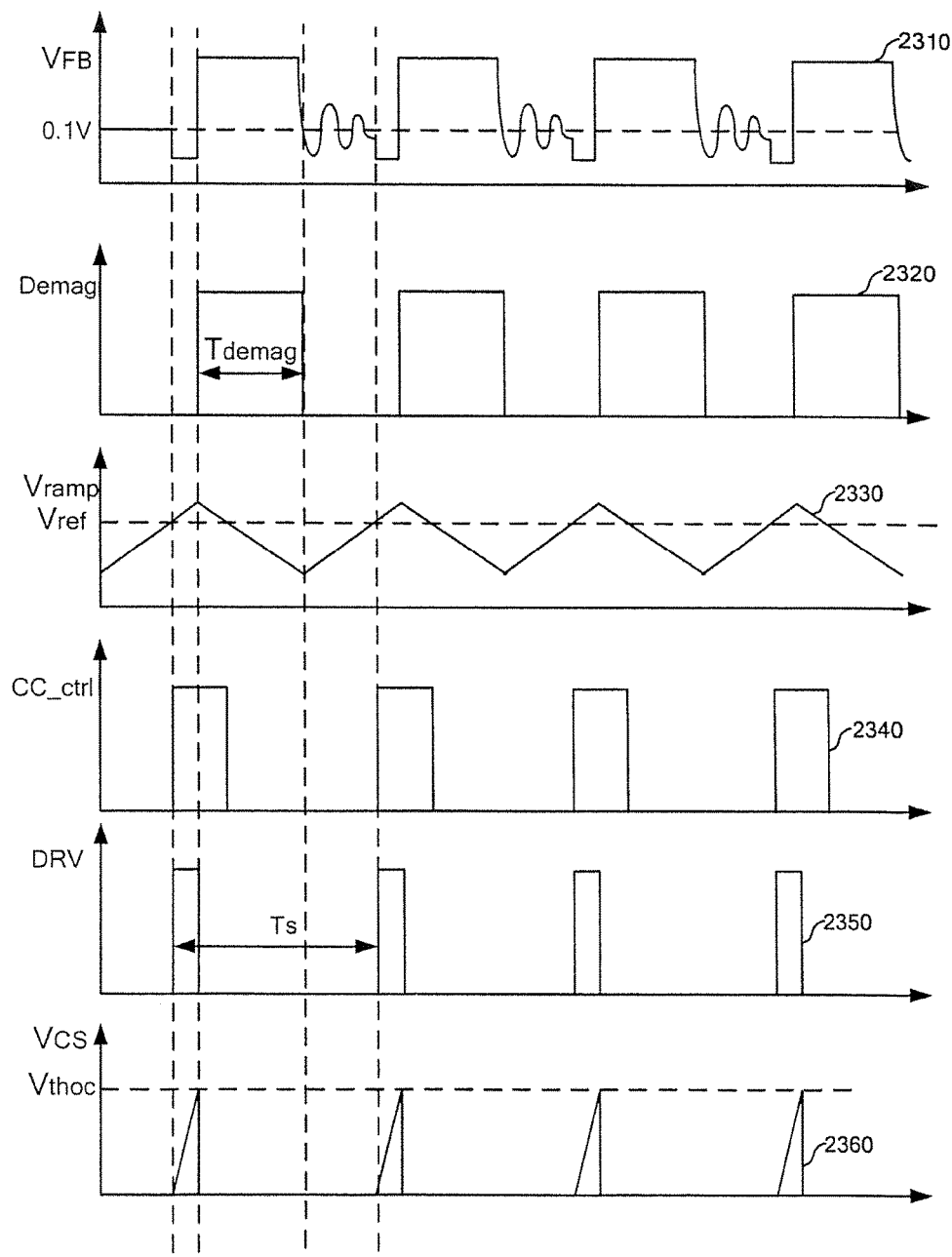
FIG. 23 is a simplified timing diagram for the switch-mode power conversion system including the demagnetization detection component as shown in FIGS. 21 and 22 according to an embodiment of the present invention.

FIG. 23 is a simplified timing diagram for the switch-mode power conversion system 2100 including the demagnetization detection component 2150 as shown in FIGS. 21 and 22 according to an embodiment of the present invention. This diagram is merely an example, which should not unduly limit the scope of the claims. One of ordinary skill in the art would recognize many variations, alternatives, and modifications.

As shown in FIG. 23, the waveform 2310 represents a feedback signal 2143 (e.g., $V_{FB}$) as a function of time, the waveform 2320 represents a Demag signal 2151 as a function of time, and the waveform 2330 represents a ramp signal 2165 (e.g., $V_{ramp}$) as a function of time. Additionally, the waveform 2340 represents a control signal 2185 as a function of time, the waveform 2350 represents a drive signal 2193 as a function of time, and the waveform 2360 represents a sensing signal 2147 (e.g., $V_{cs}$) as a function of time.

As shown in FIGS. 21 and 23, when the drive signal 2193 (corresponding to the waveform 2350) is at the logic high level, the switch 2130 is turned on and thus closed. The current 2111 that flows through the primary winding 2110 ramps up linearly, and the signal 2147 (e.g., $V_{cs}$) also ramps up linearly according to one embodiment. For example, the signal 2147 (e.g., $V_{cs}$) is received by the comparator 2180, which also receives a threshold signal 2181 (e.g., $V_{thoc}$). In another example, the comparator 2180 compares the signal 2147 (e.g., $V_{cs}$) with the threshold signal 2181 (e.g., $V_{thoc}$) and outputs a comparison signal 2187 to the flip-flop component 2190. In one embodiment, the flip-flop component 2190 also receives the control signal 2185 from the comparator 2182 and generates a modulation signal 2191. In another embodiment, the modulation signal 2191 is received by the driver component 2192, which in response generates the drive signal 2193.

As shown by the waveforms 2350 and 2360, if the signal 2147 (e.g., $V_{cs}$) reaches the threshold signal 2181 (e.g., $V_{thoc}$) in magnitude, the drive signal 2193 changes from the logic high level to the logic low level and the switch 2130 is turned off and thus open. For example, when the switch 2130 is turned off, the stored energy is delivered to the output of the power conversion system 2100 and the demagnetization process starts. In another example, during the demagnetization process, the current that flows through the secondary winding 2112 ramps down linearly.

As shown in FIG. 21, an output voltage (e.g., $V_{aux}$) of the auxiliary winding 2114 images the output voltage (e.g., $V_o$) of the power conversion system 2100, and is converted into the feedback signal 2143 (e.g., $V_{FB}$) by the resistors 2120 and 2122. For example, the feedback signal 2143 (e.g., $V_{FB}$) is received by the comparator 2210 as part of the demagnetization detection component 2150. In another example, the comparator 2210 compares the feedback signal 2143 (e.g., $V_{FB}$) with a threshold signal 2211 (e.g., 0.1V).

As shown by the waveforms 2310 and 2320, when the feedback signal 2143 (e.g., $V_{FB}$) rises above the threshold signal 2211 (e.g., 0.1V), the Demag signal 2151 changes to the logic high level, which indicates the beginning of the demagnetization process. Furthermore, when the feedback signal 2143 (e.g., $V_{FB}$) drops below the threshold signal 2211 (e.g., 0.1V), the Demag signal 2151 changes to the logic low level, which indicates the end of the demagnetization process. For example, the demagnetization process ends when the current that flows through the secondary winding 2112 drops to almost zero. In another example, after the end of the demagnetization process, the power conversion system 2100 enters the state of resonance oscillation, and the feedback signal 2143 (e.g., $V_{FB}$) (corresponding to the waveform 2310) is approximately a sine wave.

As shown in FIG. 21, the Demag signal 2151 is received by the switch 2166 and the NOT gate 2170, which in response outputs a signal 2171 to the switch 2164. For example, if the Demag signal 2151 is at the logic high level, the switch 2164 is open and the switch 2166 is closed. Therefore, the capacitor 2172 is discharged by the current sink 2162, and the ramp signal 2165 (e.g., $V_{ramp}$) decreases linearly according to one embodiment. In another example, if the Demag signal 2151 is at the logic low level, the switch 2164 is closed and the switch 2166 is open. Therefore, the capacitor 2172 is charged by the current source 2160, and the ramp signal 2165 (e.g., $V_{ramp}$) increases linearly according to another embodiment.

According to yet another embodiment, the ramp signal 2165 (e.g., $V_{ramp}$) is received by the comparator 2182, which also receives a threshold signal 2183 (e.g., $V_{ref}$). For example, the comparator 2182 compares the ramp signal 2165 (e.g., $V_{ramp}$) with the threshold signal 2183 (e.g., $V_{ref}$), and outputs the control signal 2185 to the flip-flop component 2190. As shown by the waveforms 2330 and 2350, if the ramp signal 2165 (e.g., $V_{ramp}$) reaches the threshold signal 2183 (e.g., $V_{ref}$) in magnitude, the drive signal 2193 changes from the logic low level to the logic high level and the switch 2130 is turned on.

As shown in FIGS. 21, 22 and 23, for example, the switching period of the power conversion system 2100 is as follows:

$$T_s = \frac{I_2 + I_1}{I_1} \times T_{Demag} \qquad (29)$$

where $T_s$ represents the switching period, and $T_{Demag}$ represents duration of the demagnetization process. $I_2$ represents the magnitude of the charging current by the current source 2160, and I₁ represents the magnitude of the discharging current by the current sink 2162.

In one embodiment, if $$V_{cs\_pk} = V_{thoc} \qquad (30)$$

then $$I_p = \frac{V_{thoc}}{R_s} \qquad (31)$$

where $V_{cs\_pk}$ represents the peak value of the signal 2147 (e.g., $V_{cs}$), and $V_{thoc}$ represents the magnitude of the threshold signal 2181. Additionally, $I_p$ represents the peak value of the current 2111 that flows through the primary winding 2110, and $R_s$ represents the resistance value of the resistor 2124. In another embodiment, assuming the efficiency between the primary winding 2110 and the secondary winding 2112 to be 100%, the output current is:

$$I_o = \frac{1}{2} \times N \times I_p \times \frac{T_{Demag}}{T_s} \qquad (32)$$

where $I_o$ represents the output current, and N represents a turns ratio between the primary winding 2110 and the secondary winding 2112. Using Equations 29 and 31, Equation 32 becomes:

$$I_o = \frac{1}{2} \times \frac{I_1}{I_0 + I_1} \times \frac{V_{thoc}}{R_s} \qquad (33)$$

For example, based on Equation 33, the output current $I_o$ is constant because $I_1$, $I_2$, $V_{thoc}$, and $R_s$ are constants. In another example, the power conversion system 2100 intends to keep both $V_{cs\_pk}$ and $$\frac{T_{Demag}}{T_s}$$

constant, in order to keep the output current $I_o$ constant.

Figure 24:
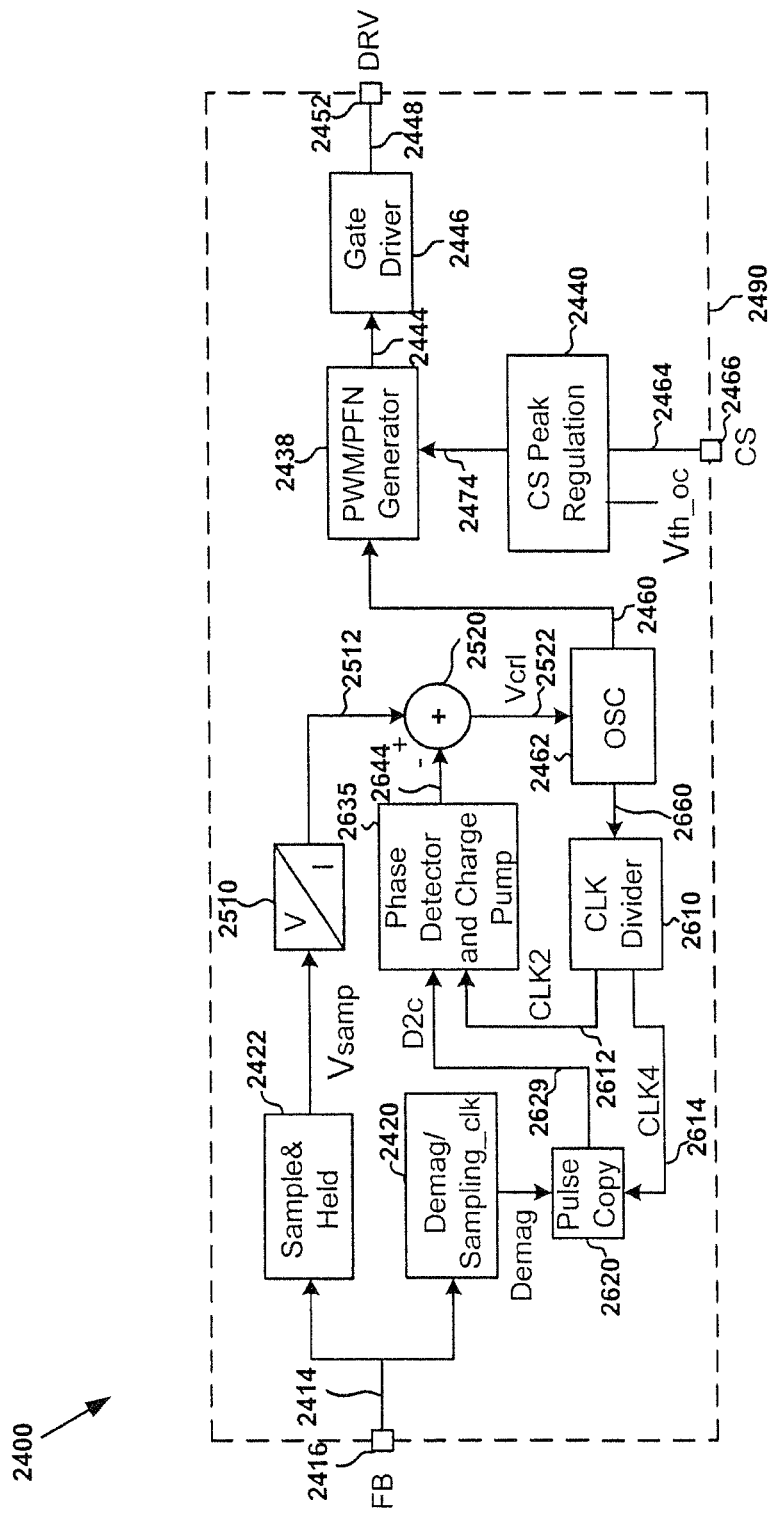
FIG. 24 is a simplified diagram for a switch-mode power conversion system with primary-side sensing and regulation according to another embodiment of the present invention.

FIG. 24 is a simplified diagram for a switch-mode power conversion system with primary-side sensing and regulation according to another embodiment of the present invention. This diagram is merely an example, which should not unduly limit the scope of the claims. One of ordinary skill in the art would recognize many variations, alternatives, and modifications.

A switch-mode power conversion system 2400 includes the following components:
- a component 2420 for generating a Demag signal and a Sampling_clk signal;
- a component 2422 for sampling and holding one or more signals;
- a component 2438 for generating a PWM/PFM modulation signal;
- a component 2440 for current sensing (CS) peak regulation;
- a component 2446 for generating a gate drive signal;
- an oscillator 2462;
- a voltage-to-current converter 2510;
- a component 2520 for determining the difference between two input signals in magnitude;
- a clock divider 2610;
- a pulse copy circuit 2620; and
- a phase detector and charge pump 2635.

In one embodiment, the components 2420, 2422, 2438, 2440 and 2446, the oscillator 2462, the voltage-to-current converter 2510, the component 2520, the clock divider 2610, the pulse copy circuit 2620, and the phase detector and charge pump 2635 are located on a chip 2490. For example, the chip 2490 includes at least terminals 2416, 2452 and 2466.

Although the above has been shown using a selected group of components for the system 2400, there can be many alternatives, modifications, and variations. For example, some of the components may be expanded and/or combined. In another example, a leading-edge blanking component is inserted between the terminal 2466 and the component 2440, and the inserted leading-edge blanking component receives a signal from the terminal 2466 and outputs a signal 2464 to the component 2440. Depending upon the embodiment, the arrangement of components may be interchanged with others replaced. Further details of these components are found throughout the present specification.

For example, the switch-mode power conversion system 2400 is the same as the switch-mode power conversion system 500. In another example, the chip 2490 is the same as the chip 590. In yet another example, the terminals 2416, 2452 and 2466 are the same as the terminals 516, 552 and 566 respectively.

In yet another example, the components 2420, 2422, 2438, 2440 and 2446 are the same as the components 520, 522, 538, 540 and 546 respectively, and the oscillator 2462 is the same as the oscillator 562. In yet another example, the voltage-to-current converter 2510 is the same as the voltage-to-current converter 1510, and the component 2520 is the same as the component 1520. In yet another example, the clock divider 2610 and the pulse copy circuit 2620 are the same as the clock divider 1610 and the pulse copy circuit 1620 respectively, and the phase detector and charge pump 2635 includes the phase detector 1630 and the charge pump 1640. Referring back to FIGS. 17 and 18, the component 542 includes the voltage-to-current converter 1510, the component 1520, and the phase-lock loop 1530, and the phase-lock loop 1530 includes at least the pulse copy circuit 1620, the phase detector 1630, and the charge pump 1640 according to one embodiment.

In yet another example, signals 2414, 2444, 2448, 2460, 2464 and 2474 are the same as the signals 514, 544, 548, 560, 564 and 574 respectively. In yet another example, signals 2512 and 2522 are the same as the signals 1512 and 1522 respectively. In yet another example, signals 2612, 2614, 2629, 2644, and 2660 are the same as the signals 1612, 1614, 1629, 1644, and 1660.

Figure 25:
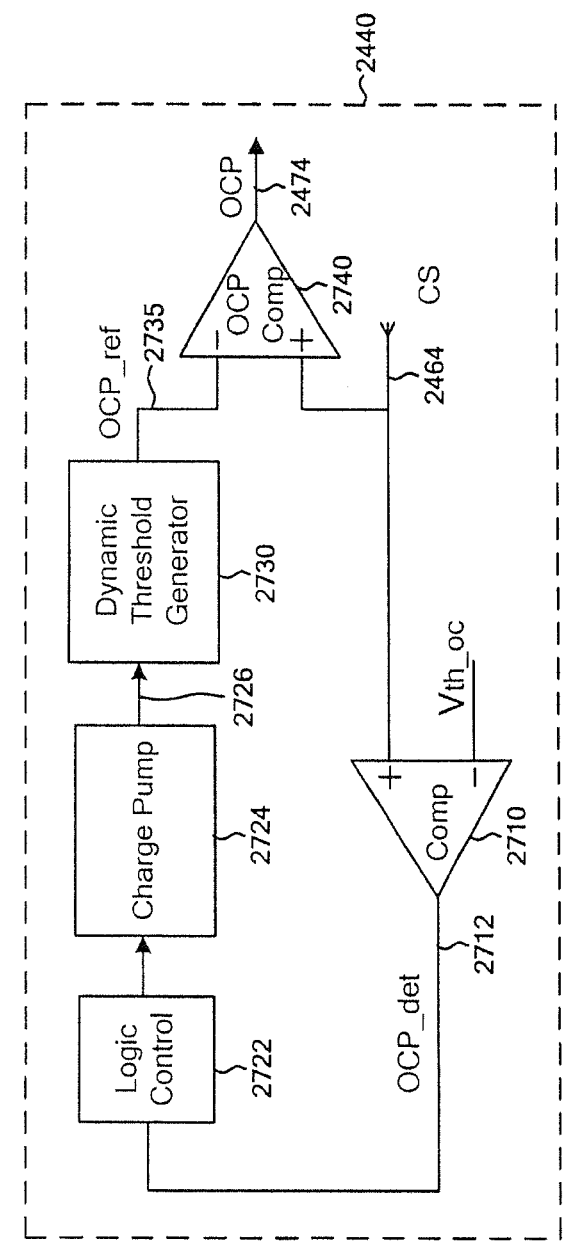
FIG. 25 is a simplified diagram showing certain devices for the component for current sensing (CS) peak regulation as part of the switch-mode power conversion system according to an embodiment of the present invention.

FIG. 25 is a simplified diagram showing certain devices for the component 2440 for current sensing (CS) peak regulation as part of the switch-mode power conversion system 2400 according to an embodiment of the present invention. This diagram is merely an example, which should not unduly limit the scope of the claims. One of ordinary skill in the art would recognize many variations, alternatives, and modifications. As shown in FIG. 25, the component 2440 includes a high-speed comparator 2710, a logic control component 2722, a charge pump 2724, a dynamic threshold generator 2730, and an over-current-protection (OCP) comparator 2740.

For example, the component 2440 includes a high-speed comparator 2710, a dynamic threshold generator 2730, and an over-current-protection (OCP) comparator 2740 are the same as the high-speed comparator 1810, the dynamic threshold generator 1830, and the over-current-protection (OCP) comparator 1840. In another example, the logic control component 2722 and the charge pump 2724 form the charge pump 1820. In yet another example, signals 2464 and 2474 are the same as the signals 564 and 574 respectively. In yet another example, signals 2712, 2726, and 2735 are the same as signals 1812, 1826, and 1835 respectively.

Returning to FIG. 24, according to one embodiment, the switch-mode power conversion system 2400 is a flyback power converter. In another embodiment, the switch-mode power conversion system 2400 includes one or more components for controlling the switching frequency, and one or more components for controlling the peak current that flows through the primary winding. For example, the peak current is regulated to a predetermined level, regardless of the line AC input voltage.

According to another embodiment, the output voltage of the switch-mode power conversion system 2400 is represented by the signal 2414 (e.g., $V_{FB}$) through the terminal 2416 (e.g., the terminal FB). For example, the signal 2414 (e.g., $V_{FB}$) is sampled and held by the component 2422, whose output $V_{samp}$ is received by the voltage-to-current converter 2510. In another example, the voltage-to-current converter 2510, together with the component 2520, generates the signal 2522, which is used to determine the frequency of the signal 2660 generated by the oscillator 2462.

According to yet another embodiment, the signal 2414 (e.g., $V_{FB}$) is received by the component 2420. For example, the component 2420 outputs the Demag signal to the pulse copy circuit 2620, and the Demag signal represents the duration of the demagnetization process (e.g., $T_{Demag}$). In yet another example, the Demag signal is processed by a phase lock loop that includes the oscillator 2462, the clock divider 2610, the pulse copy circuit 2620, the phase detector and charge pump 2635, and the component 2520. In yet another example, the phase lock loop adjusts the oscillation frequency of the signal 2660 so that $$F_{sw} = \frac{1}{\beta \times T_{Demag}} \quad (34)$$

where β is a constant. In yet another example, β is equal to 2.

Figure 26:
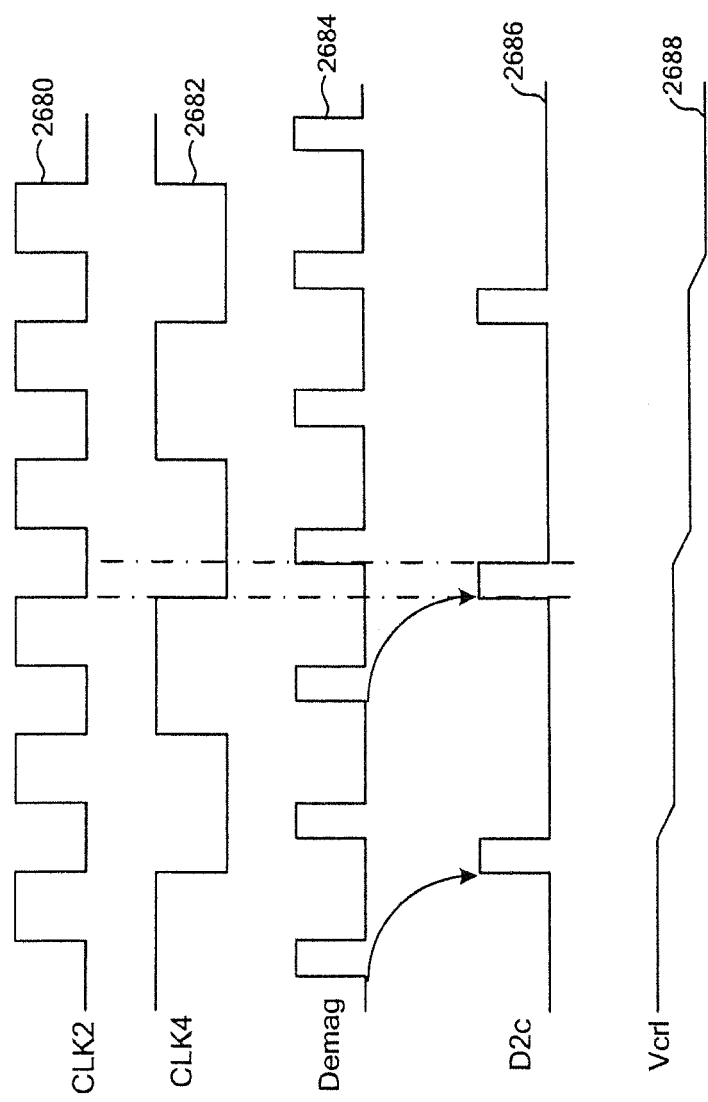
FIG. 26 is a simplified timing diagram for the switch-mode power conversion system according to an embodiment of the present invention.

FIG. 26 is a simplified timing diagram for the switch-mode power conversion system 2400 according to an embodiment of the present invention. This diagram is merely an example, which should not unduly limit the scope of the claims. One of ordinary skill in the art would recognize many variations, alternatives, and modifications.

As shown in FIG. 26, the waveform 2680 represents the signal 2612 (e.g., CLK2) as a function of time, and the waveform 2682 represents the signal 2614 (e.g., CLK4) as a function of time. Additionally, the waveform 2684 represents the Demag signal as a function of time, the waveform 2686 represents the signal 2629 as a function of time, and the waveform 2688 represents the signal 2522 as a function of time.

For example, at the falling edge of the signal 2614 (corresponding to the waveform 2682), the Demag signal (corresponding to the waveform 2684) is synchronized as the signal 2629 (corresponding to the waveform 2686). In another example, at the falling edge of the signal 2629 (corresponding to the waveform 2686), the signal 2612 (corresponding to the waveform 2680) is sampled.

According to one embodiment, if the sampled value for the signal 2612 corresponds to the logic low level, the duration of the demagnetization process (e.g., $T_{Demag}$) is smaller than the half cycle of the signal 2612 (corresponding to the waveform 2680). According to another embodiment, in response, the signal 2522 (corresponding to the waveform 2688) decreases in magnitude, causing the frequency of the signal 2612 (corresponding to the waveform 2680) to decrease as well.

FIG. 25 and/or FIG. 20 show one or more implementations for regulating the peak current of the primary winding according to certain embodiments. For example, in the constant current (CC) mode, the peak value of the sensed voltage (e.g., $V_{cs}$) is regulated to a predetermined level through feedback, regardless of the line AC input voltage and/or the delay time.

In another example, as shown in FIG. 25, when the power switch (e.g., the switch 550) is just turned off, the signal 2464 (e.g., $V_{cs}$) is compared with a predetermined threshold signal (e.g., $V_{th\_oc}$) by the comparator 2710. According to one embodiment, the comparator 2710 outputs the signal 2712 in order to adjust the signal 2735 (e.g., the signal OCP_ref), which is used as a threshold voltage for the comparator 2740. According to another embodiment, the peak value of the sensed voltage (e.g., $V_{cs}$) is regulated to the predetermined level (e.g., $V_{th\_oc}$) through such feedback, so that the output current of the switch-mode power conversion system 2400 is kept constant.

Figure 27:
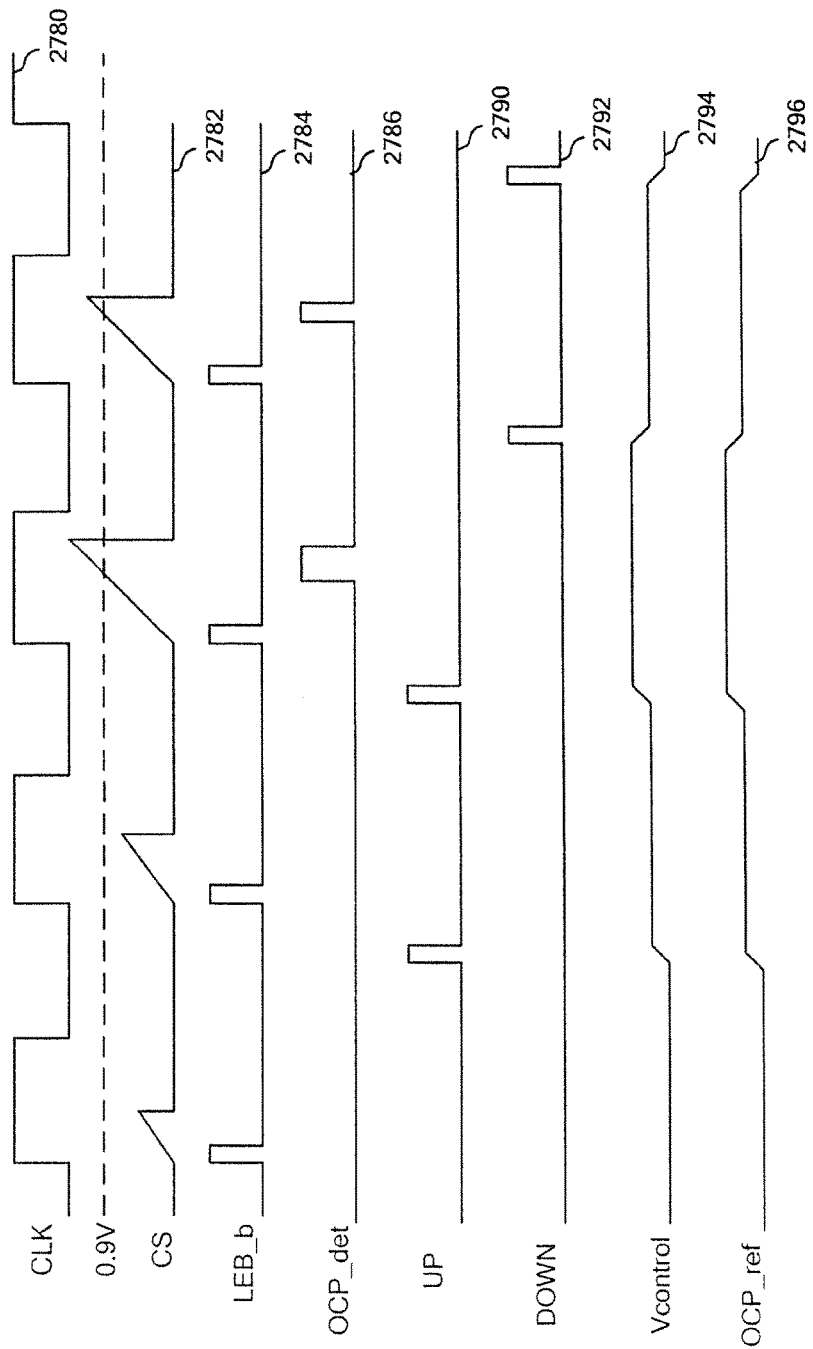
FIG. 27 is a simplified timing diagram for the component for current sensing (CS) peak regulation as part of the switch-mode power conversion system respectively according to certain embodiments of the present invention.

FIG. 27 is a simplified timing diagram for the component 540 or 2440 for current sensing (CS) peak regulation as part of the switch-mode power conversion system 500 or 2400 respectively according to certain embodiments of the present invention. This diagram is merely an example, which should not unduly limit the scope of the claims. One of ordinary skill in the art would recognize many variations, alternatives, and modifications.

Referring to FIGS. 27 and 20, according to one embodiment, the waveform 2780 represents the signal 560 (e.g., CLK) as a function of time, and the waveform 2782 represents the signal 564 (e.g., CS) as a function of time. According to another embodiment, the waveform 2784 represents the signal LEB_b as a function of time, and the waveform 2786 represents the signal 1812 (e.g., OCP_det) as a function of time. According to yet another embodiment, the waveform 2790 represents, as a function of time, a signal (e.g., UP) that is the AND result of the signal Charge_con_b and the signal Charge, and the waveform 2792 represents, as a function of time, a signal (e.g., DOWN) that is the AND result of the signal Charge_con and the signal Charge_b. For example, the signal Charge and the signal Charge_b each are a short pulse signal. According to yet another embodiment, the waveform 2794 represents the signal 1826 (e.g., $V_{control}$) as a function of time, and the waveform 2796 represents the signal 1835 (e.g., OCP_ref) as a function of time.

As shown in FIG. 27, if the peak of the signal 564 (corresponding to the waveform 2782) is smaller than Vth_oc (e.g., 0.9V), the signal 1812 (corresponding to the waveform 2786) is at the logic low level and the signal 1835 (corresponding to the waveform 2796) increases step by step according to one embodiment. According to another embodiment, if the signal 564 (corresponding to the waveform 2782) becomes larger than Vth_oc (e.g., 0.9V) for a period of time, the signal 1812 (corresponding to the waveform 2786) is at the logic high level for the same period of time and the signal 1835 (corresponding to the waveform 2796) decreases step by step, in order to dynamically achieve a constant peak value for the sensed voltage (e.g., $V_{cs}$) at the predetermined level (e.g., $V_{th\_oc}$).

Figure 28:
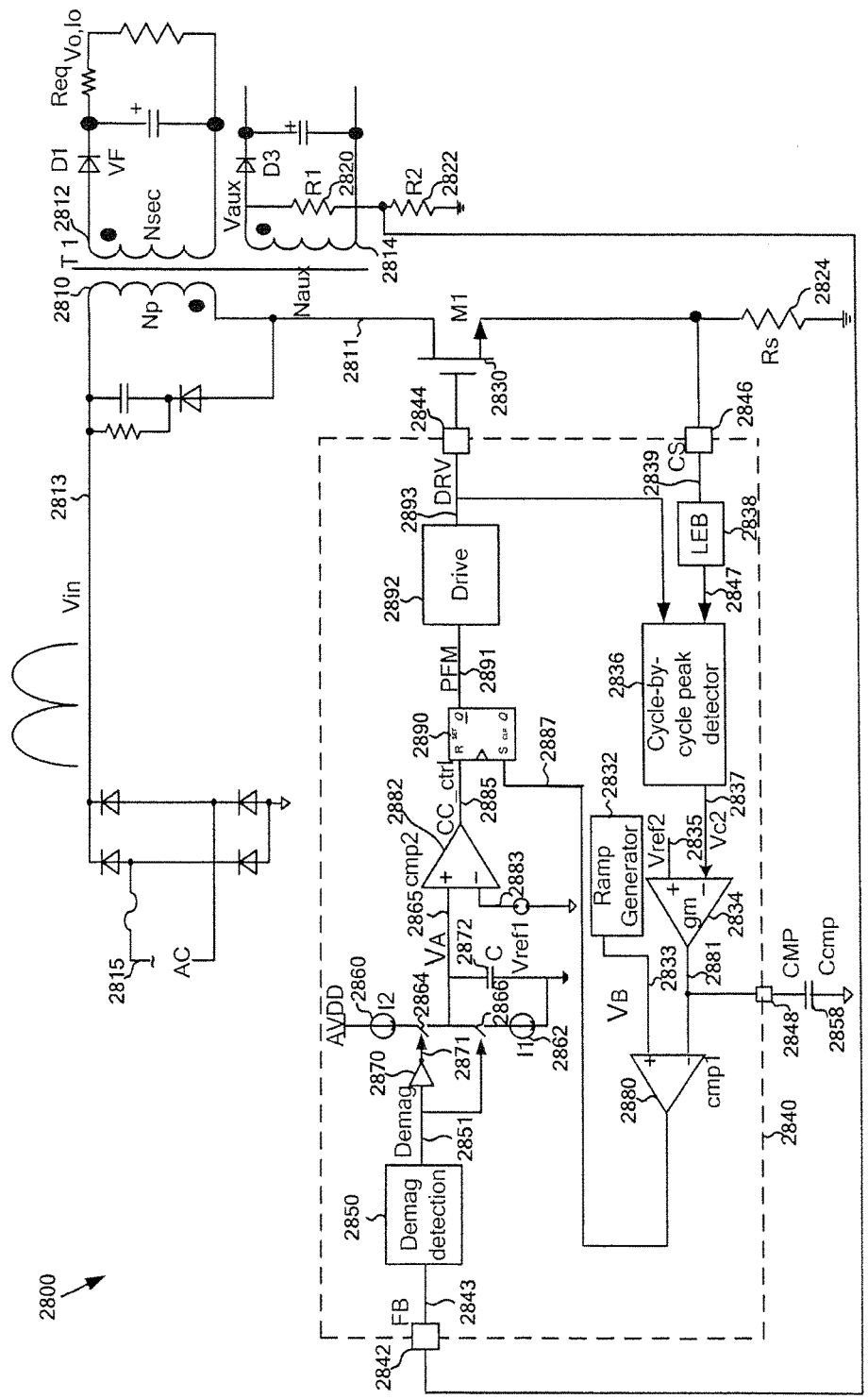
FIG. 28 is a simplified diagram for a switch-mode power conversion system with primary-side sensing and regulation according to yet another embodiment of the present invention.

FIG. 28 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications.

The power conversion system 2800 includes a primary winding 2810, a secondary winding 2812, an auxiliary winding 2814, resistors 2820, 2822, and 2824, a switch 2830, a ramp generator 2832, a transconductance amplifier 2834, a cycle-by-cycle peak generator 2836, a leading-edge blanking component 2838, a demagnetization detection component 2850, a current source 2860, a current sink 2862, switches 2864 and 2866, a NOT gate 2870, capacitors 2872 and 2858, comparators 2880 and 2882, a flip-flop component 2890, and a drive component 2892.

For example, the ramp generator 2832, the transconductance amplifier 2834, the cycle-by-cycle peak generator 2836, the leading-edge blanking component 2838, the demagnetization detection component 2850, the current source 2860, the current sink 2862, the switches 2864 and 2866, the NOT gate 2870, the capacitor 2872, the comparators 2880 and 2882, the flip-flop component 2890, and the drive component 2892 are located on a chip 2840. In another example, the chip 2840 includes at least terminals 2842, 2844, 2846, and 2848. In yet another example, the system 2800 is a switch-mode flyback power conversion system. In yet another example, the demagnetization detection component 2850 is the same as the demagnetization detection component 2150 as shown in FIG. 22.

Figure 29:
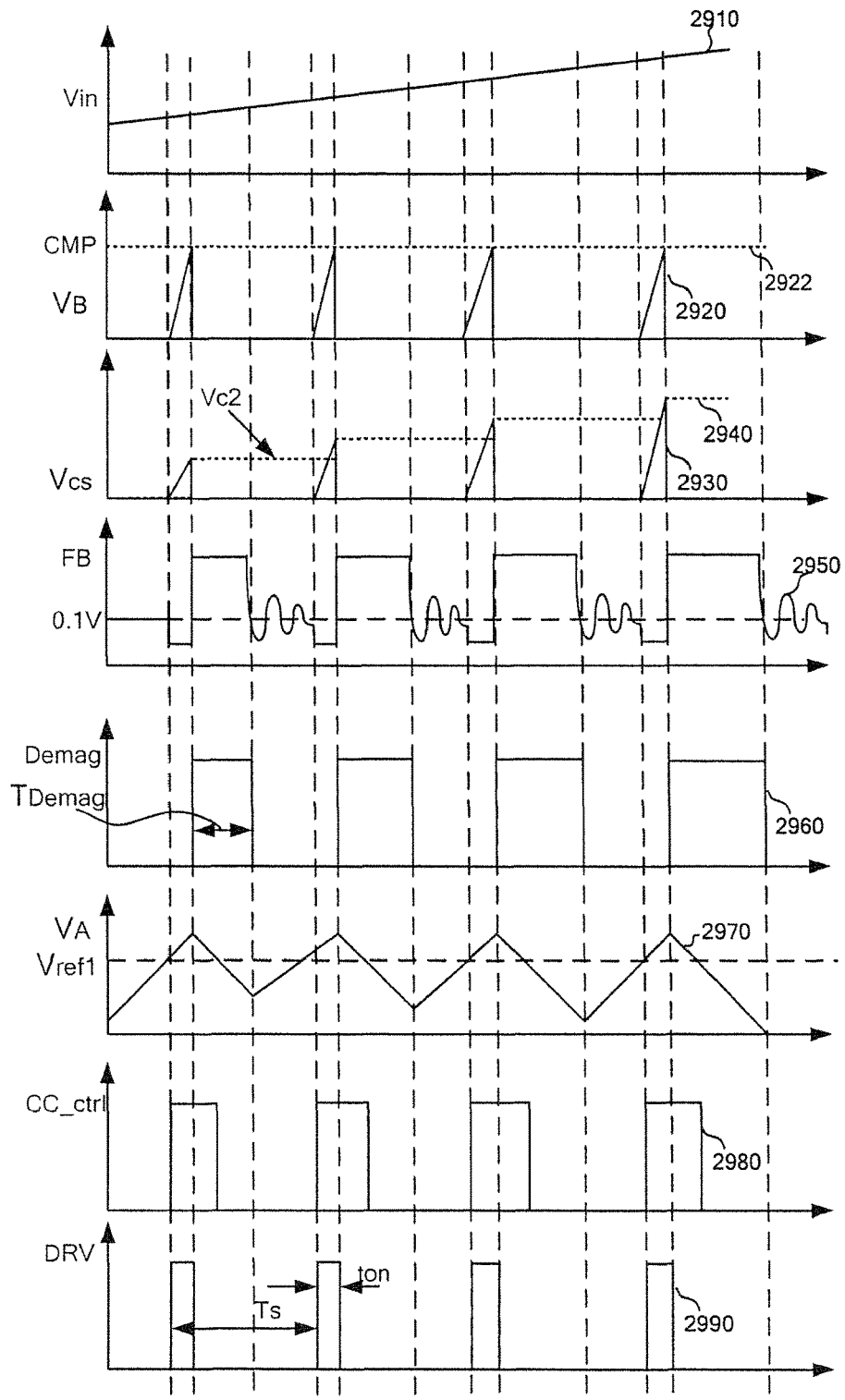
FIG. 29 is a simplified timing diagram for the switch-mode power conversion system according to an embodiment of the present invention.

FIG. 29 is a simplified timing diagram for the switch-mode power conversion system 2800 according to an embodiment of the present invention. This diagram is merely an example, which should not unduly limit the scope of the claims. One of ordinary skill in the art would recognize many variations, alternatives, and modifications.

As shown in FIG. 29, the waveform 2910 represents an input signal 2813 (e.g., $V_{in}$) as a function of time, the waveform 2920 represents a ramp signal 2833 (e.g., $V_B$) as a function of time, and the waveform 2922 represents a signal 2881 (e.g., CMP) as a function of time. Additionally, the waveform 2930 represents a sensing signal 2847 (e.g., $V_{cs}$) as a function of time, and the waveform 2940 represents a peak signal 2837 (e.g., $V_{c2}$) as a function of time.

Moreover, the waveform 2950 represents a feedback signal 2843 (e.g., $V_{FB}$) as a function of time, and the waveform 2960 represents a Demag signal 2851 as a function of time, and the waveform 2970 represents another ramp signal 2865 (e.g., $V_A$) as a function of time. Also, the waveform 2980 represents a control signal 2885 as a function of time, and the waveform 2990 represents a drive signal 2893 as a function of time.

As shown in FIGS. 28 and 29, when the drive signal 2893 (corresponding to the waveform 2990) is at the logic high level, the switch 2830 is turned on. The current 2811 that flows through the primary winding 2810 ramps up linearly, and the signal 2847 (e.g., $V_{cs}$) also ramps up linearly through the leading-edge blanking component 2838 according to one embodiment. For example, the signal 2847 (e.g., $V_{cs}$) is received by the cycle-by-cycle peak detector 2836, which detects the peak value of the signal 2847 within each switching period and outputs the peak signal 2837 (corresponding to the waveform 2940) that is representative of the detected peak value of the signal 2847. In another example, the peak signal 2837 (e.g., $V_{c2}$) is received by the transconductance amplifier 2834, which also receives a reference signal 2835 (e.g., $V_{ref2}$).

According to one embodiment, the voltage difference between the peak signal 2837 (e.g., $V_{c2}$) and the reference signal 2835 (e.g., $V_{ref2}$) is amplified and converted into a current signal, which in turn is converted into the voltage signal 2881 (e.g., CMP) by the capacitor 2858. According to another embodiment, the voltage signal 2881 (corresponding to the waveform 2922) is received by the comparator 2880, which also receives the ramp signal 2833 (corresponding to the waveform 2920).

For example, the voltage signal 2881 (e.g., CMP) is constant with time in magnitude. In another example, the comparator 2880 compares the voltage signal 2881 (corresponding to the waveform 2922) with the ramp signal 2833 (corresponding to the waveform 2920), and outputs a comparison signal 2887 to the flip-flop component 2890. In one embodiment, the flip-flop component 2890 also receives the control signal 2885 from the comparator 2882 and generates a modulation signal 2891. In another embodiment, the modulation signal 2891 is received by the driver component 2892, which in response generates the drive signal 2893.

As shown by the waveforms 2920 and 2990, if the ramp signal 2833 (e.g., $V_B$) reaches the voltage signal 2881 (e.g., CMP), the drive signal 2893 changes from the logic high level to the logic low level and the switch 2830 is turned off. For example, when the switch 2830 is turned off, the stored energy is delivered to the output of the power conversion system 2800 and the demagnetization process starts. In another example, during the demagnetization process, the current that flows through the secondary winding 2812 ramps down linearly.

As shown in FIG. 28, an output voltage (e.g., $V_{aux}$) of the auxiliary winding 2814 images the output voltage (e.g., $V_o$) of the power conversion system 2800, and is converted into the feedback signal 2843 (e.g., $V_{FB}$) by the resistors 2820 and 2822. For example, the feedback signal 2843 (e.g., $V_{FB}$) is received by the demagnetization detection component 2850, which compares the feedback signal 2143 (e.g., $V_{FB}$) with a threshold signal (e.g., 0.1V).

According to one embodiment, as shown by the waveforms 2950 and 2960, when the feedback signal 2843 (e.g., $V_{FB}$) rises above the threshold signal (e.g., 0.1 V), the Demag signal 2851 changes to the logic high level, which indicates the beginning of the demagnetization process. According to another embodiment, when the feedback signal 2843 (e.g., $V_{FB}$) drops below the threshold signal (e.g., 0.1V), the Demag signal 2851 changes to the logic low level, which indicates the end of the demagnetization process. For example, the demagnetization process ends when the current that flows through the secondary winding 2812 drops to almost zero. In another example, after the end of the demagnetization process, the power conversion system 2800 enters the state of resonance oscillation, and the feedback signal 2843 (e.g., $V_{FB}$) (corresponding to the waveform 2310) is approximately a sine wave.

As shown in FIG. 28, the Demag signal 2851 is received by the switch 2866 and the NOT gate 2870, which in response outputs a signal 2871 to the switch 2864. For example, if the Demag signal 2851 is at the logic high level, the switch 2864 is open and the switch 2866 is closed. Therefore, the capacitor 2872 is discharged by the current sink 2862, and the ramp signal 2865 (e.g., $V_A$) decreases linearly according to one embodiment. In another example, if the Demag signal 2851 is at the logic low level, the switch 2864 is closed and the switch 2866 is open. Therefore, the capacitor 2872 is charged by the current source 2860, and the ramp signal 2865 (e.g., $V_A$) increases linearly according to another embodiment.

According to yet another embodiment, the ramp signal 2865 (e.g., $V_A$) is received by the comparator 2882, which also receives a threshold signal 2883 (e.g., $V_{ref1}$). For example, the comparator 2882 compares the ramp signal 2865 (e.g., $V_A$) with the threshold signal 2883 (e.g., $V_{ref1}$), and outputs the control signal 2885 to the flip-flop component 2890. As shown by the waveforms 2970 and 2990, if the ramp signal 2865 (e.g., $V_A$) reaches the threshold signal 2883 (e.g., $V_{ref1}$) in magnitude, the drive signal 2893 changes from the logic low level to the logic high level and the switch 2830 is turned on.

Figure 30:
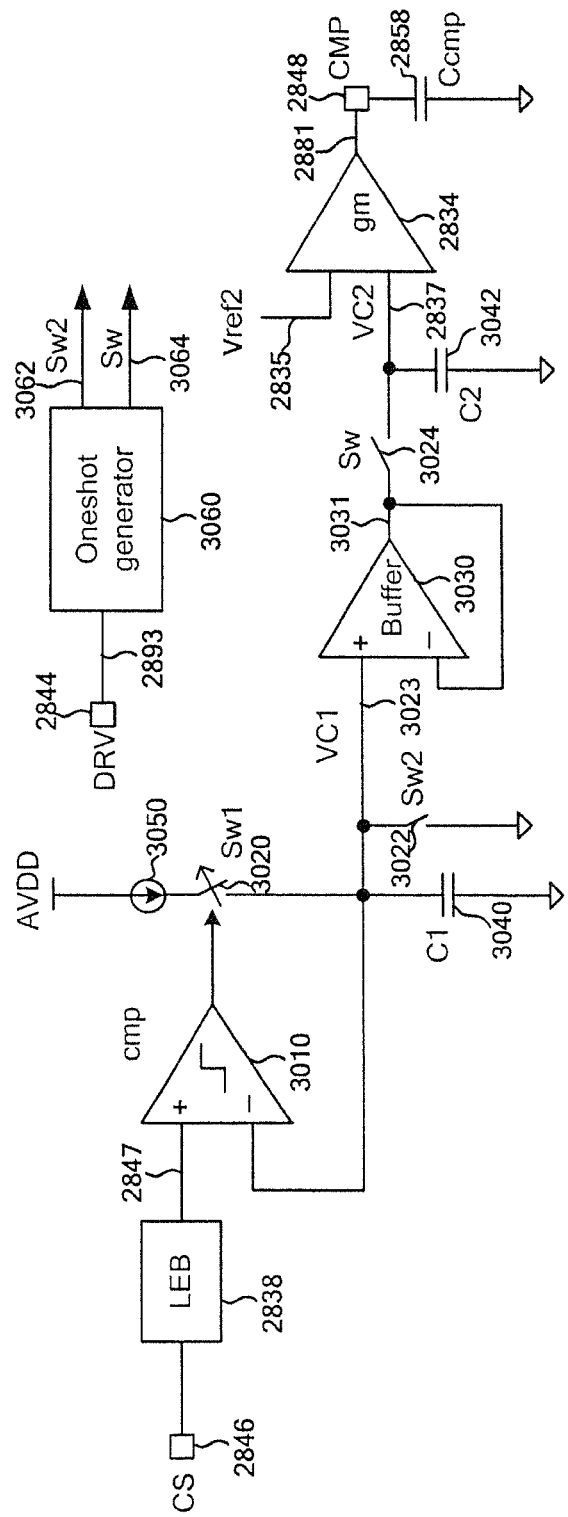
FIG. 30 is a simplified diagram for the cycle-by-cycle peak generator as part of the power conversion system according to an embodiment of the present invention.

FIG. 30 is a simplified diagram for the cycle-by-cycle peak generator 2836 as part of the power conversion system 2800 according to an embodiment of the present invention. This diagram is merely an example, which should not unduly limit the scope of the claims. One of ordinary skill in the art would recognize many variations, alternatives, and modifications.

In one embodiment, the cycle-by-cycle peak generator 2836 includes a comparator 3010, switches 3020, 3022 and 3024, a buffer 3030, capacitors 3040 and 3042, a current source 3050, and a one-shot generator 3060. In another embodiment, the switches 3022 and 3024 are controlled by signals 3062 and 3064 respectively, which are generated by the one-shot generator 3060 in response to the drive signal 2893. For example, the signals 3062 and 3064 each are a one-shot signal with a pulse width of 300 ns.

Figure 31:
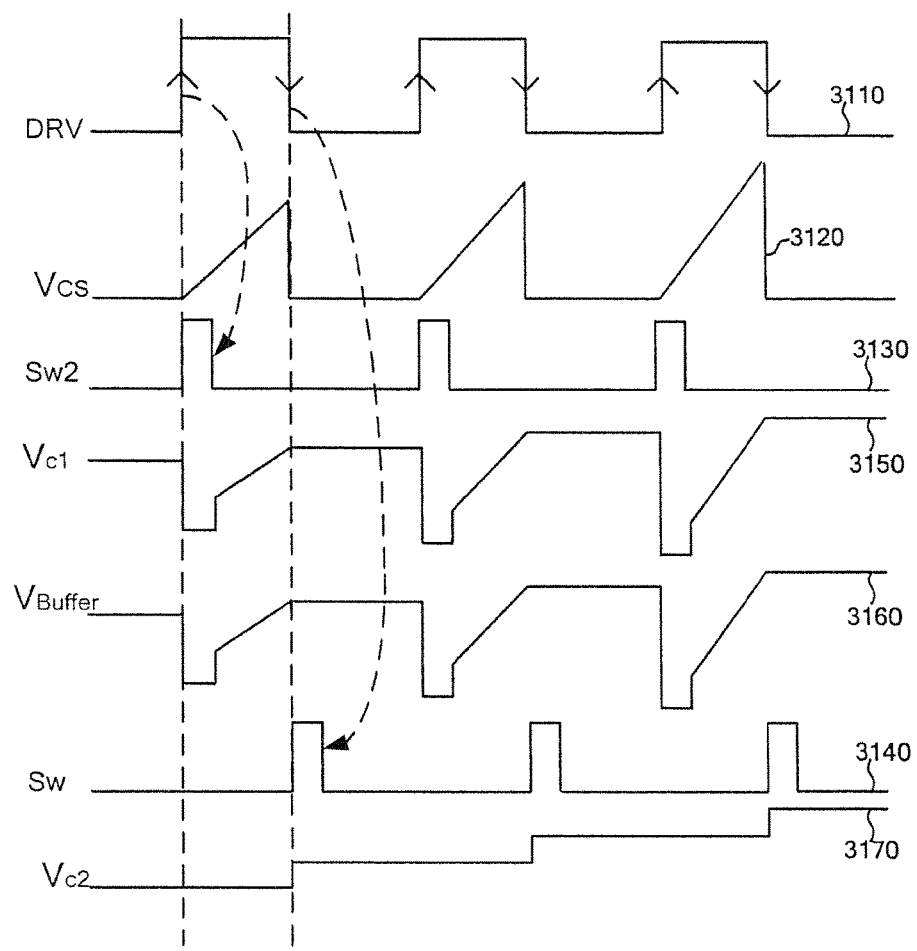
FIG. 31 is a simplified timing diagram for the cycle-by-cycle peak generator as part of the switch-mode power conversion system according to an embodiment of the present invention.

FIG. 31 is a simplified timing diagram for the cycle-by-cycle peak generator 2836 as part of the switch-mode power conversion system 2800 according to an embodiment of the present invention. This diagram is merely an example, which should not unduly limit the scope of the claims. One of ordinary skill in the art would recognize many variations, alternatives, and modifications.

As shown in FIG. 31, the waveform 3110 represents the drive signal 2893 as a function of time, and the waveform 3120 represents the sensing signal 2847 (e.g., $V_{cs}$) as a function of time. Additionally, the waveform 3130 represents the one-shot signal 3062 as a function of time, and the waveform 3140 represents the one-shot signal 3064 as a function of time. Moreover, the waveform 3150 represents a signal 3023 (e.g., $V_{c1}$) as a function of time, and the waveform 3160 represents a signal 3031 as a function of time. Also, the waveform 3180 represents the peak signal 2837 (e.g., $V_{c2}$) as a function of time.

As shown in FIGS. 30 and 31, the one-shot generator 3060 receives the drive signal 2893 (corresponding to the waveform 3110) and generates the one-shot signal 3062 (corresponding to the waveform 3130) in response to rising edges of the drive signal 2893. For example, the one-shot signal 3062 has a pulse width of 300 ns. In another example, when the one-shot signal 3062 is at the logic high level, the switch 3022 is closed; therefore, the capacitor 3040 is discharged and the signal 3023 (corresponding to the waveform 3150) decreases to the logic low level.

In yet another example, the signal 3023 (corresponding to the waveform 3150) is received by the comparator 3010, which compares the signal 3023 with the signal 2847 (corresponding to the waveform 3120). According to one embodiment, if the signal 2847 is larger than the signal 3023 in magnitude, the switch 3020 is closed and the capacitor 3022 is charged by the current source 3050. According to another embodiment, if the signal 3023 reaches the signal 2847 in magnitude, the switch 3020 is open; therefore, the signal 3023 represents the peak value of the signal 2874 in the corresponding signal cycle until the switch 3022 is closed again by the next pulse of the one-shot signal 3022. According to yet another embodiment, the signal 3023 is received by the buffer 3030, which generates the signal 3031 (corresponding to the waveform 3160).

According to yet another embodiment, the one-shot generator 3060 receives the drive signal 2893 (corresponding to the waveform 3110) and generates the one-shot signal 3064 (corresponding to the waveform 3140) in response to falling edges of the drive signal 2893. For example, the one-shot signal 3064 has a pulse width of 300 ns. In another example, when the one-shot signal 3064 is at the logic high level, the switch 3024 is closed; therefore, the capacitor 3042 is charged and the signal 2837 (corresponding to the waveform 3170) is used to sample the signal 3031. In yet another example, the sampled signal 3031 is held on the capacitor 3042 and outputted as the signal 2837 that is representative of the peak value of the signal 2874 in the corresponding signal cycle until the arrival of the next pulse of the drive signal 2844.

Referring to FIG. 28, for example, the switching period of the power conversion system 2800 is as follows:

$$T_s = \frac{I_2 + I_1}{I_1} \times T_{Demag} \tag{35}$$

where $T_s$ represents the switching period, and $T_{Demag}$ represents duration of the demagnetization process. $I_2$ represents the magnitude of the charging current by the current source 2860, and $I_1$ represents the magnitude of the discharging current by the current sink 2862.

According to one embodiment, an AC input signal 2815 is converted into the rectified input signal 2813 (e.g., $V_{in}$) as follows:

$$V_{in} = \left| \sqrt{2} \times V_{rms} \times \sin\left(\frac{2\pi}{T_{AC}} \times t\right) \right| \tag{36}$$

where $V_{in}$ represents the rectified input signal 2813. Additionally, $V_{rms}$ represents the root-mean-square magnitude of the AC input signal 2815, and $T_{AC}$ represents the period of the AC input signal 2815. For example, $T_{AC}$ is equal to 20 ms.

In another example, consequently, the peak signal 2837 is $$V_{c2} = \frac{\left| \sqrt{2} \times V_{rms} \times \sin\left(\frac{2\pi}{T_{AC}} \times t\right) \right|}{L_p} \times t_{on} \times R_s \tag{37}$$

where $V_{c2}$ represents the peak signal 2837. Additionally, $t_{on}$ represents the pulse width of the drive signal 2893, and $R_s$ represents the resistance value of the resistor 2824. Also, $L_p$ represents the inductance of the primary winding 2810.

In yet another example, as shown in FIG. 28, the peak signal 2837 is averaged and the average of the peak signal 2837 is made equal to the reference signal 2835. According to one embodiment, if $$\frac{g_m}{2\pi \times C_{cmp}} < \frac{1}{K \times T_{AC}} \quad (38)$$

then, $$V_{ref2} = V_{cs\_ave} = \frac{1}{T} \times \int_0^T V_{c2} dt = \frac{1}{T} \times \int_0^T V_{cs\_pk} dt \quad (39)$$

where $g_m$ is the transconductance value of the transconductance amplifier 2834, and $C_{cmp}$ is the capacitance value of the capacitor 2858. Additionally, T represents an integration period, and K is a positive integer that is much lager than 1. For example, T is equal to or larger than $T_{AC}$. In another example, K is no smaller than 3. In yet another example, K is equal to 3, 5, 6, 10, or 20. In yet another example, the bandwidth of the transconductance amplifier 2834 is much smaller than the frequency of the AC input signal 2815. Moreover, $V_{cs\_ave}$ represents the average of the peak signal 2837, and $V_{ref2}$ represents the reference signal 2835. Also, $V_{cs\_pk}$ represents the peak value of the signal 2847, which is, for example, equal to $V_{c2}$.

According to another embodiment, as shown in FIG. 28, $$I_o = \frac{1}{2} \times N \times \frac{1}{T} \times \int_0^T \frac{V_{cs\_pk}}{R_s} \times \frac{T_{Demag}}{T_s} dt \quad (40)$$

where $I_o$ represents the output current of the switch-mode power conversion system 2800 and N represents a turns ratio between the primary winding 2810 and the secondary winding 2812. Additionally, $R_s$ represents the resistance value of the resistor 2824, and $T_s$ represents the switching period of the power conversion system 2800. Moreover, $T_{Demag}$ represents duration of the demagnetization process within each switching cycle.

According to yet another embodiment, combining Equations 35 and 39 with Equation 40, one can obtain the following:

$$I_0 = \frac{1}{2} \times N \times \frac{1}{R_s} \times \frac{I_1}{I_2 + I_1} \times V_{ref2} \quad (41)$$

For example, based on Equation 41, the output current $I_o$ is constant because $I_1$, $I_2$, $V_{ref2}$, $R_s$, and N are all constants. In another example, the power conversion system 2800 keeps $$\frac{1}{T} \times \int_0^T V_{cs\_pk} dt \text{ and } \frac{T_{Demag}}{T_s}$$

constant, in order to keep the output current $I_o$ constant. In one embodiment, $$\frac{1}{T} \times \int_0^T V_{cs\_pk} dt$$

is kept constant by at least satisfying Equation 38. In another embodiment, $$\frac{T_{Demag}}{T_s}$$

is kept constant by at least satisfying Equation 35.

As discussed above and further emphasized here, FIG. 28 is merely an example, which should not unduly limit the scope of the claims. One of ordinary skill in the art would recognize many variations, alternatives, and modifications. For example, the power conversion system 2800 includes one or more bulk capacitors to convert an AC input signal 2815 into a DC signal that is received by the primary winding 2810, as shown in FIG. 32.

Figure 32:
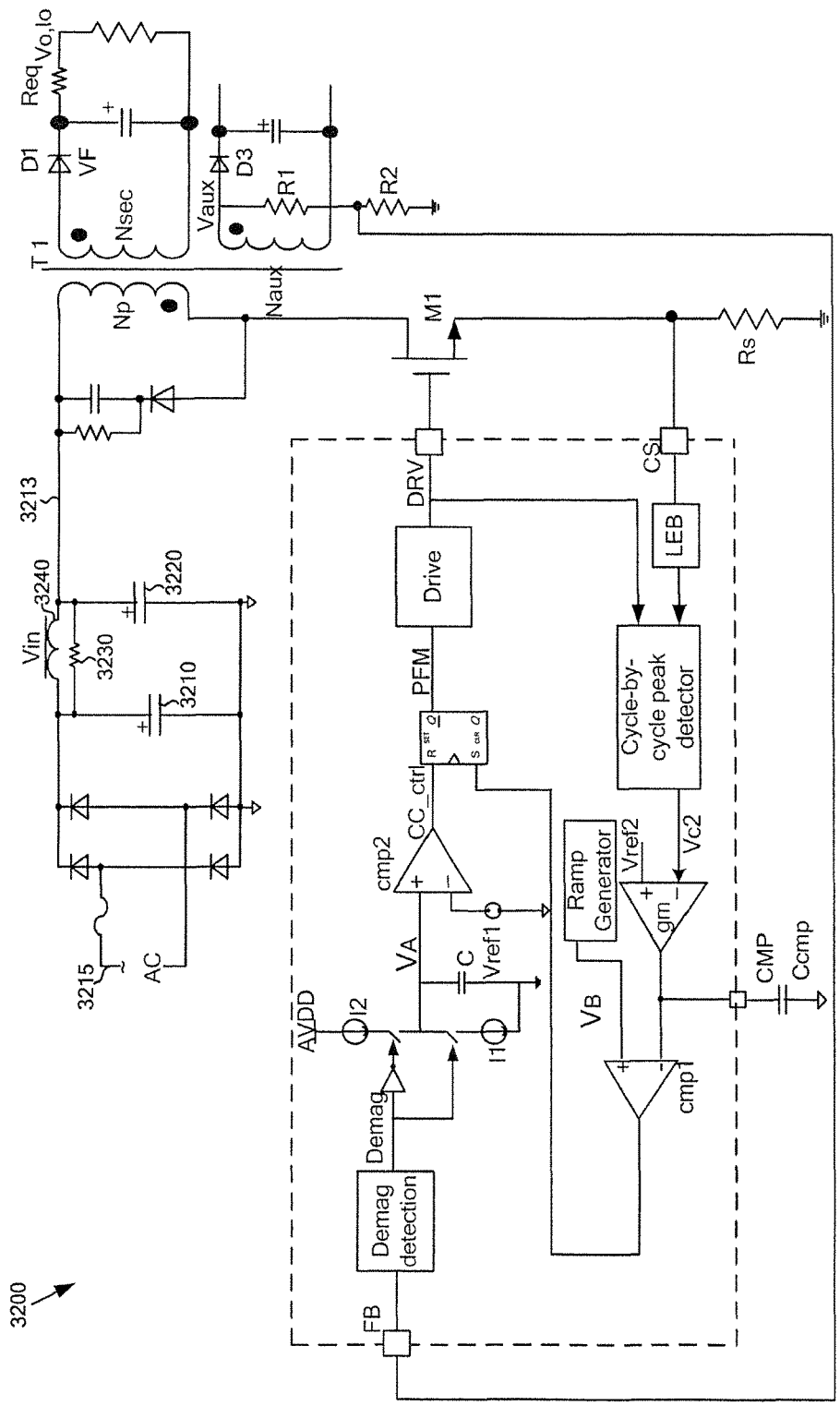
FIG. 32 is a simplified diagram for a switch-mode power conversion system with primary-side sensing and regulation according to yet another embodiment of the present invention.

FIG. 32 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications.

For example, the power conversion system 3200 is the same as the power conversion system 2800, except that the power conversion system 3200 also includes capacitors 3210 and 3220, a resistor 3230, and an inductor 3240. In another example, the capacitors 3210 and 3220, the resistor 3230, and the inductor 3240 are used to convert an AC input signal 3215 into a DC input signal 3213 (e.g., $V_{in}$).

According to one embodiment, an advantage of the power conversion system 2800 is that there is no need for using one or more bulk capacitors and converting the AC input signal into a DC input signal that is received by the primary winding 2810. According to yet another embodiment, nonetheless, the power conversion system 2800 can operated with one or more such bulk capacitors as shown in FIG. 32.

Figure 33:
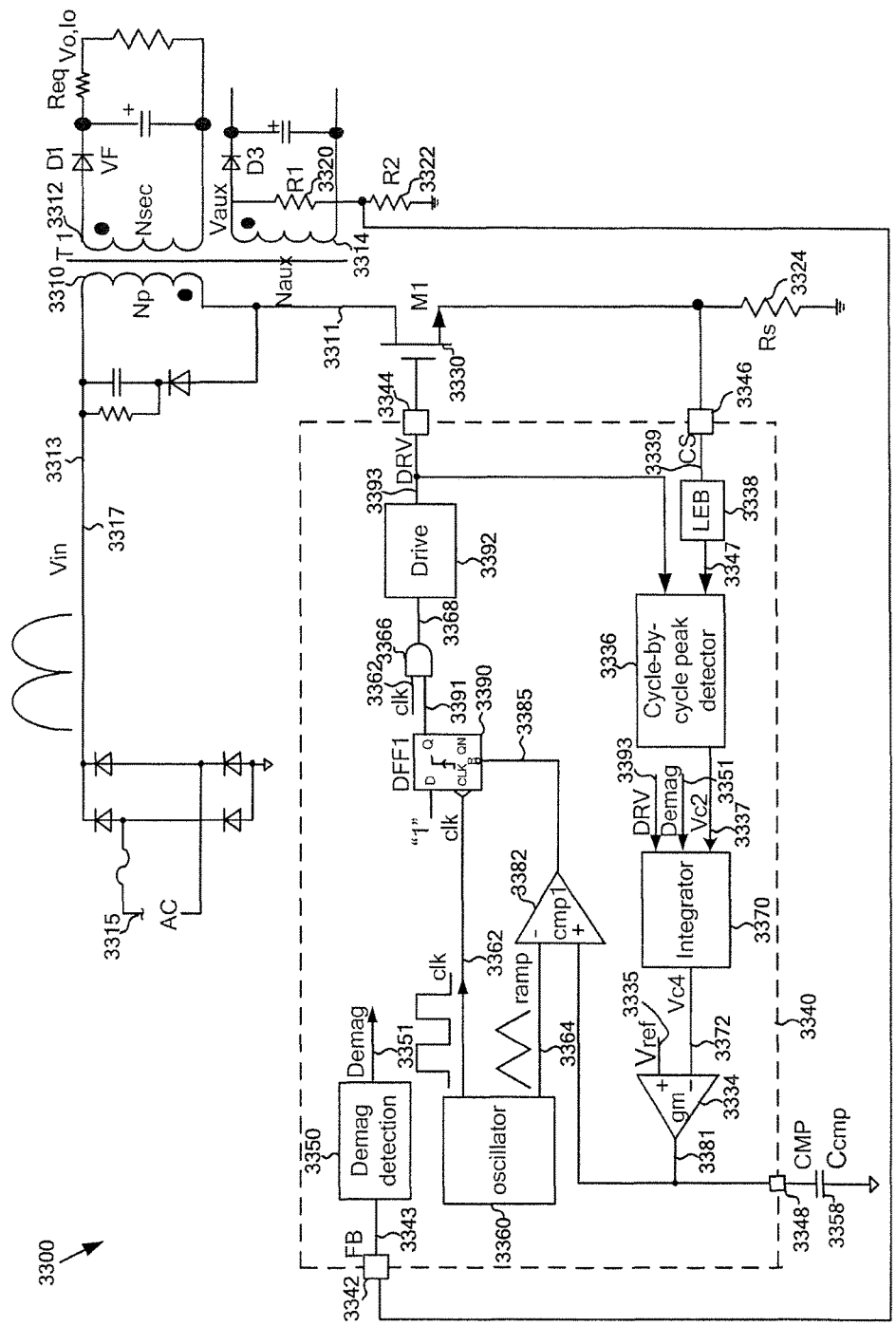
FIG. 33 is a simplified diagram for a switch-mode power conversion system with primary-side sensing and regulation according to yet another embodiment of the present invention.

FIG. 33 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications.

The power conversion system 3300 includes a primary winding 3310, a secondary winding 3312, an auxiliary winding 3314, resistors 3320, 3322, and 3324, a switch 3330, a transconductance amplifier 3334, a cycle-by-cycle peak generator 3336, a leading-edge blanking component 3338, a demagnetization detection component 3350, an oscillator 3360, an AND gate 3366, a capacitor 3358, an integrator 3370, a comparator 3382, a flip-flop component 3390, and a drive component 3392.

For example, the transconductance amplifier 3334, the cycle-by-cycle peak generator 3336, the leading-edge blanking component 3338, the demagnetization detection component 3350, the oscillator 3360, the AND gate 3366, the integrator 3370, the comparator 3382, the flip-flop component 3390, and the drive component 3392 are located on a chip 3340. In another example, the chip 3340 includes at least terminals 3342, 3344, 3346, and 3348. In yet another example, the system 3300 is a switch-mode flyback power conversion system. In yet another example, the demagnetization detection component 3350 is the same as the demagnetization detection component 2150 as shown in FIG. 22. In yet another example, the cycle-by-cycle peak generator 3336 is the same as the cycle-by-cycle peak generator 2836 as shown in FIG. 30. In yet another example, the integrator 3370 is a cycle-by-cycle integrator that is reset after each switching cycle (e.g., at the end of the demagnetization process within each switching cycle).

Figure 34:
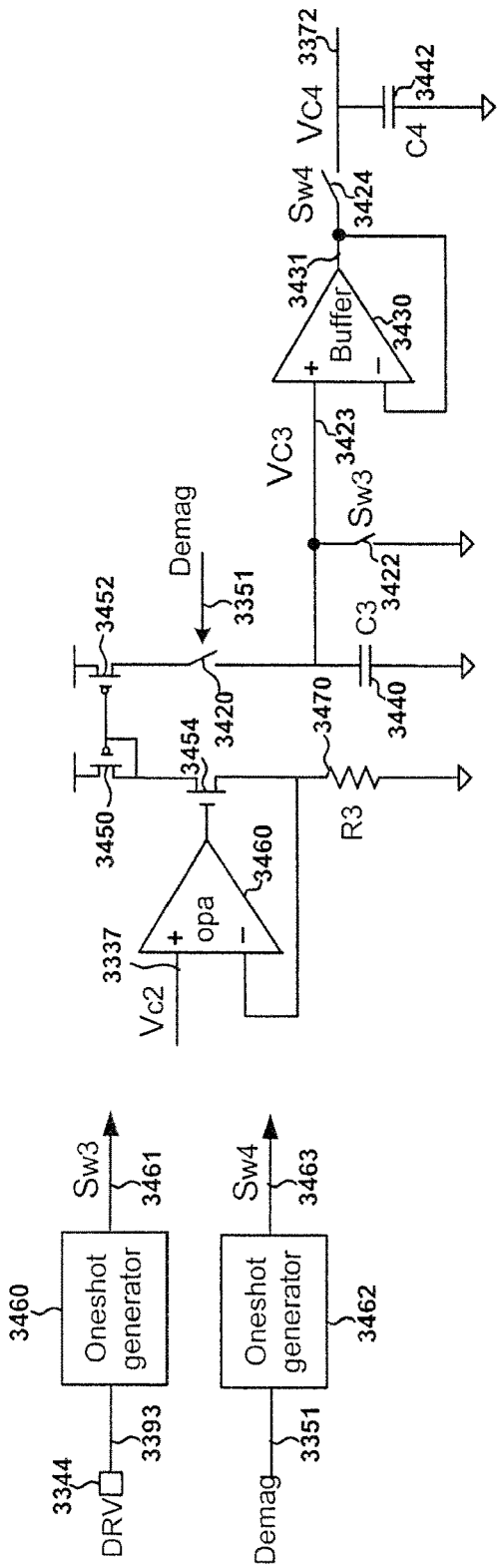
FIG. 34 is a simplified diagram for the integrator as part of the power conversion system according to an embodiment of the present invention.

FIG. 34 is a simplified diagram for the integrator 3370 as part of the power conversion system 3300 according to an embodiment of the present invention. This diagram is merely an example, which should not unduly limit the scope of the claims. One of ordinary skill in the art would recognize many variations, alternatives, and modifications.

In one embodiment, the integrator 3370 includes switches 3420, 3422 and 3424, a buffer 3430, capacitors 3440 and 3442, transistors 3450, 3452 and 3454, an amplifier 3460, one-shot generators 3460 and 3462, and a resistor 3470. In another embodiment, the switch 3320 is controlled by a Demag signal 3351. In yet another embodiment, the switches 3422 and 3424 are controlled by signals 3461 and 3463 respectively. For example, the signal 3461 is generated by the one-shot generator 3460 in response to a drive signal 3393. In another example, the signal 3463 is generated by the one-shot generator 3462 in response to the Demag signal 3351.

Figure 35:
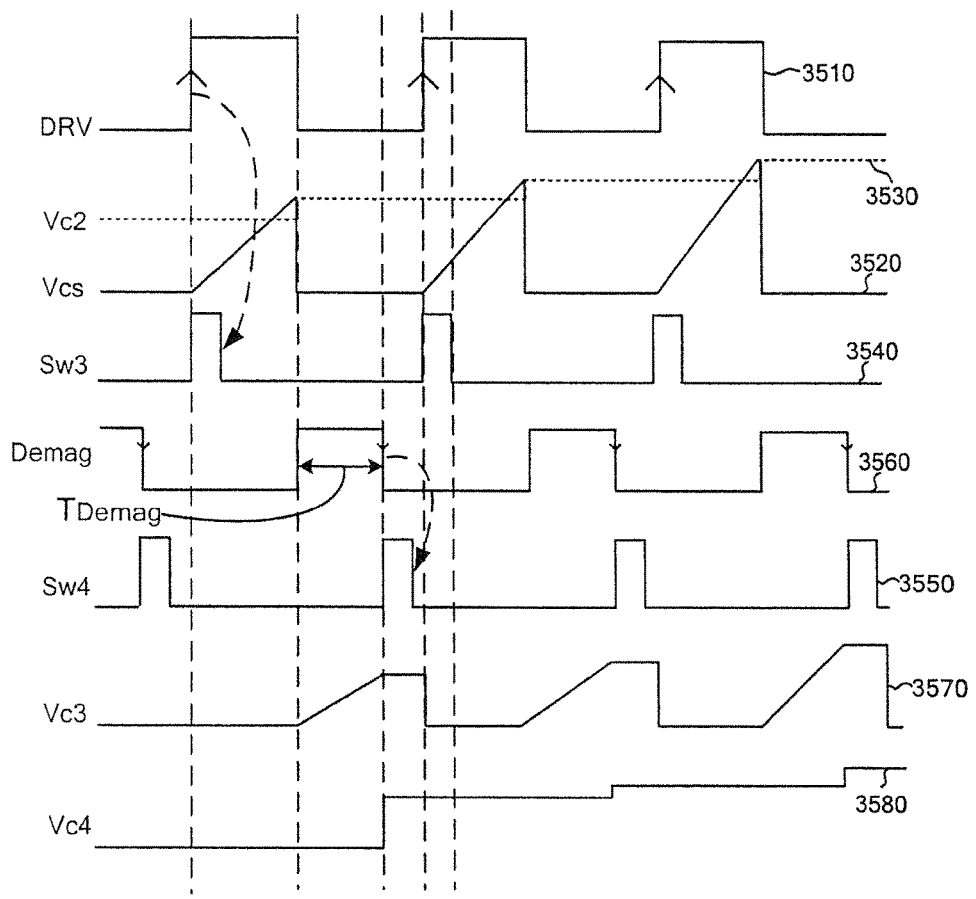
FIG. 35 is a simplified timing diagram for the switch-mode power conversion system including the integrator as shown in FIGS. 33 and 34 according to an embodiment of the present invention.

FIG. 35 is a simplified timing diagram for the switch-mode power conversion system 3300 including the integrator 3370 as shown in FIGS. 33 and 34 according to an embodiment of the present invention. This diagram is merely an example, which should not unduly limit the scope of the claims. One of ordinary skill in the art would recognize many variations, alternatives, and modifications.

As shown in FIG. 35, the waveform 3510 represents the drive signal 3393 as a function of time, the waveform 3520 represents a sensing signal 3347 (e.g., $V_{cs}$) as a function of time, and the waveform 3530 represents a peak signal 3337 (e.g., $V_{c2}$) as a function of time. Additionally, the waveform 3540 represents a one shot signal 3461 as a function of time, and the waveform 3550 represents a one shot signal 3463 as a function of time. Moreover, the waveform 3560 represents the Demag signal 3351 as a function of time. Also, the waveform 3570 represents a signal 3423 as a function of time, and the waveform 3580 represents a signal 3372 as a function of time.

As shown in FIGS. 34 and 35, the one-shot generator 3460 receives the drive signal 3393 (corresponding to the waveform 3510) and generates the signal 3461 (corresponding to the waveform 3540) in response to rising edges of the drive signal 3393. For example, the signal 3461 is a one-shot signal. In another example, when the one-shot signal 3461 is at the logic high level, the switch 3422 is closed; therefore, the capacitor 3440 is discharged and the signal 3423 (corresponding to the waveform 3570) decreases to the logic low level.

According to one embodiment, when the Demag signal 3351 (corresponding to the waveform 3560) is at the logic high level, the switch 3420 is closed. According to another embodiment, the peak signal 3337 (corresponding to the waveform 3530) is received by the amplifier 3460, which converts the peak signal 3337 as a voltage signal to a current signal that is used to charge the capacitor 3440 when the switch 3420 is closed by the Demag signal 3351. For example, the capacitor 3440 outputs the signal 3423 (corresponding to the waveform 3570). In another example, the signal 3423 is received by the buffer 3030, which generates the signal 3431.

According to yet another embodiment, the one-shot generator 3462 receives the Demag signal 3351 (corresponding to the waveform 3560) and generates the signal 3463 (corresponding to the waveform 3550) in response to falling edges of the Demag signal 3351. For example, the signal 3463 is a one-shot signal. In another example, when the one-shot signal 3463 is at the logic high level, the switch 3424 is closed; therefore, the capacitor 3442 is charged and the signal 3372 (corresponding to the waveform 3580) is used to sample the signal 3431. In yet another example, the sampled signal 3431 is held on the capacitor 3442 and outputted as the signal 3372 until the arrival of the next pulse of the drive signal 3344.

According to yet another embodiment, the signal 3372 is $$V_{c4} = \int_0^{T_{Demag}} \frac{V_{c2}}{R_3} \times \frac{1}{C_3} dt = \frac{V_{c2} \times T_{Demag}}{R_3 \times C_3} \tag{42}$$

where $V_{c4}$ represents the signal 3372, and $V_{c2}$ represents the peak signal 3337. Additionally, $T_{Demag}$ represents duration of the demagnetization process within each switching cycle. Moreover, $R_3$ represents the resistance value of the resistor 3470, and $C_3$ represents the capacitance value of the capacitor 3440.

Figure 36:
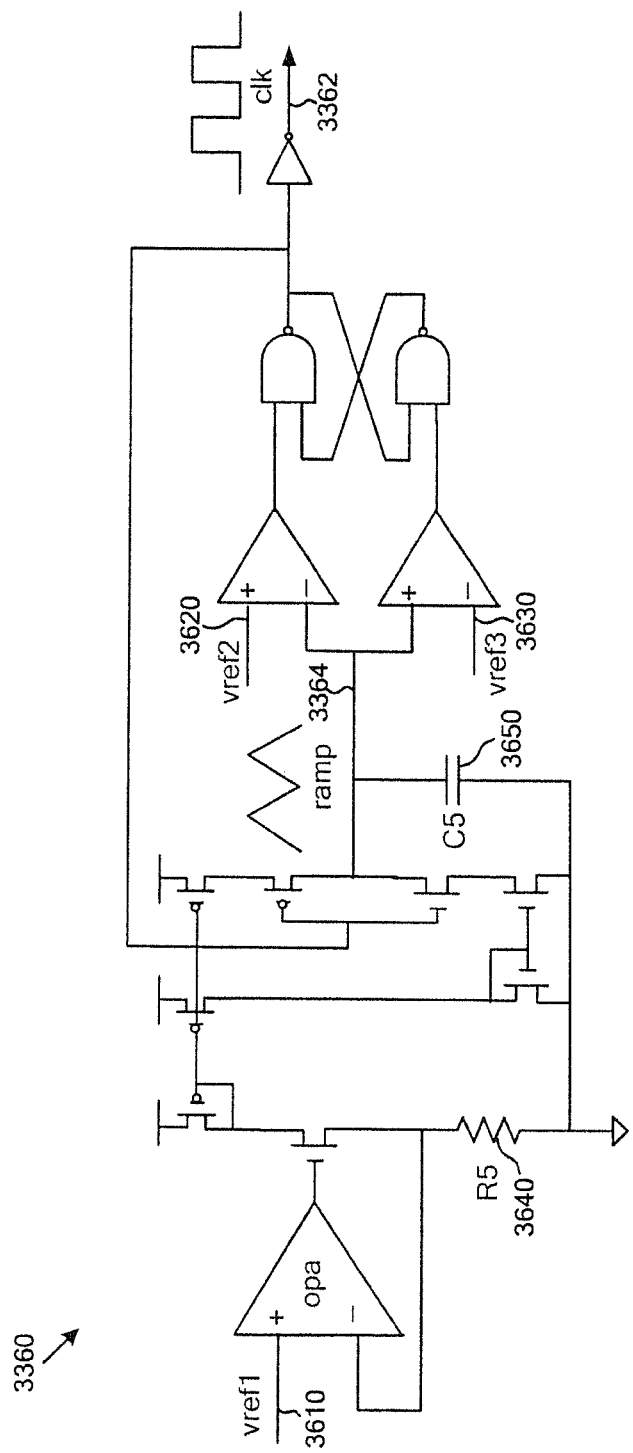
FIG. 36 is a simplified diagram for the oscillator as part of the power conversion system according to an embodiment of the present invention.

FIG. 36 is a simplified diagram for the oscillator 3360 as part of the power conversion system 3300 according to an embodiment of the present invention. This diagram is merely an example, which should not unduly limit the scope of the claims. One of ordinary skill in the art would recognize many variations, alternatives, and modifications.

In one embodiment, the oscillator 3360 includes at least a resistor 3640 and a capacitor 3650. In another embodiment, the oscillator 3360 receives reference signals 3610, 3620, and 3630, and generates a clock signal 3362 and a ramp signal 3364. In yet another embodiment, the period of the clock signal 3362 and the ramp signal 3364 is determined by $$T_{osc} = 2 \times R_5 \times C_5 \times \frac{V_{ref2} - V_{ref3}}{V_{ref1}} \tag{43}$$

where $T_{osc}$ represents the period of the clock signal 3362 and the ramp signal 3364. Additionally, $V_{ref1}$, $V_{ref2}$ and $V_{ref3}$ represent the reference signals 3610, 3620 and 3630 respectively. Moreover, $R_5$ represents the resistance value of the resistor 3640, and $C_5$ represents the capacitance value of the capacitor 3650.

In yet another embodiment, the switching period of the power conversion system 3300 is equal to the period of the clock signal 3362 and the ramp signal 3364, and the switching frequency is determined as follows:

$$F_{sw} = \frac{V_{ref1}}{2 \times R_5 \times C_5 \times (V_{ref2} - V_{ref3})} \tag{44}$$

where $F_{sw}$ represents the switching frequency of the power conversion system 3300. For example, the power conversion system 3300 operates with a fixed switching frequency.

Figure 37:
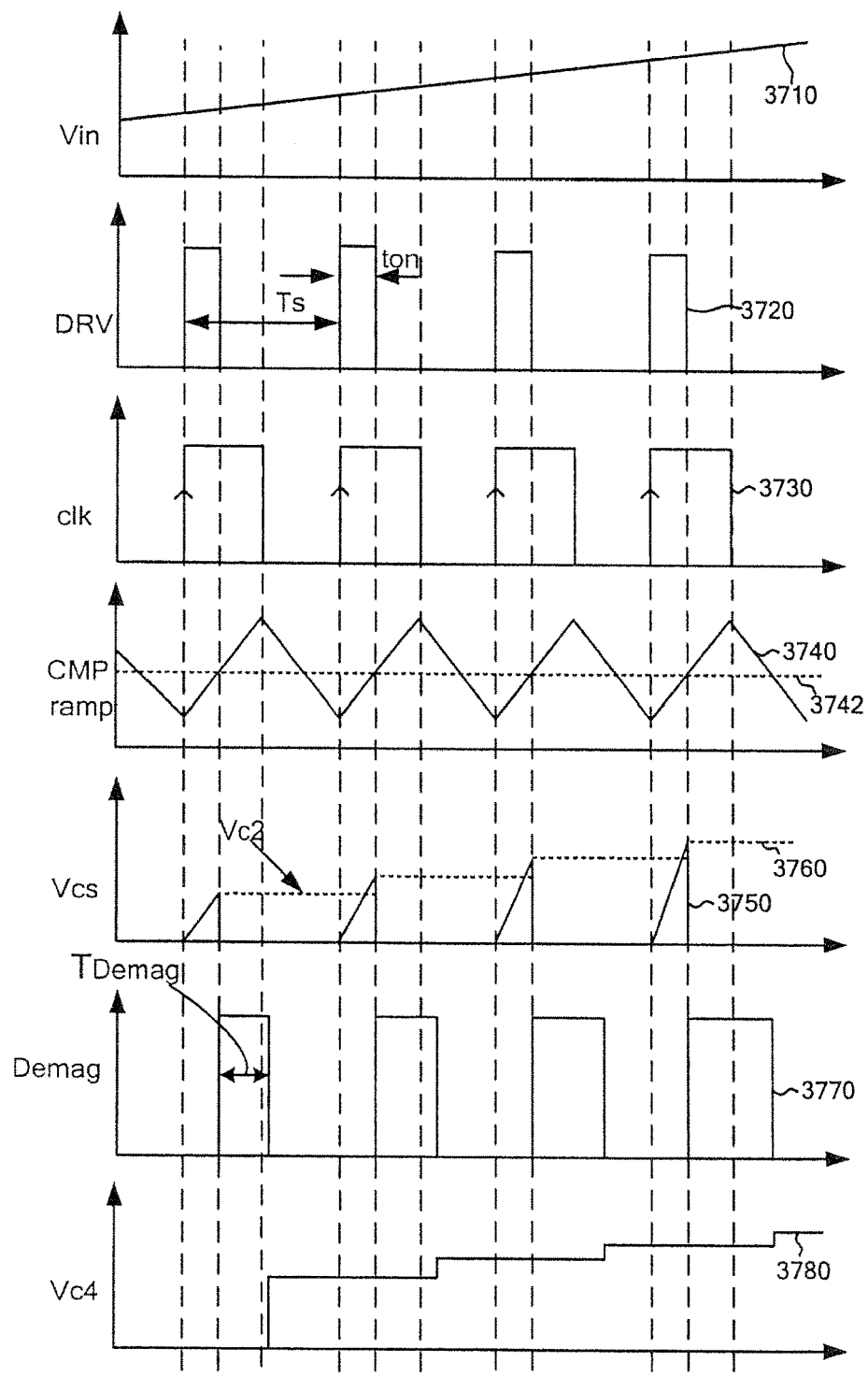
FIG. 37 is a simplified timing diagram for the switch-mode power conversion system according to an embodiment of the present invention.

FIG. 37 is a simplified timing diagram for the switch-mode power conversion system 3300 according to an embodiment of the present invention. This diagram is merely an example, which should not unduly limit the scope of the claims. One of ordinary skill in the art would recognize many variations, alternatives, and modifications.

As shown in FIG. 37, the waveform 3710 represents an input signal 3313 (e.g., $V_{in}$) as a function of time, and the waveform 3720 represents the drive signal 3393 as a function of time. Additionally, the waveform 3730 represents a clock signal 3362 as a function of time, the waveform 3740 represents a ramp signal 3364 as a function of time, and the waveform 3742 represents a signal 3381 (e.g., CMP) as a function of time. Moreover, the waveform 3750 represents the sensing signal 3347 (e.g., $V_{cs}$) as a function of time, and the waveform 3760 represents the peak signal 3337 (e.g., $V_{c2}$) as a function of time. Moreover, the waveform 3770 represents the Demag signal 3351 as a function of time, and the waveform 3780 represents the signal 3372 as a function of time.

As shown in FIGS. 33 and 37, at a rising edge of the clock signal 3362 (corresponding to the waveform 3730), the drive signal 3393 (corresponding to the waveform 3720) changes to the logic high level and the switch 3330 is turned on. The current 3311 that flows through the primary winding 3310 ramps up linearly, and the signal 3347 (e.g., $V_{cs}$) also ramps up linearly through the leading-edge blanking component 3338 according to one embodiment. For example, the signal 3347 (e.g., $V_{cs}$) is received by the cycle-by-cycle peak detector 3336, which detects the peak value of the signal 3347 within each switching period and outputs the peak signal 3337 (corresponding to the waveform 3760) that is representative of the detected peak value of the signal 3347. In another example, the peak signal 3337 (e.g., $V_{c2}$) is received by the integrator 3370, which also receives the drive signal 3393 (corresponding to the waveform 3720) and the Demag signal 3351 (corresponding to the waveform 3770) and outputs the signal 3372 (corresponding to the waveform 3780) to the transconductance amplifier 3334.

According to one embodiment, the transconductance amplifier 3334 also receives a reference signal 3335 (e.g., $V_{ref}$), and in response, amplifies and converts the voltage difference between the signal 3372 (e.g., $V_{c4}$) and the reference signal 3335 (e.g., $V_{ref}$) into a current signal, which in turn is converted into the voltage signal 3381 (e.g., CMP) by the capacitor 3358. According to another embodiment, the voltage signal 3381 (corresponding to the waveform 3742) is received by the comparator 3382, which also receives the ramp signal 3364 (corresponding to the waveform 3740).

For example, the voltage signal 3381 (e.g., CMP) is constant with time in magnitude. In another example, the comparator 3382 compares the voltage signal 3381 (corresponding to the waveform 3742) with the ramp signal 3364 (corresponding to the waveform 3740), and outputs a comparison signal 3385 to the flip-flop component 3390. In one embodiment, the flip-flop component 3390 also receives at least the clock signal 3362 from the oscillator 3360 and generates a signal 3391. In another embodiment, the signal 3391 is received by the AND gate 3366, which also receives the clock signal 3362 and generates a modulation signal 3368. In yet another embodiment, the driver component 3392 receives the modulation signal 3368 and generates the drive signal 3393.

As shown by the waveforms 3720, 3740 and 3742, if the ramp signal 3364 reaches the voltage signal 3381 (e.g., CMP), the drive signal 3393 changes from the logic high level to the logic low level and the switch 3330 is turned off. For example, when the switch 3330 is turned off, the stored energy is delivered to the output of the power conversion system 3300 and the demagnetization process starts. In another example, during the demagnetization process, the current that flows through the secondary winding 3312 ramps down linearly.

As shown in FIG. 33, an output voltage (e.g., $V_{aux}$) of the auxiliary winding 3314 images the output voltage (e.g., $V_o$) of the power conversion system 3300, and is converted into the feedback signal 3343 (e.g., $V_{FB}$) by the resistors 3320 and 3322. For example, the feedback signal 3343 (e.g., $V_{FB}$) is received by the demagnetization detection component 3350, which compares the feedback signal 3343 (e.g., $V_{FB}$) with a threshold signal (e.g., 0.1V).

According to one embodiment, when the feedback signal 3343 (e.g., $V_{FB}$) rises above the threshold signal (e.g., 0.1 V), the Demag signal 3351 changes to the logic high level, which indicates the beginning of the demagnetization process, as shown by the waveform 3770. According to another embodiment, when the feedback signal 3343 (e.g., $V_{FB}$) drops below the threshold signal (e.g., 0.1V), the Demag signal 3351 changes to the logic low level, which indicates the end of the demagnetization process. For example, the demagnetization process ends when the current that flows through the secondary winding 3312 drops to almost zero. In another example, after the end of the demagnetization process, the power conversion system 3300 enters the state of resonance oscillation, and the feedback signal 3343 (e.g., $V_{FB}$) is approximately a sine wave. According to yet another embodiment, as shown by the waveforms 3720 and 3730, at the next rising edge of the clock signal 3362, the drive signal 3393 again changes to the logic high level and the switch 3330 is again turned on.

In one embodiment, an AC input signal 3315 is converted into the rectified input signal 3313 (e.g., $V_{in}$) as follows:

$$V_{in} = \left| \sqrt{2} \times V_{rms} \times \sin\left(\frac{2\pi}{T_{AC}} \times t\right) \right| \qquad (45)$$

where $V_{in}$ represents the rectified input signal 3313. Additionally, $V_{rms}$ represents the root-mean-square magnitude of the AC input signal 3315, and $T_{AC}$ represents the period of the AC input signal 3315. For example, $T_{AG}$ is equal to 20 ms.

In another example, the peak signal 3337 is $$V_{c2} = \frac{V_{in}}{L_p} \times t_{on} \times R_s \qquad (46)$$

where $V_{c2}$ represents the peak signal 3337. Additionally, $t_{on}$ represents the pulse width of the drive signal 3393, and $R_s$ represents the resistance value of the resistor 3324. Also, $L_p$ represents the inductance of the primary winding 3310.

In yet another example, based on Equation 42, the signal 3372 is equal to $$V_{c4} = \frac{V_{c2} \times T_{Demag}}{R_3 \times C_3} = \frac{V_{cs\_pk} \times T_{Demag}}{R_3 \times C_3} \qquad (47)$$

where $V_{c4}$ represents the signal 3372, and $T_{Demag}$ represents duration of the demagnetization process within each switching cycle. Additionally, $R_3$ represents the resistance value of the resistor 3470, and $C_3$ represents the capacitance value of the capacitor 3440. Moreover, $V_{cs\_pk}$ represents the peak value of the signal 3347, which is, for example, equal to $V_{c2}$.

In yet another example, as shown in FIG. 33, the signal 3372 is averaged and the average of the signal 3372 is made equal to the reference signal 3335. According to one embodiment, if $$\frac{g_m}{2\pi \times C_{cmp}} < \frac{1}{K \times T_{AC}} \tag{48}$$

then, $$V_{ref} = V_{c4\_ave} = \frac{1}{T} \times \int_0^T V_{c4} dt \tag{49}$$

where $g_m$ is the transconductance value of the transconductance amplifier 3334, and $C_{cmp}$ is the capacitance value of the capacitor 3358. Additionally, T represents an integration period, and K is a positive integer that is much lager than 1. For example, T is equal to or larger than $T_{AC}$. In another example, K is no smaller than 3. In yet another example, K is equal to 3, 5, 6, 10, or 20. In yet another example, the bandwidth of the transconductance amplifier 3334 is much smaller than the frequency of the AC input signal 3315. Moreover, $V_{c4\_ave}$ represents the average of the signal 3372, and $V_{ref}$ represents the reference signal 3335.

According to another embodiment, combining Equation 47 with Equation 49, one can obtain the following:

$$\frac{1}{T} \times \int_0^T V_{cs\_pk} \times T_{Demag} dt = R_3 \times C_3 \times V_{ref} \tag{50}$$

According to yet another embodiment, based on Equation 44, the power conversion system 3300 operates with a fixed switching frequency, then, $$I_o = \frac{1}{2} \times N \times \frac{1}{T} \times \int_0^T \frac{V_{cs\_pk}}{R_s} \times \frac{T_{Demag}}{T_s} dt = \frac{N}{2 \times R_s \times T_s} \times \frac{1}{T} \times \int_0^T V_{cs\_pk} \times T_{Demag} dt \tag{51}$$

where $I_o$ represents the output current of the switch-mode power conversion system 3300 and N represents a turns ratio between the primary winding 3310 and the secondary winding 3312. Additionally, $R_s$ represents the resistance value of the resistor 3324, which is a constant. Moreover, $T_s$ represents the switching period of the power conversion system 3300, which is a constant equal to $1/F_{sw}$.

According to yet another embodiment, combining Equations 44 and 50 with Equation 51, one can obtain the following:

$$I_0 = \frac{1}{2} \times N \times \frac{1}{R_s} \times \frac{1}{2 \times R_5 \times C_5} \times \frac{V_{ref1}}{V_{ref2} - V_{ref3}} \times R_3 \times C_3 \times V_{ref} \tag{52}$$

$$\text{If } K_0 = \frac{R_3 \times C_3}{2 \times R_5 \times C_5} \times \frac{V_{ref1}}{V_{ref2} - V_{ref3}} \tag{53}$$

$$\text{then } I_0 = \frac{1}{2} \times N \times \frac{1}{R_s} \times K_0 \times V_{ref} \tag{54}$$

For example, based on Equation 54, the output current $I_o$ is constant because $K_0$, $V_{ref}$, $R_s$, and N are all constants. In another example, the power conversion system 3300 intends to keep $$\frac{1}{T} \times \int_0^T V_{cs\_pk} \times T_{Demag} dt$$

and T constant, in order to keep the output current $I_o$ constant. In one embodiment, $$\frac{1}{T} \times \int_0^T V_{cs\_pk} \times T_{Demag} dt$$

is kept constant by at least satisfying Equation 48. In another embodiment, $T_s$ is kept constant by at least satisfying Equation 44.

As shown in FIG. 33, in one embodiment, the rectified input voltage 3313 (e.g., $V_{in}$) is determined by $$V_{in} = \left| \sqrt{2} \times V_{rms} \times \sin\left(\frac{2\pi}{T_{AC}} \times t\right) \right| \tag{55}$$

In another embodiment, the peak value of the current 3311 that flows through the primary winding 3310 is determined by $$I_p = \frac{V_{in}}{L_p} \times t_{on} \tag{56}$$

where $I_p$ represents the peak value of the current 3311, and $L_p$ represents the inductance of the primary winding 3310. Additionally, $t_{on}$ represents the pulse width of the drive signal 3393.

Figure 38:
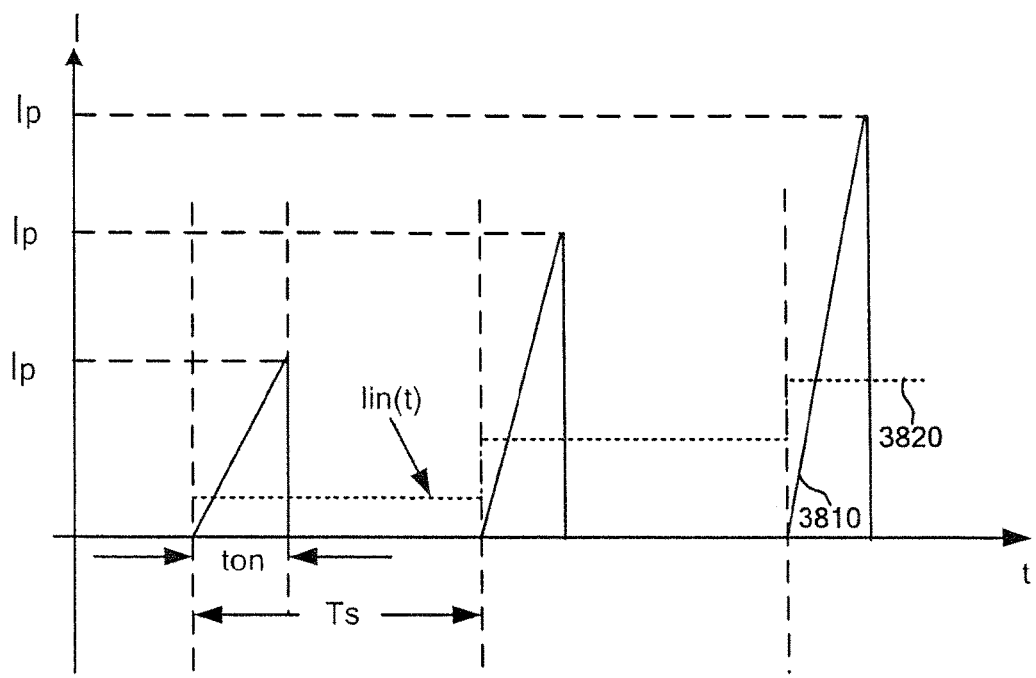
FIG. 38 is a simplified timing diagram for certain currents of the switch-mode power conversion system according to an embodiment of the present invention.

FIG. 38 is a simplified timing diagram for certain currents of the switch-mode power conversion system 3300 according to an embodiment of the present invention. This diagram is merely an example, which should not unduly limit the scope of the claims. One of ordinary skill in the art would recognize many variations, alternatives, and modifications.

For example, the waveform 3810 represents the current 3311 as a function of time, and the waveform 3820 represents a rectified input current 3317 (e.g., $I_{in}$) as a function of time. In another example, the rectified input current 3317 (e.g., $I_{in}$) corresponds to the rectified input voltage 3313 (e.g., $V_{in}$) as shown in FIG. 33.

As shown in FIG. 38, in one embodiment, the rectified input current 3317 (e.g., $I_{in}$) is $$I_{in} = \frac{1}{2} \times I_p \times t_{on})/T_s \tag{57}$$

where $I_{in}$ represents the rectified input current 3317. In another embodiment, combining Equation 56 with Equation 57, one can obtain:

$$I_{in} = \frac{V_{in} \times t_{on}^2}{2 \times L_p \times T_s} \quad (58)$$

In yet another embodiment, $$t_{on} = \frac{1}{2} \times \frac{V_{cmp} - V_{ref3}}{V_{ref2} - V_{ref3}} \quad (59)$$

where $V_{cmp}$ represents the signal 3381. Additionally, $V_{ref2}$ and $V_{ref3}$ are constants representing the reference signals 3620 and 3630 respectively. For example, based on Equation 59, $t_{on}$ is constant within at least one period of the AC input signal 3315, if Equation 48 is satisfied and hence $V_{cmp}$ is constant within at least one period of the AC input signal 3315.

If $$M = \frac{t_{on}^2}{2 \times L_p \times T_s} \quad (60)$$

then, according to Equation 58, $$I_{in} = M \times V_{in} \quad (61)$$

According to one embodiment, as shown in FIG. 38, the switching period $T_s$ of the power conversion system 3300 is a constant based on Equation 44; hence M is also a positive constant within at least one period of the AC input signal 3315, and the power factor (PF) of the power conversion system 3300 is equal to 1 or substantially equal to 1. For example, the power factor (PF) of the power conversion system 3300 is equal to or larger than 0.9. According to another embodiment, by at least satisfying Equations 44 and 48, the power factor (PF) of the power conversion system 3300 is close to 1.

As discussed above and further emphasized here, FIG. 33 is merely an example, which should not unduly limit the scope of the claims. One of ordinary skill in the art would recognize many variations, alternatives, and modifications. For example, the power conversion system 3300 includes one or more bulk capacitors to convert the AC input signal 3315 into a DC signal that is received by the primary winding 3310, as shown in FIG. 39.

Figure 39:
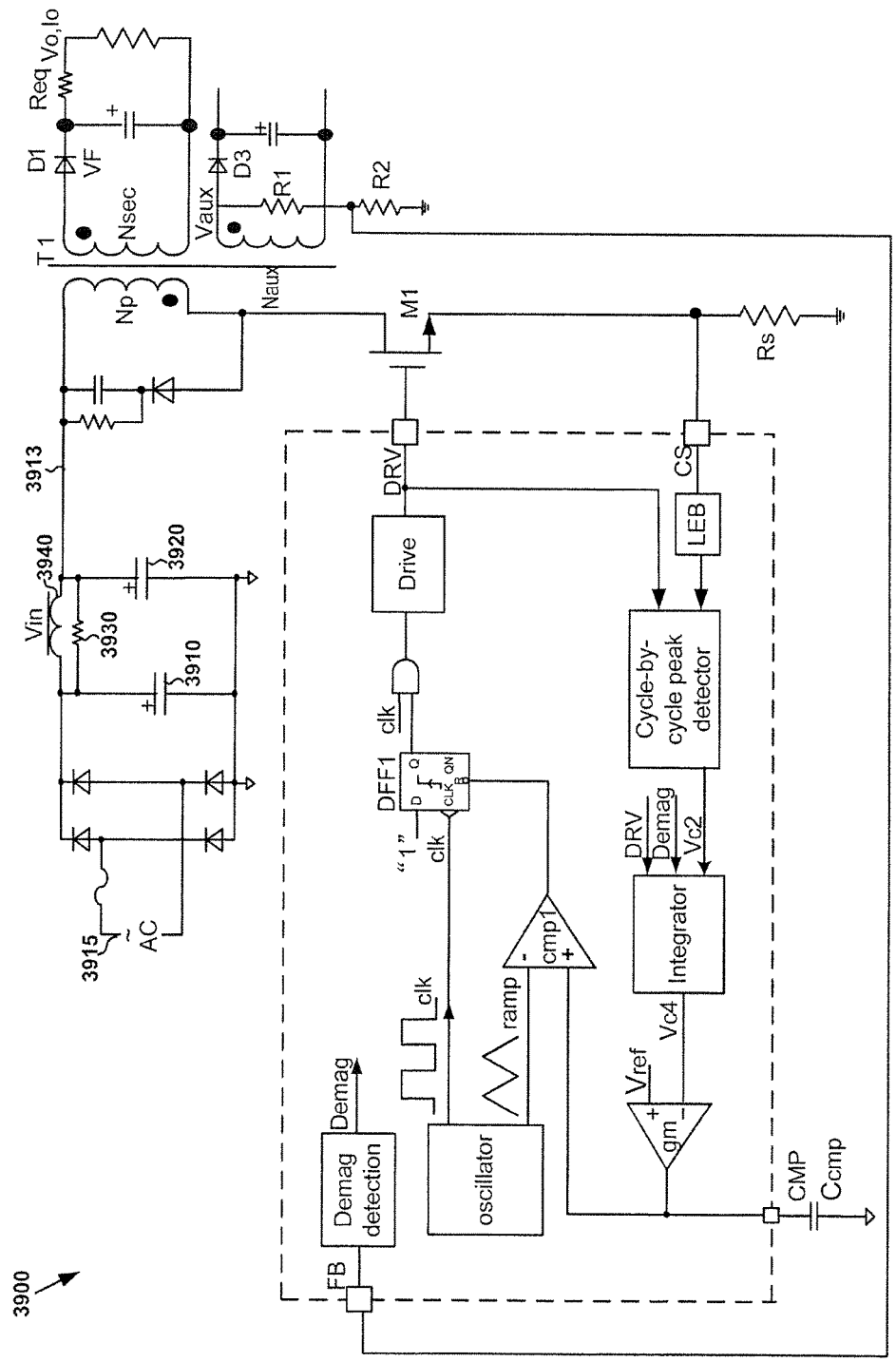
FIG. 39 is a simplified diagram for a switch-mode power conversion system with primary-side sensing and regulation according to yet another embodiment of the present invention.

FIG. 39 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications.

For example, the power conversion system 3900 is the same as the power conversion system 3300, except that the power conversion system 3900 also includes capacitors 3910 and 3920, a resistor 3930, and an inductor 3940. In another example, the capacitors 3910 and 3920, the resistor 3930, and the inductor 3940 are used to convert an AC input signal 3915 into a DC input signal 3913 (e.g., $V_{in}$).

Referring to FIGS. 33 and 39, according to one embodiment, the power conversation system 3900 can achieve constant output current with power factor that is equal to 1 or substantially equal to 1. For example, the power factor (PF) of the power conversion system 3900 is equal to or larger than 0.9. According to another embodiment, the power conversation system 3300 is used to provide power to one or more light emitting diodes, as shown in FIG. 40.

Figure 40:
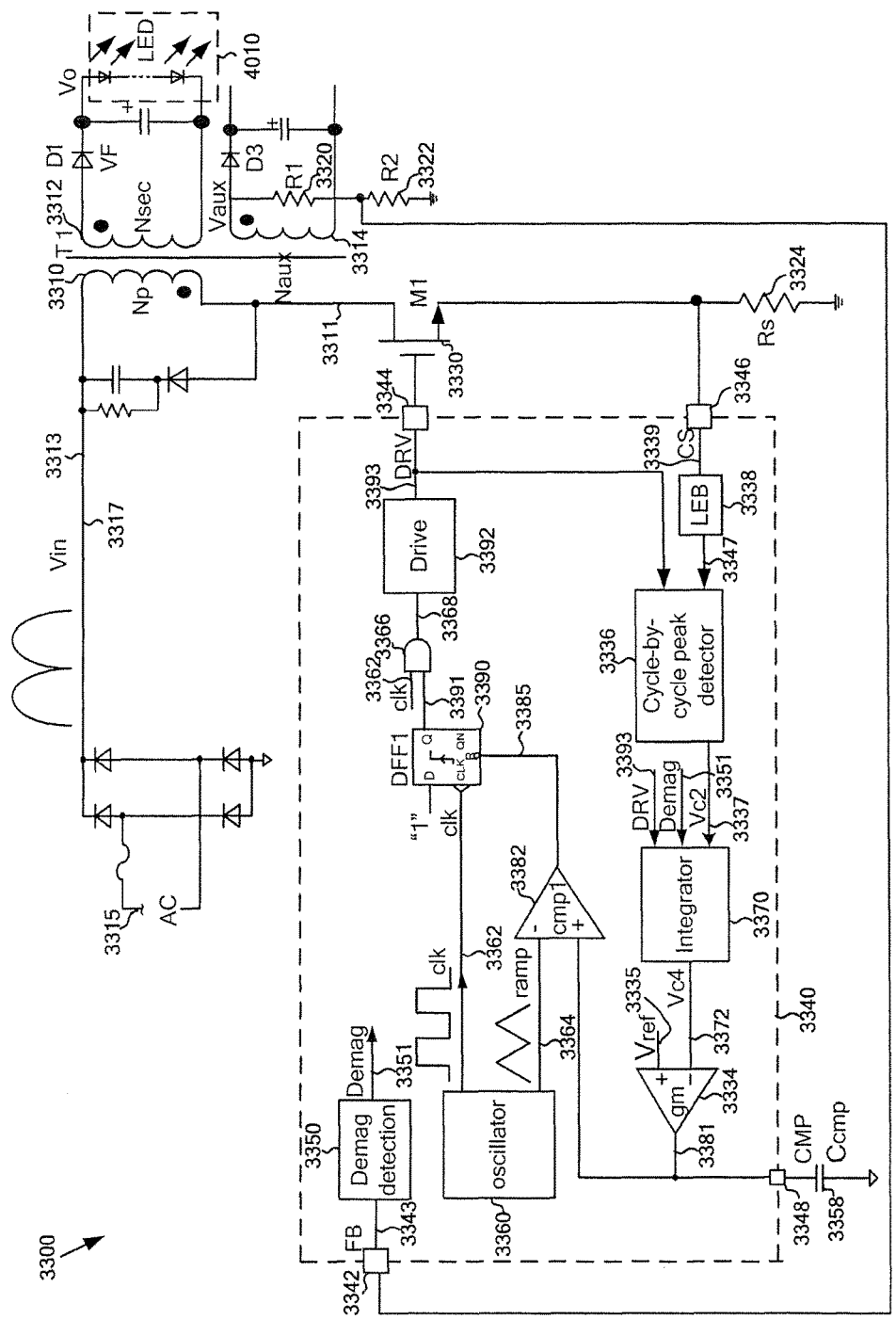
FIG. 40 is a simplified diagram for the switch-mode power conversion system used to power light emitting diodes according to yet another embodiment of the present invention.

FIG. 40 is a simplified diagram for the switch-mode power conversion system 3300 used to power light emitting diodes according to yet another embodiment of the present invention. This diagram is merely an example, which should not unduly limit the scope of the claims. One of ordinary skill in the art would recognize many variations, alternatives, and modifications. For example, the power conversation system 3300 is used to provide power to one or more light emitting diodes 4010.

Figure 41:
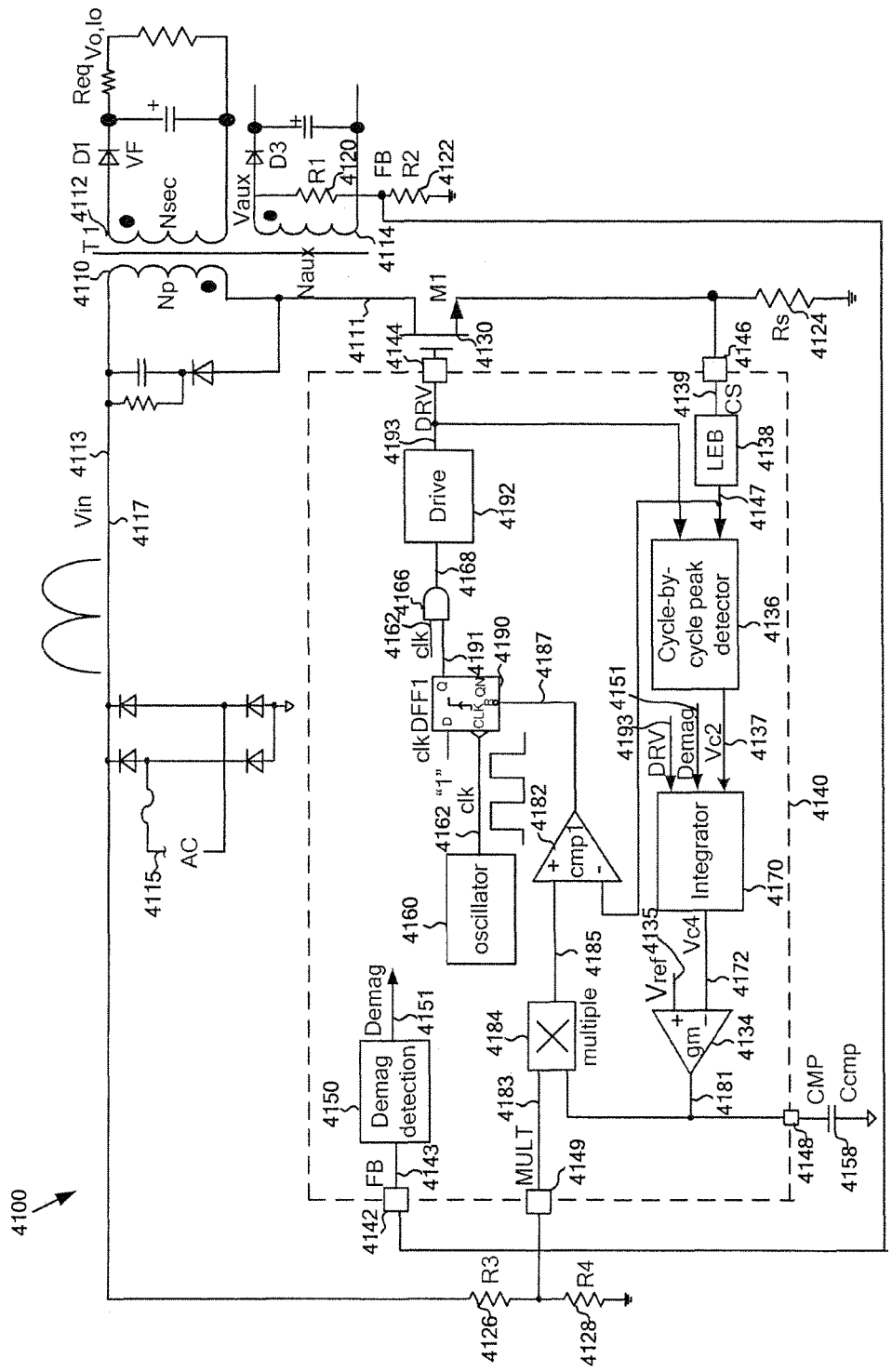
FIG. 41 is a simplified diagram for a switch-mode power conversion system with primary-side sensing and regulation according to yet another embodiment of the present invention.

FIG. 41 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications.

The power conversion system 4100 includes a primary winding 4110, a secondary winding 4112, an auxiliary winding 4114, resistors 4120, 4122, 4124, 4126 and 4128, a switch 4130, a transconductance amplifier 4134, a cycle-by-cycle peak generator 4136, a leading-edge blanking component 4138, a demagnetization detection component 4150, an oscillator 4160, an AND gate 4166, a capacitor 4158, an integrator 4170, a comparator 4182, a multiplier 4184, a flip-flop component 4190, and a drive component 4192.

For example, the transconductance amplifier 4134, the cycle-by-cycle peak generator 4136, the leading-edge blanking component 4138, the demagnetization detection component 4150, the oscillator 4160, the AND gate 4166, the integrator 4170, the comparator 4182, the multiplier 4184, the flip-flop component 4190, and the drive component 4192 are located on a chip 4140. In another example, the chip 4140 includes at least terminals 4142, 4144, 4146, 4148, and 4149. In yet another example, the system 4100 is a switch-mode flyback power conversion system.

In yet another example, the demagnetization detection component 4150 is the same as the demagnetization detection component 2150 as shown in FIG. 22. In yet another example, the cycle-by-cycle peak generator 4136 is the same as the cycle-by-cycle peak generator 2836 as shown in FIG. 30. In yet another example, the integrator 4170 is the same as the integrator 3370 as shown in FIG. 34. In yet another example, the oscillator 4160 is the same as the oscillator 3360 as shown in FIG. 36. In yet another example, the integrator 4170 is a cycle-by-cycle integrator that is reset after each switching cycle (e.g., at the end of the demagnetization process within each switching cycle).

Figure 42:
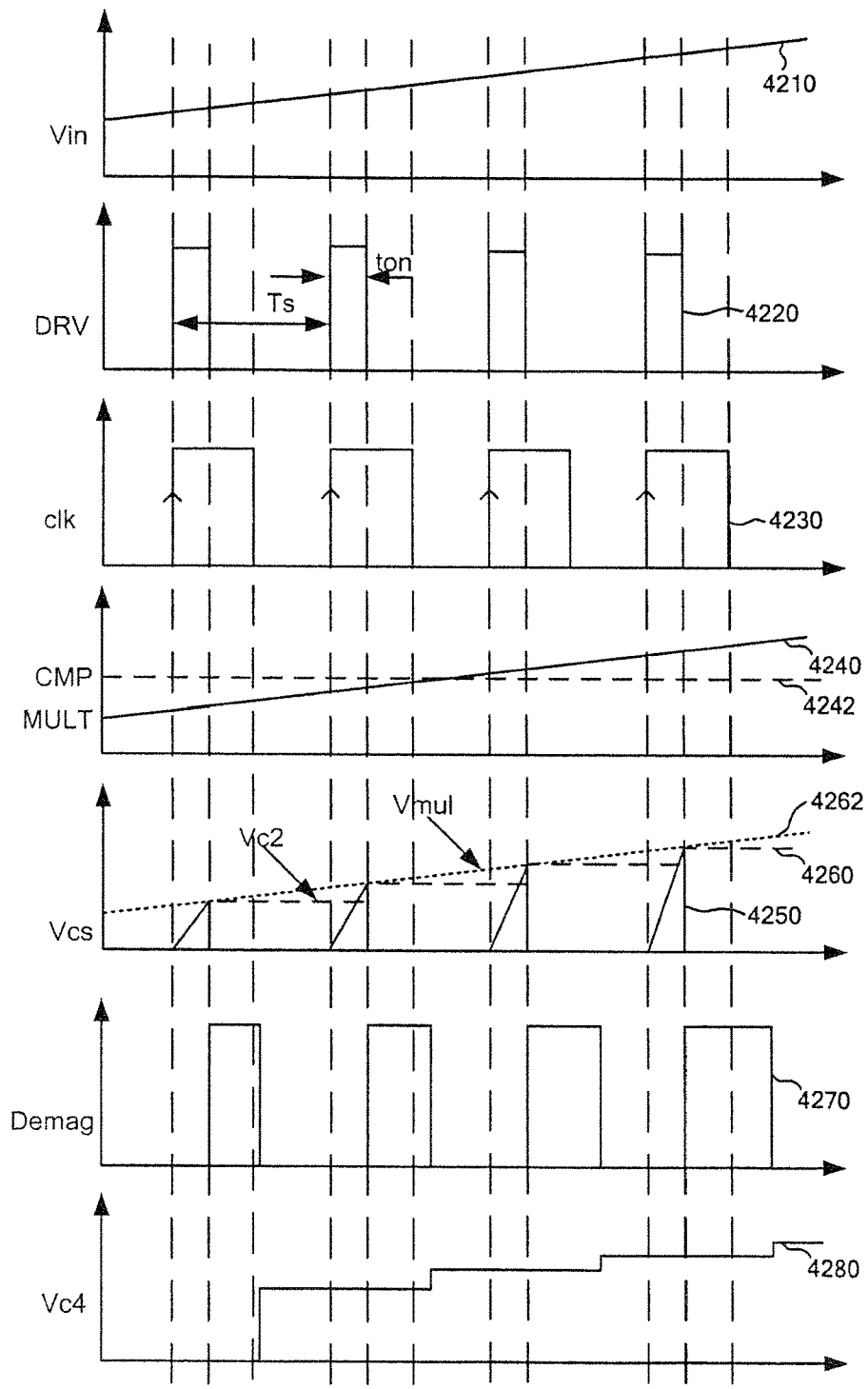
FIG. 42 is a simplified timing diagram for the switch-mode power conversion system according to an embodiment of the present invention.

FIG. 42 is a simplified timing diagram for the switch-mode power conversion system 4100 according to an embodiment of the present invention. This diagram is merely an example, which should not unduly limit the scope of the claims. One of ordinary skill in the art would recognize many variations, alternatives, and modifications.

As shown in FIG. 42, the waveform 4210 represents an input signal 4113 (e.g., $V_{in}$) as a function of time, the waveform 4220 represents a drive signal 4193 as a function of time, and the waveform 4230 represents a clock signal 4162 as a function of time. Additionally, the waveform 4240 represents a signal 4183 (e.g., MULT) as a function of time, and the waveform 4242 represents a signal 4181 (e.g., CMP) as a function of time. Moreover, the waveform 4250 represents a sensing signal 4147 (e.g., $V_{cs}$) as a function of time, the waveform 4260 represents a peak signal 4137 (e.g., $V_{c2}$) as a function of time, and the waveform 4262 represents a signal 4185 as a function of time. Also, the waveform 4270 represents a Demag signal 4151 as a function of time, and the waveform 4280 represents the signal 4172 as a function of time.

As shown in FIGS. 41 and 42, at a rising edge of the clock signal 4162 (corresponding to the waveform 4230), the drive signal 4193 (corresponding to the waveform 4220) changes to the logic high level and the switch 4130 is turned on. The current 4111 that flows through the primary winding 4110 ramps up linearly, and the signal 4147 (e.g., $V_{cs}$) also ramps up linearly through the leading-edge blanking component 4138 according to one embodiment. For example, the signal 4147 (e.g., $V_{cs}$) is received by the cycle-by-cycle peak detector 4136, which detects the peak value of the signal 4147 within each switching period and outputs the peak signal 4137 (corresponding to the waveform 4260) that is representative of the detected peak value of the signal 4147. In another example, the peak signal 4137 (e.g., $V_{c2}$) is received by the integrator 4170, which also receives the drive signal 4193 (corresponding to the waveform 4220) and the Demag signal 4151 (corresponding to the waveform 4270) and outputs the signal 4172 (corresponding to the waveform 4280) to the transconductance amplifier 4134.

According to one embodiment, the transconductance amplifier 4134 also receives a reference signal 4135 (e.g., $V_{ref}$), and in response, amplifies and converts the voltage difference between the signal 4172 (e.g., $V_{c4}$) and the reference signal 4135 (e.g., $V_{ref}$) into a current signal, which in turn is converted into the voltage signal 4181 (e.g., CMP) by the capacitor 4158. For example, the voltage signal 4181 (e.g., CMP) is constant with time in magnitude. In another example, the voltage signal 4181 (corresponding to the waveform 4242) is received by the multiplier 4184, which also receives the signal 4183 (corresponding to the waveform 4240). In yet another example, the signal 4183 is proportional to the input signal 4113 (e.g., $V_{in}$) by the resistors 4126 and 4128.

According to another embodiment, the multiplier 4184, in response, outputs the signal 4185 (corresponding the waveform 4262) to the comparator 4182, which also receives the sensing signal 4147 (corresponding the waveform 4250). For example, the comparator 4182 compares the signal 4185 (corresponding to the waveform 4262) with the sensing signal 4147 (corresponding to the waveform 4250), and outputs a comparison signal 4187 to the flip-flop component 4190. In one embodiment, the flip-flop component 4190 also receives at least the clock signal 4162 from the oscillator 4160 and generates a signal 4191. In another embodiment, the signal 4191 is received by the AND gate 4166, which also receives the clock signal 4162 and generates a modulation signal 4168. In yet another embodiment, the driver component 4192 receives the modulation signal 4168 and generates the drive signal 4193.

As shown by the waveforms 4220, 4250 and 4262, if the signal 4147 reaches the signal 4185, the drive signal 4193 changes from the logic high level to the logic low level and the switch 4130 is turned off. For example, when the switch 4130 is turned off, the stored energy is delivered to the output of the power conversion system 4100 and the demagnetization process starts. In another example, during the demagnetization process, the current that flows through the secondary winding 4112 ramps down linearly.

As shown in FIG. 41, an output voltage (e.g., $V_{aux}$) of the auxiliary winding 4114 images the output voltage (e.g., $V_o$) of the power conversion system 4100, and is converted into the feedback signal 4143 (e.g., $V_{FB}$) by the resistors 4120 and 4122. For example, the feedback signal 4143 (e.g., $V_{FB}$) is received by the demagnetization detection component 4150, which compares the feedback signal 4143 (e.g., $V_{FB}$) with a threshold signal (e.g., 0.1V).

According to one embodiment, when the feedback signal 4143 (e.g., $V_{FB}$) rises above the threshold signal (e.g., 0.1 V), the Demag signal 4151 changes to the logic high level, which indicates the beginning of the demagnetization process, as shown by the waveform 4270. According to another embodiment, when the feedback signal 4143 (e.g., $V_{FB}$) drops below the threshold signal (e.g., 0.1V), the Demag signal 4151 changes to the logic low level, which indicates the end of the demagnetization process. For example, the demagnetization process ends when the current that flows through the secondary winding 4112 drops to almost zero. In another example, after the end of the demagnetization process, the power conversion system 4100 enters the state of resonance oscillation, and the feedback signal 4143 (e.g., $V_{FB}$) is approximately a sine wave. According to yet another embodiment, as shown by the waveforms 4220 and 4230, at the next rising edge of the clock signal 4162, the drive signal 4193 again changes to the logic high level and the switch 4130 is again turned on.

In one embodiment, as shown in FIG. 41, the output current is $$I_0 = \frac{1}{2} \times N \times \frac{1}{R_s} \times K_0 \times V_{ref} \qquad (62)$$

where $I_0$ represents the output current of the switch-mode power conversion system 4100. Additionally, N is a constant, representing a turns ratio between the primary winding 4110 and the secondary winding 4112. Moreover, $R_s$ represents the resistance value of the resistor 4124 and $V_{ref}$ represents the reference signal 4135, both $R_s$ and $V_{ref}$ being constant. Also, $K_0$ is a constant.

For example, to achieve Equation 62, the power conversion system 4100 operates with a fixed switching frequency, and $$\frac{g_m}{2\pi \times C_{cmp}} < \frac{1}{K \times T_{AC}} \qquad (63)$$

where $g_m$ is the transconductance value of the transconductance amplifier 4134, and $C_{cmp}$ is the capacitance value of the capacitor 4158. Additionally, $T_{AC}$ represents the period of an AC input signal 4115, and K is a positive integer that is much lager than 1. For example, K is no smaller than 3. In another example, K is equal to 3, 5, 6, 10, or 20. In yet another example, the bandwidth of the transconductance amplifier 4134 is much smaller than the frequency of the AC input signal 4115.

In yet another example, based on Equation 62, the output current $I_o$ is constant because $K_0$, $V_{ref}$, $R_s$, and N are all constants. In another example, the power conversion system 4100 intends to keep $$\frac{1}{T} \times \int_0^T V_{cs\_pk} \times T_{Demag} dt$$

and $T_s$ constant, in order to keep the output current $I_o$ constant. T represents an integration period. For example, T is equal to or larger than $T_{AC}$. In one embodiment, $$\frac{1}{T} \times \int_0^T V_{cs\_pk} \times T_{Demag} dt$$

is kept constant by at least satisfying Equation 63. In another embodiment, $T_s$ is kept constant by the oscillator 3360.

As shown in FIG. 41, in one embodiment, the signal 4185 is determined as follows:

$$V_{cs\_pk} = V_{mp} = a \times V_{cmp} \times V_{mult} = a \times V_{cmp} \times \left(\frac{R_4}{R_3 + R_4} \times V_{in}\right) \quad (64)$$

where $V_{cs\_pk}$ represents the peak value of the sensing signal 4147, and $V_{mp}$ represents the signal 4185. Additionally, a is a constant coefficient of the multiplier 4184. Moreover, $V_{cmp}$ represents the signal 4181, and $V_{mult}$ represents the signal 4183. Also, $R_3$ and $R_4$ represent the resistance values of the resistors 4126 and 4128 respectively, and $V_{in}$ represents the rectified input voltage 4113.

In another example, the peak value of the sensing signal 4147 is $$V_{cs\_pk} = \frac{V_{in}}{L_p} \times t_{on} \times R_s \quad (65)$$

where $t_{on}$ represents the pulse width of the drive signal 4193, and $R_s$ represents the resistance value of the resistor 4124. Additionally, $L_p$ represents the inductance of the primary winding 4110.

Combining Equations 64 and 65, one can obtain the following:

$$t_{on} = a \times V_{cmp} \times \frac{R_4}{R_3 + R_4} \times \frac{L_p}{R_s} \quad (66)$$

For example, based on Equation 66, $t_{on}$ is constant within at least one period of the AC input signal 4115, if Equation 63 is satisfied and hence $V_{cmp}$ is constant within at least one period of the AC input signal 3315.

In another example, as shown in FIG. 41, a rectified input current 4117 (e.g., $I_{in}$) that corresponds to the rectified input voltage 4113 (e.g., $V_{in}$) is $$I_{in} = \frac{V_{in} \times t_{on}^2}{2 \times L_p \times T_s} \quad (67)$$

where $I_n$ represents the rectified input current 4117, and $T_s$ represents the switching period of the power conversion system 4100.

If $$M = \frac{t_{on}^2}{2 \times L_p \times T_s} \quad (68)$$

then, according to Equation 67, $$I_{in} = M \times V_{in} \quad (69)$$

According to one embodiment, as shown in FIG. 41, the switching period $T_s$ of the power conversion system 4100 is a constant, and $t_{on}$ is constant within at least one period of the AC input signal 4115; hence M is also a positive constant within at least one period of the AC input signal 4115, and the power factor (PF) of the power conversion system 4100 is equal to 1 or substantially equal to 1. For example, the power factor (PF) of the power conversion system 4100 is equal to or larger than 0.9. According to another embodiment, by at least keeping the switching frequency constant and satisfying Equation 63, the power factor (PF) of the power conversion system 4100 is equal to 1 or substantially equal to 1.

As discussed above and further emphasized here, FIG. 41 is merely an example, which should not unduly limit the scope of the claims. One of ordinary skill in the art would recognize many variations, alternatives, and modifications. For example, the power conversion system 4100 includes one or more bulk capacitors to convert the AC input signal 4115 into a DC signal that is received by the primary winding 4110.

Referring to FIG. 41, according to one embodiment, the power conversation system 4100 can achieve constant output current with power factor that is equal to 1 or substantially equal to 1. According to another embodiment, the power conversation system 4100 is used to provide power to one or more light emitting diodes, as shown in FIG. 43.

Figure 43:
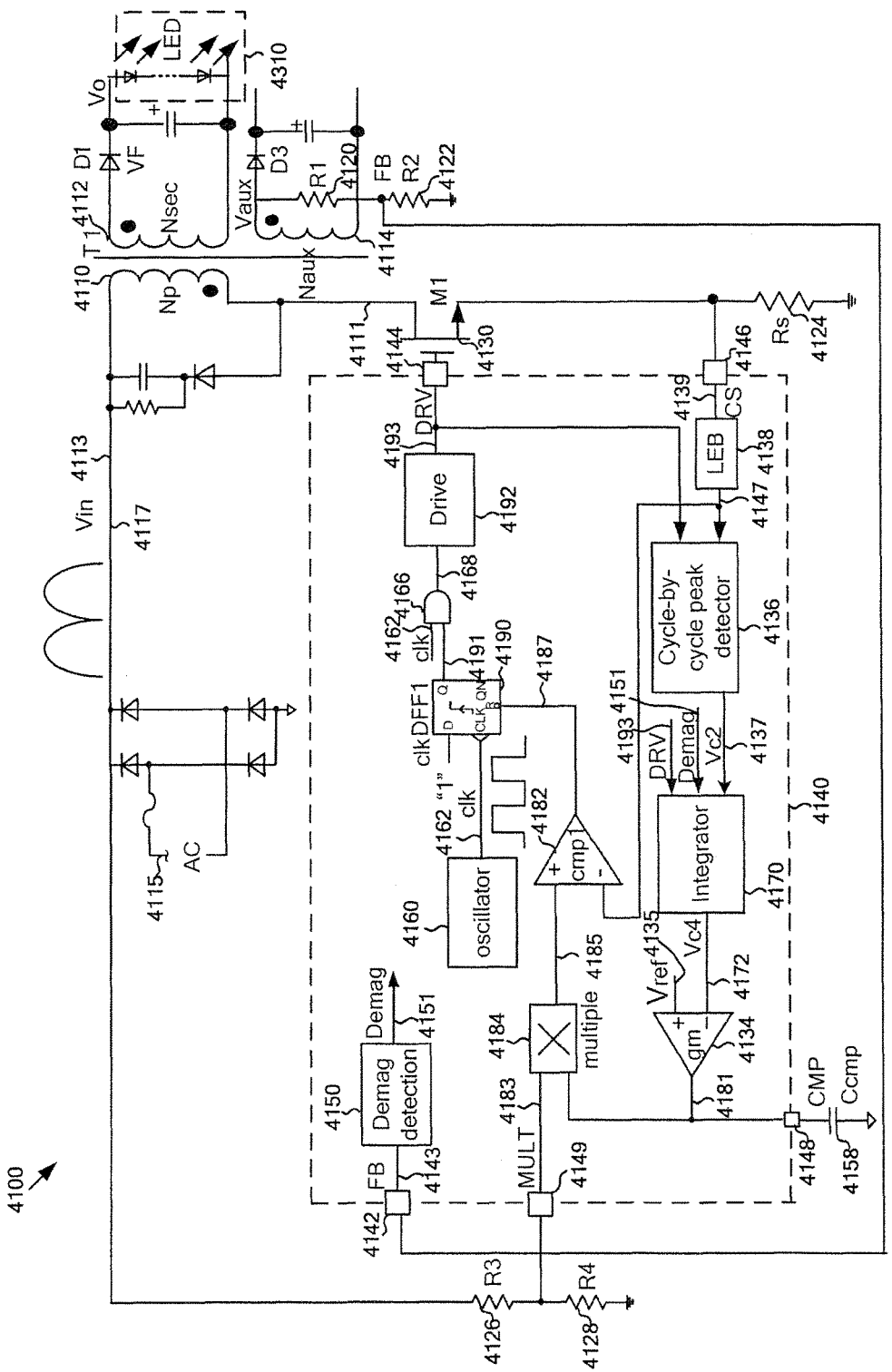
FIG. 43 is a simplified diagram for the switch-mode power conversion system used to power light emitting diodes according to yet another embodiment of the present invention.

FIG. 43 is a simplified diagram for the switch-mode power conversion system 4100 used to power light emitting diodes according to yet another embodiment of the present invention. This diagram is merely an example, which should not unduly limit the scope of the claims. One of ordinary skill in the art would recognize many variations, alternatives, and modifications. For example, the power conversation system 4100 is used to provide power to one or more light emitting diodes 4310.

Figure 44:
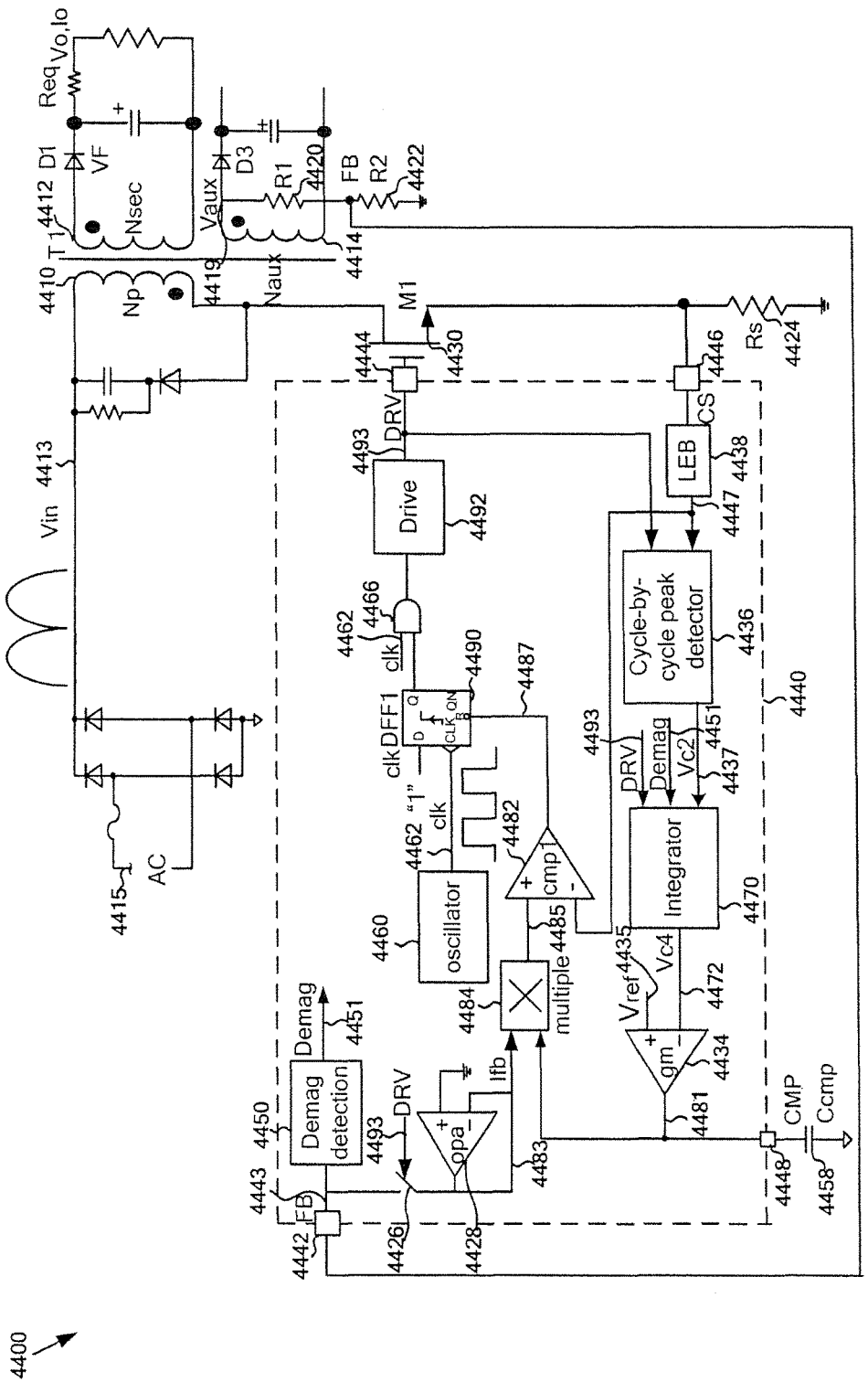
FIG. 44 is a simplified diagram for a switch-mode power conversion system with primary-side sensing and regulation according to yet another embodiment of the present invention.

FIG. 44 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications.

The power conversion system 4400 includes a primary winding 4410, a secondary winding 4412, an auxiliary winding 4414, resistors 4420, 4422 and 4424, a switch 4126, an amplifier 4128, a switch 4430, a transconductance amplifier 4434, a cycle-by-cycle peak generator 4436, a leading-edge blanking component 4438, a demagnetization detection component 4450, an oscillator 4460, an AND gate 4466, a capacitor 4458, an integrator 4470, a comparator 4482, a multiplier 4484, a flip-flop component 4490, and a drive component 4492.

For example, the transconductance amplifier 4434, the cycle-by-cycle peak generator 4436, the leading-edge blanking component 4438, the demagnetization detection component 4450, the oscillator 4460, the AND gate 4466, the integrator 4470, the comparator 4482, the multiplier 4484, the flip-flop component 4490, and the drive component 4492 are located on a chip 4440. In another example, the chip 4440 includes at least terminals 4442, 4444, 4446, and 4448. In yet another example, the system 4400 is a switch-mode flyback power conversion system. In yet another example, the integrator 4470 is a cycle-by-cycle integrator that is reset after each switching cycle (e.g., at the end of the demagnetization process within each switching cycle).

According to one embodiment, the primary winding 4410, the secondary winding 4412, the auxiliary winding 4414, the resistors 4420, 4422 and 4424, the switch 4430, the transconductance amplifier 4434, the cycle-by-cycle peak generator 4436, the leading-edge blanking component 4438, the demagnetization detection component 4450, the oscillator 4460, the AND gate 4466, the capacitor 4458, the integrator 4470, the comparator 4482, the flip-flop component 4490, and the drive component 4492 are the same as the primary winding 4110, the secondary winding 4112, the auxiliary winding 4114, the resistors 4120, 4122 and 4124, the switch 4130, the transconductance amplifier 4134, the cycle-by-cycle peak generator 4136, the leading-edge blanking component 4138, the demagnetization detection component 4150, the oscillator 4160, the AND gate 4166, the capacitor 4158, the integrator 4170, the comparator 4182, the flip-flop component 4190, and the drive component 4192, respectively.

According to another embodiment, the switch 4493 is controlled by a drive signal 4493. For example, if the drive signal 4493 is at the logic high level, the switch 4493 is closed. In another example, when the switch 4493 is closed, a feedback signal 4443 (e.g., $V_{FB}$) is clamped to the ground level by the amplifier 4428 (e.g., an operational amplifier). In yet another example, the feedback signal 4443 (e.g., $V_{FB}$) is set to zero, and a current signal 4483 is determined by $$I_{FB} = \frac{V_{aux}}{R_1} = \left(\frac{N_{aux}}{N_p} \times V_{in}\right) / R_1 \propto V_{in} \qquad (70)$$

where $I_{FB}$ represents the current signal 4483. Additionally, $V_{in}$ represents a rectified input voltage 4413, and $V_{aux}$ represents an auxiliary voltage 4419. Moreover, $N_{aux}$ is the number of turns of the auxiliary winding 4414, and $N_p$ is the number of turns of the primary winding 4410. Also, $R_1$ represents the resistance value of the resistor 4420.

In yet another example, based on Equation 70, the current signal 4483 is proportional to the rectified input voltage 4413 as follows:

$$I_{FB} \propto V_{in} \qquad (71)$$

According to yet another embodiment, the current signal 4483 is received by the multiplier 4484, which also receives a voltage signal 4481 and outputs a signal 4485 to the comparator 4482. For example, the signal 4485 is determined by:

$$V_{mo} = b \times V_{cmp} \times I_{FB} \qquad (72)$$

where $V_{mo}$ represents the signal 4485. Additionally, $V_{cmp}$ represents the voltage signal 4481, and b is a constant coefficient of the multiplier 4484.

In another example, comparing Equation 72 with Equation 64, one can see that the signal 4485 is similar to the signal 4185 and proportional to the product of the voltage signal 4481 and the rectified input voltage 4413 as follows:

$$V_{mo} \propto V_{cmp} \times V_{in} \qquad (73)$$

According to one embodiment, the power conversion system 4400 intends to keep $$\frac{1}{T} \times \int_0^T V_{cs\_pk} \times T_{Demag} dt$$

and $T_s$ constant, in order to keep the output current $I_o$ constant. For example, $$\frac{1}{T} \times \int_0^T V_{cs\_pk} \times T_{Demag} dt$$

is kept constant by at least satisfying Equation 63. In another example, $T_s$ is kept constant by the oscillator 4460.

According to another embodiment, as shown by at least Equation 73, the power factor (PF) of the power conversion system 4400 is equal to 1 or substantially equal to 1, by at least keeping the switching frequency constant and satisfying Equation 63. For example, the power factor (PF) of the power conversion system 4400 is equal to or larger than 0.9.

As discussed above and further emphasized here, FIG. 44 is merely an example, which should not unduly limit the scope of the claims. One of ordinary skill in the art would recognize many variations, alternatives, and modifications. For example, the power conversion system 4400 includes one or more bulk capacitors to convert an AC input signal 4415 into a DC signal that is received by the primary winding 4410.

Referring to FIG. 44, according to one embodiment, the power conversation system 4400 can achieve constant output current with power factor that is equal to 1 or substantially equal to 1. According to another embodiment, the power conversation system 4400 is used to provide power to one or more light emitting diodes, as shown in FIG. 45.

Figure 45:
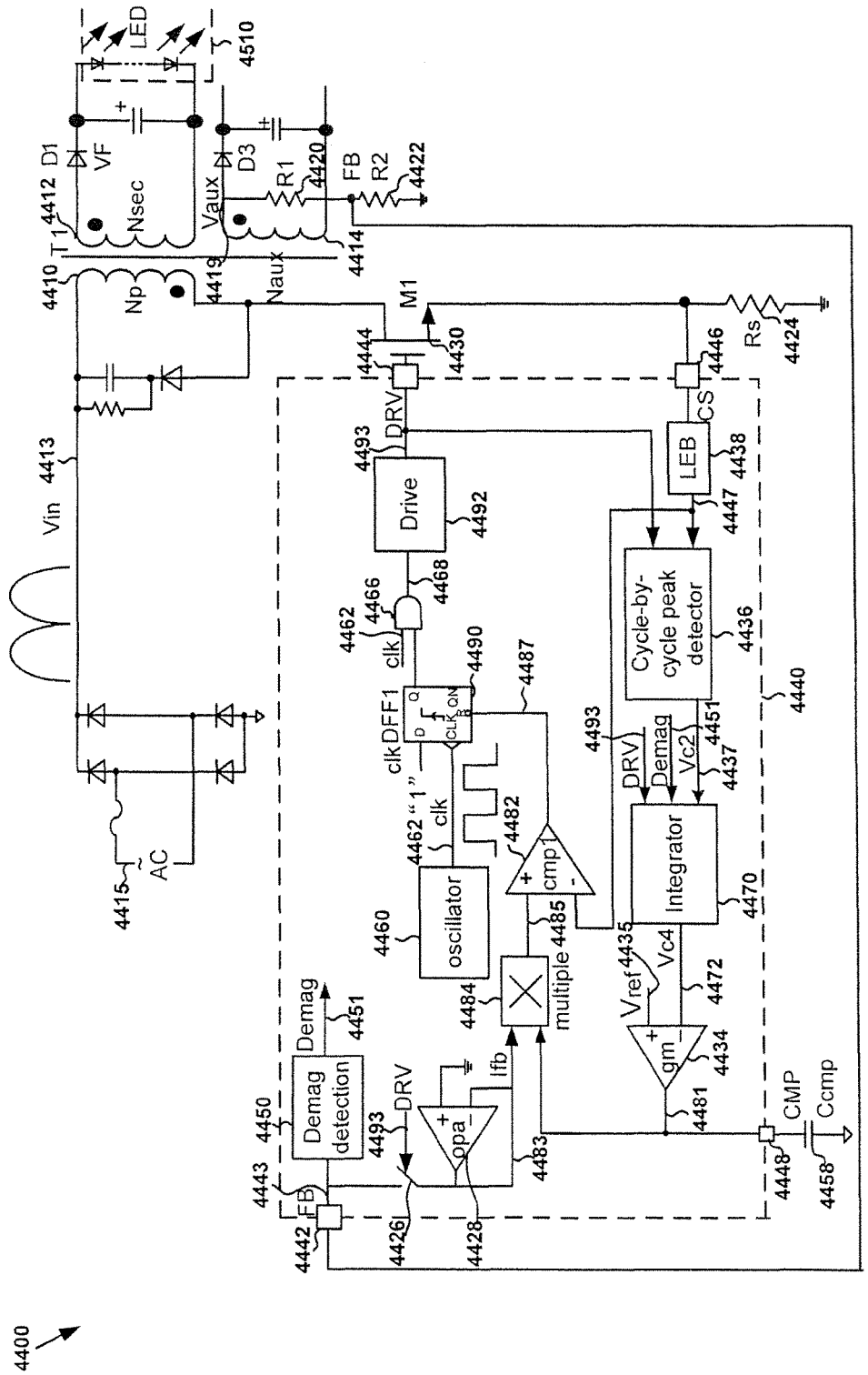
FIG. 45 is a simplified diagram for the switch-mode power conversion system used to power light emitting diodes according to yet another embodiment of the present invention.

FIG. 45 is a simplified diagram for the switch-mode power conversion system 4400 used to power light emitting diodes according to yet another embodiment of the present invention. This diagram is merely an example, which should not unduly limit the scope of the claims. One of ordinary skill in the art would recognize many variations, alternatives, and modifications. For example, the power conversation system 4400 is used to provide power to one or more light emitting diodes 4510.

According to another embodiment, a system (e.g., as shown in FIG. 21) for regulating a power converter includes a first signal generator (e.g., as shown by the component 2150) configured to receive a first sensed signal and generate an output signal associated with demagnetization. The first sensed signal is related to a first winding coupled to a secondary winding for a power converter, and the secondary winding is associated with at least an output current for the power converter. Additionally, the system includes a ramping signal generator (e.g., as shown by the combination of the components 2170, 2160, 2162, 2164, 2166, and 2172) configured to receive the output signal and generate a ramping signal (e.g., as shown by the signal 2165), and a first comparator (e.g., as shown by the component 2182) configured to receive the ramping signal and a first threshold signal (e.g., as shown by the signal 2183) and generate a first comparison signal based on at least information associated with the ramping signal and the first threshold signal. Moreover, the system includes a second comparator (e.g., as shown by the component 2180) configured to receive a second sensed signal (e.g., as shown by the signal 2147) and a second threshold signal and generate a second comparison signal. The second sensed signal is associated with a first current flowing through a primary winding coupled to the secondary winding for the power converter. Also, the system includes a second signal generator (e.g., as shown by the component 2190) configured to receive at least the first comparison signal and the second comparison signal and generate a modulation signal (e.g., as shown by the signal 2191), and a gate driver (e.g., as shown by the component 2192) configured to receive the modulation signal and output a drive signal (e.g., as shown by the signal 2193) to a switch. The switch is configured to affect the first current flowing through the primary winding. The output signal is associated with a demagnetization duration (e.g., $T_{Demag}$), and the drive signal is associated with a switching period (e.g., TO. The system is further configured to keep a ratio of the demagnetization duration to the switching period constant.

According to yet another embodiment, a method (e.g., as implemented in FIG. 21) for regulating a power converter includes receiving a first sensed signal. The first sensed signal is associated with a first winding coupled to a secondary winding for a power converter, and the secondary winding is related to at least an output current for the power converter. Additionally, the method includes generating an output signal based on at least information associated with the first sensed signal. The output signal is related to demagnetization. Moreover, the method includes receiving the output signal, generating a ramping signal based on at least information associated with the output signal, receiving the ramping signal and a first threshold signal, processing information associated with the ramping signal and the first threshold signal, and generating a first comparison signal based on at least information associated with the ramping signal and the first threshold signal. Also, the method includes receiving a second sensed signal and a second threshold signal. The second sensed signal is associated with a first current flowing through a primary winding coupled to the secondary winding for the power converter. Additionally, the method includes processing information associated with the second sensed signal and the second threshold signal, generating a second comparison signal based on at least information associated with the second sensed signal and the second threshold signal, receiving the first comparison signal and the second comparison signal, processing information associated with the first comparison signal and the second comparison signal, and generating a modulation signal based on at least information associated with the first comparison signal and the second comparison signal. Moreover, the method includes receiving the modulation signal, and outputting to a switch a drive signal based on at least information associated with the modulation signal to affect the first current flowing through the primary winding. The output signal is associated with a demagnetization duration, and the drive signal is associated with a switching period. A ratio of the demagnetization duration to the switching period is kept constant.

According to yet another embodiment, a system (e.g., as shown in FIG. 7 or FIG. 24) for regulating a power converter includes a first signal generator (e.g., as shown by the component 520 or the component 2420) configured to receive at least an input signal and generate at least an output signal associated with demagnetization, the input signal being related to at least an output current for a power converter. Additionally, the system includes a first controller (e.g., as shown by the component 542 or the combination of the components 2510, 2520, 2620 and 2635) configured to receive at least the output signal and generate at least a first control signal based on at least information associated with the output signal, and a second controller (e.g., as shown by the component 540 or the component 2440) configured to receive a first sensed signal and a first threshold signal and generate a second control signal. The first sensed signal is associated with a first current flowing through a primary winding for the power converter. Moreover, the system includes an oscillator (e.g., as shown by the component 562 or the component 2462) configured to receive at least the first control signal and generate at least a clock signal based on at least information associated with the first control signal, and a second signal generator (e.g., as shown by the component 538 or the component 2438) configured to receive at least the clock signal and the second control signal and generate at least a modulation signal. Also, the system includes a gate driver (e.g., as shown by the component 546 or the component 2446) configured to receive at least the modulation signal and output at least a drive signal to a switch. The switch is configured to affect the first current flowing through the primary winding. The output signal is associated with a demagnetization duration (e.g., $T_{Demag}$), and the drive signal is associated with a switching period (e.g., $T_s$). The system is further configured to keep a ratio of the demagnetization duration to the switching period constant, and keep a peak of the first sensed signal constant in magnitude.

According to yet another embodiment, a method (e.g., as implemented in FIG. 7 or FIG. 24) for regulating a power converter includes receiving at least an input signal, and generating at least an output signal based on at least information associated with the input signal. The input signal is related to at least an output current for a power converter, and the output signal is related to demagnetization. Additionally, the method includes receiving at least the output signal, processing information associated with the output signal, and generating at least a clock signal based on at least information associated with the output signal. Moreover, the method includes receiving a sensed signal and a threshold signal. The sensed signal is associated with a first current flowing through a primary winding for the power converter. Also, the method includes processing information associated with the sensed signal and the threshold signal, generating a control signal based on at least information associated with the sensed signal and the threshold signal, receiving at least the clock signal and the control signal, processing information associated with the clock signal and the control signal, and generating at least a modulation signal based on at least information associated with the clock signal and the control signal. Additionally, the method includes receiving at least the modulation signal, and outputting to a switch at least a drive signal based on at least information associated with the modulation signal to affect the first current flowing through the primary winding. The output signal is associated with a demagnetization duration, and the drive signal is associated with a switching period. A ratio of the demagnetization duration to the switching period is kept constant, and a peak of the first sensed signal is kept constant in magnitude.

According to yet another embodiment, a system (e.g., as shown in FIG. 28 or FIG. 32) for regulating a power converter includes a first signal generator (e.g., as shown by the component 2850) configured to receive a first sensed signal and generate a first output signal associated with demagnetization. The first sensed signal is associated with a first winding coupled to a secondary winding for a power converter, and the secondary winding is related to at least an output current for the power converter. Additionally, the system includes a first ramping signal generator (e.g., as shown by the combination of the components 2860, 2862, 2864, 2866, 2870, and 2872) configured to receive the first output signal and generate a first ramping signal (e.g., as shown by the signal 2865), and a first comparator (e.g., as shown by the component 2882) configured to receive the first ramping signal and a first threshold signal (e.g., as shown by the signal 2883) and generate a first comparison signal (e.g., as shown by the signal 2885) based on at least information associated with the first ramping signal and the first threshold signal. Moreover, the system includes a peak detector (e.g., as shown by the component 2836) configured to receive a drive signal (e.g., as shown by the signal 2893) and a second sensed signal (e.g., as shown by the signal 2847) and generate a peak signal (e.g., as shown by the signal 2837). The second sensed signal is associated with a first current flowing through a primary winding coupled to the secondary winding for the power converter. Also, the system includes an amplifier (e.g., as shown by the component 2834) configured to receive the peak signal and a second threshold signal (e.g., as shown by the signal 2835) and generate a second output signal (e.g., as shown by the signal 2881) with a capacitor, the capacitor being coupled to the amplifier, and a second comparator (e.g., as shown by the component 2880) configured to receive the second output signal and a second ramping signal (e.g., as shown by the signal 2833) and generate a second comparison signal (e.g., as shown by the signal 2887). Additionally, the system includes a second signal generator (e.g., as shown by the component 2890) configured to receive at least the first comparison signal and the second comparison signal and generate a modulation signal (e.g., as shown by the signal 2891), and a gate driver (e.g., as shown by the component 2892) configured to receive the modulation signal and output the drive signal to the peak detector and a switch. The switch is configured to affect the first current flowing through the primary winding.

According to yet another embodiment, a method (e.g., as implemented in FIG. 28 or FIG. 32) for regulating a power converter includes receiving a first sensed signal. The first sensed signal is associated with a first winding coupled to a secondary winding for a power converter, and the secondary winding is related to at least an output current for the power converter. Additionally, the method includes generating a first output signal based on at least information associated with the first sensed signal, receiving the first output signal, and generating a first ramping signal based on at least information associated with the first output signal. The first output signal is related to demagnetization. Moreover, the method includes receiving the first ramping signal and a first threshold signal, processing information associated with the first ramping signal and the first threshold signal, generating a first comparison signal based on at least information associated with the first ramping signal and the first threshold signal, and receiving a drive signal and a second sensed signal. The second sensed signal is associated with a first current flowing through a primary winding coupled to the secondary winding for the power converter. Also, the method includes processing information associated with the drive signal and the second sensed signal, generating a peak signal based on at least information associated with the drive signal and the second sensed signal, receiving the peak signal and a second threshold signal, processing information associated with the peak signal and the second threshold signal, and generating a second output signal based on at least information associated with the peak signal and the second threshold signal. Additionally, the method includes receiving the second output signal and a second ramping signal, processing information associated with the second output signal and the second ramping signal, and generate a second comparison signal based on at least information associated with the second output signal and the second ramping signal. Moreover, the method includes receiving the first comparison signal and the second comparison signal, processing information associated with the first comparison signal and the second comparison signal, and generating a modulation signal based on at least information associated with the first comparison signal and the second comparison signal. Also, the method includes receiving the modulation signal, and outputting the drive signal based on at least information associated with the modulation signal to affect the first current flowing through the primary winding.

According to yet another embodiment, a system (e.g., as shown in FIG. 28 or FIG. 32) for regulating a power converter includes a first signal generator (e.g., as shown by the component 2850) configured to receive a first sensed signal and generate an output signal (e.g., as shown by the signal 2851) associated with demagnetization. The first sensed signal is associated with a first winding coupled to a secondary winding for a power converter, and the secondary winding is related to at least an output current for the power converter. Additionally, the system includes a peak detector (e.g., as shown by the component 2836) configured to receive a drive signal and a second sensed signal and generate a peak signal (e.g., as shown by the signal 2837). The second sensed signal is associated with a first current flowing through a primary winding coupled to the secondary winding for the power converter. Moreover, the system includes a second signal generator (e.g., as shown by the component 2890) configured to process at least information associated with the output signal (e.g., as shown by the signal 2851) and the peak signal (e.g., as shown by the signal 2837) and generate a modulation signal (e.g., as shown by the signal 2891). Also, the system includes a gate driver (e.g., as shown by the component 2892) configured to receive the modulation signal and output the drive signal to the peak detector and a switch. The switch is configured to affect the first current flowing through the primary winding. The output signal is associated with a demagnetization duration (e.g., $T_{Demag}$), and the drive signal is associated with a switching period (e.g., $T_s$). The system is further configured to keep a ratio of the demagnetization duration to the switching period constant, and keep an average magnitude of the peak signal over a first duration (e.g., T) constant.

According to yet another embodiment, a method (e.g., as implemented in FIG. 28 or FIG. 32) for regulating a power converter includes receiving a first sensed signal. The first sensed signal is associated with a first winding coupled to a secondary winding for a power converter, and the secondary winding is related to at least an output current for the power converter. Additionally, the method includes generating an output signal based on at least information associated with the first sensed signal, receiving a drive signal and a second sensed signal, and processing information associated with the drive signal and the second sensed signal. The first sensed signal is related to demagnetization, and the second sensed signal is associated with a first current flowing through a primary winding coupled to the secondary winding for the power converter. Moreover, the method includes generating a peak signal based on at least information associated with the drive signal and the second sensed signal, processing at least information associated with the output signal and the peak signal, and generating a modulation signal based on at least information associated with the output signal and the peak signal. Also, the method includes receiving the modulation signal, and outputting to a switch the drive signal based on at least information associated with the modulation signal to at least affect the first current flowing through the primary winding. The output signal is associated with a demagnetization duration (e.g., $T_{Demag}$), and the drive signal is associated with a switching period (e.g., $T_s$). A ratio of the demagnetization duration to the switching period is kept constant, and an average magnitude of the peak signal over a first duration (e.g., T) is kept constant.

According to yet another embodiment, a system (e.g., as shown in FIG. 33, FIG. 39, or FIG. 40) for regulating a power converter includes a first signal generator (e.g., as shown by the component 3350) configured to receive a first sensed signal and generate a first output signal associated with demagnetization. The first sensed signal is related to a first winding coupled to a secondary winding for a power converter, and the secondary winding is associated with at least an output current for the power converter. Additionally, the system includes a peak detector (e.g., as shown by the component 3336) configured to receive a drive signal (e.g., as shown by the signal 3393) and a second sensed signal (e.g., as shown by the signal 3347) and generate a peak signal (e.g., as shown by the signal 3337). The second sensed signal is associated with a first current flowing through a primary winding coupled to the secondary winding for the power converter. Moreover, the system includes a second signal generator (e.g., as shown by the component 3370) configured to receive the drive signal, the first output signal, and the peak signal, and generate a second output signal (e.g., as shown by the signal 3372), and an amplifier (e.g., as shown by the component 3334) configured to receive the second output signal and a threshold signal (e.g., as shown by the signal 3335) and generate a third output signal (e.g., as shown by the signal 3381) with a capacitor, the capacitor being coupled to the amplifier. Also, the system includes a comparator (e.g., as shown by the component 3382) configured to receive the third output signal and a ramping signal (e.g., as shown by the signal 3364) and generate a comparison signal (e.g., as shown by the signal 3385), and a third signal generator (e.g., as shown by the combination of the components 3366 and 3390) configured to receive at least the comparison signal and a clock signal (e.g., as shown by the signal 3362) and generate a modulation signal (e.g., as shown by the signal 3368). Additionally, the system includes a gate driver (e.g., as shown by the component 3392) configured to receive the modulation signal and output the drive signal to the peak detector, the second signal generator and a switch. The switch is configured to affect the first current flowing through the primary winding.

According to yet another embodiment, a method (e.g., as implemented in FIG. 33, FIG. 39, or FIG. 40) for regulating a power converter includes receiving a first sensed signal. The first sensed signal is associated with a first winding coupled to a secondary winding for a power converter, and the secondary winding is related to at least an output current for the power converter. Additionally, the method includes generating a first output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and the second sensed signal, and generating a peak signal based on at least information associated with the drive signal and the second sensed signal. Also, the method includes receiving the drive signal, the first output signal, and the peak signal, processing information associated with the drive signal, the first output signal, and the peak signal, and generating a second output signal based on at least information associated with the drive signal, the first output signal, and the peak signal. Additionally, the method includes receiving the second output signal and a threshold signal, processing information associated with the second output signal and the threshold signal, and generating a third output signal based on at least information associated with the second output signal and the threshold signal. Moreover, the method includes receiving the third output signal and a ramping signal, processing information associated with the third output signal and the ramping signal, and generating a comparison signal based on at least information associated with the third output signal and the ramping signal. Also, the method includes receiving the comparison signal and a clock signal, processing information associated with the comparison signal and the clock signal, and generating a modulation signal based on at least information associated with the comparison signal and the clock signal. Additionally, the method includes receiving the modulation signal, and outputting the drive signal based on at least information associated with the modulation signal to affect the first current flowing through the primary winding.

According to yet another embodiment, a system (e.g., as shown in FIG. 41 or FIG. 43) for regulating a power converter includes a first signal generator (e.g., as shown by the component 4150) configured to receive a first sensed signal (e.g., as shown by the signal 4143) and generate a first output signal (e.g., as shown by the signal 4151) associated with demagnetization. The first sensed signal is associated with a first winding coupled to a secondary winding for a power converter, and the secondary winding being related to at least an output current for the power converter. Additionally, the system includes a peak detector (e.g., as shown by the component 4136) configured to receive a drive signal (e.g., as shown by the signal 4193) and a second sensed signal (e.g., as shown by the signal 4147) and generate a peak signal (e.g., as shown by the signal 4137). The second sensed signal is associated with a first current flowing through a primary winding coupled to the secondary winding for the power converter, and a second signal generator (e.g., as shown by the component 4170) configured to receive the drive signal, the first output signal and the peak signal, and generate a second output signal (e.g., as shown by the signal 4172). Moreover, the system includes an amplifier (e.g., as shown by the component 4134) configured to receive the second output signal and a threshold signal (e.g., as shown by the signal 4135) and generate a third output signal (e.g., as shown by the signal 4181) with a capacitor, and a third signal generator (e.g., as shown by the component 4184) configured to receive the third output signal and a first input signal (e.g., as shown by the signal 4183) and generate a fourth output signal (e.g., as shown by the signal 4185). The capacitor is coupled to the amplifier, and the first input signal is proportional to a second input signal (e.g., as shown by the signal 4113) received by the primary winding. Also, the system includes a comparator (e.g., as shown by the component 4182) configured to receive the fourth output signal and the second sensed signal and generate a comparison signal (e.g., as shown by the signal 4187), and a fourth signal generator (e.g., as shown by the combination of the components 4166 and 4190) configured to receive at least the comparison signal and a clock signal (e.g., as shown by the signal 4162) and generate a modulation signal (e.g., as shown by the signal 4168). Additionally, the system includes a gate driver (e.g., as shown by the component 4192) configured to receive the modulation signal and output the drive signal to the peak detector, the second signal generator, and a switch. The switch is configured to affect the first current flowing through the primary winding.

According to yet another embodiment, a method (e.g., as implemented in FIG. 41 or FIG. 43) for regulating a power converter includes receiving a first sensed signal. The first sensed signal is associated with a first winding coupled to a secondary winding for a power converter, and the secondary winding is related to at least an output current for the power converter. Additionally, the method includes generating a first output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and a second sensed signal, and generating a peak signal based on at least information associated with the drive signal and the second sensed signal. Also, the method includes receiving the drive signal, the first output signal, and the peak signal, processing information associated with the drive signal, the first output signal, and the peak signal, and generating a second output signal based on at least information associated with the drive signal, the first output signal, and the peak signal. Additionally, the method includes receiving the second output signal and a threshold signal, processing information associated with the second output signal and the threshold signal, generating a third output signal based on at least information associated with the second output signal and the threshold signal, and receiving the third output signal and a first input signal. The first input signal is proportional to a second input signal received by the primary winding. Moreover, the method includes processing information associated with the third output signal and the first input signal, generating a fourth output signal based on at least information associated with the third output signal and the first input signal, receiving the fourth output signal and the second sensed signal, processing information associated with the fourth output signal and the second sensed signal, and generating a comparison signal based on at least information associated with the fourth output signal and the second sensed signal. Also, the method includes receiving at least the comparison signal and a clock signal, processing information associated with the comparison signal and the clock signal, and generating a modulation signal based on at least information associated with the comparison signal and the clock signal. Additionally, the method includes receiving the modulation signal, and outputting the drive signal based on at least information associated with the modulation signal to affect the first current flowing through the primary winding.

According to yet another embodiment, a system (e.g., as shown in FIG. 44 or FIG. 45) for regulating a power converter includes a first signal generator (e.g., as shown by the component 4450) configured to receive a first sensed signal (e.g., as shown by the signal 4443) and generate a first output signal (e.g., as shown by the signal 4451) associated with demagnetization. The first sensed signal is associated with a first winding coupled to a secondary winding for a power converter, and the secondary winding is related to at least an output current for the power converter. Additionally, the system includes a peak detector (e.g., as shown by the component 4436) configured to receive a drive signal (e.g., as shown by the signal 4493) and a second sensed signal (e.g., as shown by the signal 4447) and generate a peak signal (e.g., as shown by the signal 4437). The second sensed signal is associated with a first current flowing through a primary winding coupled to the secondary winding for the power converter. Moreover, the system includes a second signal generator (e.g., as shown by the component 4470) configured to receive the drive signal, the first output signal, and the peak signal, and generate a second output signal (e.g., as shown by the signal 4472), and an amplifier (e.g., as shown by the component 4434) configured to receive the second output signal and a threshold signal (e.g., as shown by the signal 4435) and generate a third output signal (e.g., as shown by the signal 4481) with a capacitor, the capacitor being coupled to the amplifier. Also, the system includes a third signal generator (e.g., as shown by the combination of the components 4426, 4428, and 4484) configured to receive the first sensed signal, the third output signal and the drive signal and generate a fourth output signal (e.g., as shown by the signal 4485), and a comparator (e.g., as shown by the component 4482) configured to receive the fourth output signal and the second sensed signal and generate a comparison signal (e.g., as shown by the signal 4487). Additionally, the system includes a fourth signal generator (e.g., as shown by the combination of the components 4466 and 4490) configured to receive at least the comparison signal and a clock signal (e.g., as shown by the signal 4462) and generate a modulation signal (e.g., as shown by the signal 4468), and a gate driver (e.g., as shown by the component 4492) configured to receive the modulation signal and output the drive signal to the peak detector, the second signal generator, the third signal generator, and a switch, the switch being configured to affect the first current flowing through the primary winding.

According to yet another embodiment, a method (e.g., as implemented in FIG. 44 or FIG. 45) for regulating a power converter includes receiving a first sensed signal. The first sensed signal is associated with a first winding coupled to a secondary winding for a power converter, and the secondary winding is related to at least an output current for the power converter. Additionally, the method includes generating a first output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and the second sensed signal, and generating a peak signal based on at least information associated with the drive signal and the second sensed signal. Additionally, the method includes receiving the drive signal, the first output signal, and the peak signal, processing information associated with the drive signal, the first output signal, and the peak signal, and generating a second output signal based on at least information associated with the drive signal, the first output signal, and the peak signal. Moreover, the method includes receiving the second output signal and a threshold signal, processing information associated with the second output signal and the threshold signal, and generating a third output signal based on at least information associated with the second output signal and the threshold signal. Also, the method includes receiving the first sensed signal, the third output signal and the drive signal, processing information associated with the first sensed signal, the third output signal and the drive signal, and generating a fourth output signal based on at least information associated with the first sensed signal, the third output signal and the drive signal. Additionally, the method includes receiving the fourth output signal and the second sensed signal, processing information associated with the fourth output signal and the second sensed signal, and generating a comparison signal based on at least information associated with the fourth output signal and the second sensed signal. Moreover, the method includes receiving the comparison signal and a clock signal, processing information associated with the comparison signal and the clock signal, and generating a modulation signal based on at least information associated with the comparison signal and the clock signal. Also, the method includes receiving the modulation signal, and outputting the drive signal based on at least information associated with the modulation signal to affect the first current flowing through the primary winding.

According to yet another embodiment, a system (e.g., as shown in FIG. 33, FIG. 39, FIG. 40, FIG. 41, FIG. 43, FIG. 44, or FIG. 45) for regulating a power converter includes a first signal generator (e.g., as shown by the component 3350) configured to receive a first sensed signal and generate an output signal associated with demagnetization. The first sensed signal is associated with a first winding coupled to a secondary winding for a power converter, and the secondary winding is related to at least an output current for the power converter. Additionally, the system includes a peak detector (e.g., as shown by the component 3336) configured to receive a drive signal and a second sensed signal and generate a peak signal (e.g., as shown by the signal 3337). The second sensed signal is associated with a first current flowing through a primary winding coupled to the secondary winding for the power converter. Moreover, the system includes a second signal generator (e.g., as shown by the combination of the components 3366 and 3390) configured to process at least information associated with the output signal (e.g., as shown by the signal 3351) and the peak signal (e.g., as shown by the signal 3337) and generate a modulation signal (e.g., as shown by the signal 3368), and a gate driver (e.g., as shown by the component 3392) configured to receive the modulation signal and output the drive signal to at least the peak detector and a switch. The switch is configured to affect the first current flowing through the primary winding. The drive signal is associated with a switching period (e.g., $T_s$), and the output signal is associated with a demagnetization duration (e.g., $T_{Demag}$). The demagnetization duration multiplied by the peak signal in magnitude is equal to a demagnetization peak value. The system is further configured to keep the switching period constant, keep an average magnitude of the demagnetization peak value over a first duration (e.g., T) constant, and keep the output current constant.

According to yet another embodiment, a method (e.g., as implemented in FIG. 33, FIG. 39, FIG. 40, FIG. 41, FIG. 43, FIG. 44, or FIG. 45) for regulating a power converter includes receiving a first sensed signal. The first sensed signal is associated with a first winding coupled to a secondary winding for a power converter, and the secondary winding is related to at least an output current for the power converter. Additionally, the method includes generating an output signal associated with demagnetization, and receiving a drive signal and a second sensed signal. The second sensed signal is associated with a first current flowing through a primary winding coupled to the secondary winding for the power converter. Moreover, the method includes processing information associated with the drive signal and the second sensed signal, generating a peak signal based on at least information associated with the drive signal and the second sensed signal, processing information associated with the output signal and the peak signal, and generating a modulation signal based on at least information associated with the output signal and the peak signal. Also, the method includes receiving the modulation signal, and outputting the drive signal based on at least information associated with the modulation signal to affect the first current flowing through the primary winding. The drive signal is associated with a switching period (e.g., $T_s$), and the output signal is associated with a demagnetization duration (e.g., $T_{Demag}$). The demagnetization duration multiplied by the peak signal in magnitude is equal to a demagnetization peak value. The switching period is kept constant, an average magnitude of the demagnetization peak value over a first duration (e.g., T) is kept constant, and the output current is kept constant.

For example, some or all components of various embodiments of the present invention each are, individually and/or in combination, implemented using one or more software components, one or more hardware components, and/or one or more combinations of software and hardware components. In another example, some or all components of various embodiments of the present invention each are, individually and/or in combination, implemented in one or more circuits.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating a power converter, the system comprising:
   a ramping signal generator configured to receive a demagnetization signal and generate a ramping signal;
   a first comparator configured to receive the ramping signal and a first threshold signal and generate a first comparison signal based at least in part on the ramping signal and the first threshold signal;
   a second comparator configured to receive a sensed signal and a second threshold signal and generate a second comparison signal, the sensed signal being associated with a current flowing through a primary winding of the power converter;
   a drive signal generator configured to receive at least the first comparison signal and the second comparison signal and output a drive signal to a switch, the switch being configured to affect the current flowing through the primary winding;
   wherein:
      the demagnetization signal is associated with a demagnetization duration;
      the drive signal is associated with a switching period; and
      the system is further configured to keep a ratio of the demagnetization duration to the switching period constant.

2. The system of claim 1 is further configured to keep a peak of the sensed signal constant in magnitude.

3. The system of claim 2 is further configured to keep an output current associated with a secondary winding constant, the secondary winding being coupled to the primary winding of the power converter.

4. The system of claim 1 wherein the drive signal generator includes a flip-flop.

5. A system for regulating a power converter, the system comprising:

an oscillator configured to receive a first control signal based at least in part on a demagnetization signal and generate a clock signal based at least in part on the first control signal; and a drive signal generator configured to receive the clock signal and a second control signal based at least in part on a first sensed signal, the first sensed signal being associated with a current flowing through a primary winding for a power converter, and output a drive signal to a switch, the switch being configured to affect the current flowing through the primary winding;

wherein:
the demagnetization signal is associated with a demagnetization duration; and
the drive signal is associated with a switching period;
wherein the system is further configured to:
keep a ratio of the demagnetization duration to the switching period constant; and
keep a peak of the first sensed signal constant in magnitude.

6. The system of claim 5, and further comprising:
a compensator configured to generate a compensation signal; and
a signal generator configured to receive an input signal and generate the demagnetization signal, the input signal being related to an output current for the power converter;
wherein:
the input signal is a combination of the compensation signal and a second sensed signal,
the second sensed signal is associated with a first winding coupled to a secondary winding for the power converter; and
the secondary winding is related to the output current for the power converter.

7. A system for regulating a power converter, the system comprising:
a first comparator configured to receive a first ramping signal based at least in part on a demagnetization signal and a first threshold signal and generate a first comparison signal based at least in part on the first ramping signal and the first threshold signal;
a peak detector configured to receive a drive signal and a sensed signal and generate a peak signal, the sensed signal being associated with a current flowing through a primary winding of a power converter;
an amplifier configured to receive the peak signal and a second threshold signal and generate an output signal with a capacitor;
a second comparator configured to receive the output signal and a second ramping signal and generate a second comparison signal; and
a drive signal generator configured to receive the first comparison signal and the second comparison signal and output the drive signal to the peak detector and a switch, the switch being configured to affect the current flowing through the primary winding.

8. The system of claim 7 wherein:
the demagnetization signal is associated with a demagnetization duration;
the drive signal is associated with a switching period; and
the system is further configured to keep a ratio of the demagnetization duration to the switching period constant.

9. The system of claim 7 is further configured to keep an average magnitude of the peak signal over a first duration constant.

10. The system of claim 9 is further configured to keep an output current associated with a secondary winding of the power converter constant, the secondary winding being coupled to the primary winding of the power converter.

11. The system of claim 7 wherein the peak signal represents a peak magnitude of the sensed signal within each switching period of the drive signal.

12. The system of claim 7 wherein the drive signal generator includes a flip-flop.

13. A system for regulating a power converter, the system comprising:
a peak detector configured to receive a drive signal and a sensed signal and generate a peak signal, the sensed signal being associated with a current flowing through a primary winding of a power converter;
a signal generator configured to receive the peak signal and a demagnetization signal and generate a modulation signal; and
a drive signal generator configured to receive the modulation signal and output the drive signal to the peak detector and a switch, the switch being configured to affect the current flowing through the primary winding;
wherein:
the demagnetization signal is associated with a demagnetization duration; and
the drive signal is associated with a switching period;
wherein the system is further configured to:
keep a ratio of the demagnetization duration to the switching period constant; or
keep an average magnitude of the peak signal over a first duration constant.

14. The system of claim 13 is further configured to keep an output current associated with a secondary winding of the power converter constant, the secondary winding being coupled to the primary winding of the power converter.

15. A system for regulating a power converter, the system comprising:
a first signal generator configured to receive a drive signal and a peak signal based at least in part on the drive signal and a sensed signal, the sensed signal being associated with a current flowing through a primary winding of a power converter, and generate a first output signal;
an amplifier configured to receive the first output signal and a threshold signal and generate a second output signal with a capacitor;
a comparator configured to receive the second output signal and a ramping signal and generate a comparison signal;
a second signal generator configured to receive the comparison signal and a clock signal and generate a modulation signal; and
a drive signal generator configured to receive the modulation signal and output the drive signal to a peak detector, the first signal generator and a switch, the switch being configured to affect the current flowing through the primary winding.

16. The system of claim 15 wherein:
the drive signal is associated with a switching period; and
the system is further configured to keep the switching period constant.

17. The system of claim 16 wherein:
the first signal generator is further configured to receive a demagnetization signal associated with a demagnetization duration;

the demagnetization duration multiplied by the peak signal in magnitude is equal to a demagnetization peak value; and the system is further configured to keep an average magnitude of the demagnetization peak value over a first duration constant.

18. The system of claim 17 wherein the first output signal is proportional to the demagnetization duration multiplied by the peak signal in magnitude.

19. The system of claim 17 is further configured to keep an output current associated with a secondary winding of the power converter constant, the secondary winding being coupled to the primary winding of the power converter.

20. The system of claim 15 is further configured to keep a power factor associated with the power converter substantially equal to 1.

21. The system of claim 15 wherein the second signal generator includes a flip-flop coupled to an AND gate.

22. The system of claim 15 wherein the peak signal represents a peak magnitude of the sensed signal within a switching period of the drive signal.

23. The system of claim 15 wherein the first signal generator includes a cycle-by-cycle integrator, the cycle-by-cycle integrator being reset for each switching period.

24. A system for regulating a power converter, the system comprising:
   a first signal generator configured to receive a drive signal and a peak signal based at least in part on the drive signal and a sensed signal, the sensed signal being associated with a current flowing through a primary winding of a power converter, and generate a first output signal;
   an amplifier configured to receive the first output signal and a threshold signal and generate a second output signal with a capacitor;
   a second signal generator configured to receive the second output signal and a first input signal and generate a third output signal, the first input signal being proportional to a second input signal received by the primary winding;
   a comparator configured to receive the third output signal and the sensed signal and generate a comparison signal;
   a third signal generator configured to receive the comparison signal and a clock signal and generate a modulation signal; and
   a drive signal generator configured to receive the modulation signal and output the drive signal to a peak detector, the first signal generator, and a switch, the switch being configured to affect the current flowing through the primary winding.

25. The system of claim 24 wherein the second signal generator includes a multiplier configured to generate the third output signal equal to the second output signal multiplied by the first input signal in magnitude.

26. The system of claim 24 wherein:
   the drive signal is associated with a switching period; and
   the system is further configured to keep the switching period constant.

27. The system of claim 24 wherein:
   the first signal generator is configured to receive a demagnetization signal associated with a demagnetization duration;
   the demagnetization duration multiplied by the peak signal in magnitude is equal to a demagnetization peak value; and
   the system is further configured to keep an average magnitude of the demagnetization peak value over a first duration constant.

28. The system of claim 27 wherein the first output signal is proportional to the demagnetization duration multiplied by the peak signal in magnitude.

29. The system of claim 24 is further configured to keep a power factor associated with the power converter substantially equal to 1.

30. The system of claim 24 wherein the peak signal represents a peak magnitude of the sensed signal within each switching period of the drive signal.

31. The system of claim 24 wherein the first signal generator includes a cycle-by-cycle integrator, the cycle-by-cycle integrator being reset for each switching period.

32. A system for regulating a power converter, the system comprising:
   a first signal generator configured to receive a drive signal and a peak signal based at least in part on the drive signal and a first sensed signal, the first sensed signal being associated with a current flowing through a primary winding of a power converter, and generate a first output signal;
   an amplifier configured to receive the first output signal and a threshold signal and generate a second output signal with a capacitor;
   a second signal generator configured to receive a second sensed signal, the second output signal and the drive signal and generate a third output signal;
   a comparator configured to receive the third output signal and the first sensed signal and generate a comparison signal;
   a third signal generator configured to receive the comparison signal and a clock signal and generate a modulation signal; and
   a drive signal generator configured to receive the modulation signal and output the drive signal to a peak detector, the first signal generator, the second signal generator, and a first switch, the first switch being configured to affect the current flowing through the primary winding.

33. The system of claim 32 wherein the second signal generator includes:
   a second switch configured to receive the second sensed signal and the drive signal;
   a multiplier configured to output the third output signal; and
   an operational amplifier coupled to the second switch and the multiplier.

34. The system of claim 32 wherein:
   the drive signal is associated with a switching period; and
   the system is further configured to keep the switching period constant.

35. The system of claim 34 wherein:
   the first signal generator is further configured to receive a demagnetization signal associated with a demagnetization duration;
   the demagnetization duration multiplied by the peak signal in magnitude is equal to a demagnetization peak value; and
   the system is further configured to keep an average magnitude of the demagnetization peak value over a first duration constant.

36. The system of claim 35 wherein the first output signal is proportional to the demagnetization duration multiplied by the peak signal in magnitude.

37. The system of claim 32 is further configured to keep a power factor associated with the power converter substantially equal to 1.

38. A system for regulating a power converter, the system comprising:
- a signal generator configured to receive a peak signal and a demagnetization signal and generate a modulation signal; and
- a drive signal generator configured to receive the modulation signal based at least in part on the peak signal and a demagnetization and output a drive signal to a peak detector and a switch, the switch being configured to affect a current flowing through a primary winding of a power converter;

wherein:
- the peak signal is based at least in part on the drive signal and a sensed signal;
- the sensed signal is associated with the current flowing through the primary winding of the power converter;
- the drive signal is associated with a switching period;
- the demagnetization signal is associated with a demagnetization duration; and
- the demagnetization duration multiplied by the peak signal in magnitude is equal to a demagnetization peak value;

wherein the system is further configured to:
- keep the switching period constant;
- keep an average magnitude of the demagnetization peak value over a first duration constant; and
- keep an output current associated with a secondary winding of the power converter constant.

* * * * *